(12) United States Patent
Liao et al.

(10) Patent No.: US 10,795,123 B2
(45) Date of Patent: Oct. 6, 2020

(54) OPTICAL IMAGING LENS ASSEMBLY, IMAGE CAPTURING UNIT AND ELECTRONIC DEVICE

(71) Applicant: LARGAN PRECISION CO.,LTD., Taichung (TW)

(72) Inventors: Cheng-Yuan Liao, Taichung (TW); Shu-Yun Yang, Taichung (TW); Kuo-Jui Wang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 156 days.

(21) Appl. No.: 15/951,912

(22) Filed: Apr. 12, 2018

(65) Prior Publication Data

US 2019/0146186 A1 May 16, 2019

(30) Foreign Application Priority Data

Nov. 15, 2017 (TW) .............................. 106139450 A

(51) Int. Cl.
*G02B 13/00* (2006.01)
*G02B 9/60* (2006.01)
*G02B 13/04* (2006.01)
*G02B 27/00* (2006.01)

(52) U.S. Cl.
CPC .......... *G02B 13/0045* (2013.01); *G02B 9/60* (2013.01); *G02B 13/006* (2013.01); *G02B 13/04* (2013.01); *G02B 27/0025* (2013.01)

(58) Field of Classification Search
CPC .. G02B 13/0045; G02B 13/006; G02B 13/04; G02B 27/0025; G02B 9/60
See application file for complete search history.

(56) References Cited

U.S. PATENT DOCUMENTS

| 5,933,286 A | 8/1999 | Yamada et al. |
| 8,743,485 B2 | 6/2014 | Hsieh et al. |
| 2007/0139793 A1* | 6/2007 | Kawada ................. G02B 13/06 359/740 |

(Continued)

FOREIGN PATENT DOCUMENTS

| CN | 103969793 A | 8/2014 |
| CN | 206301070 U | 7/2017 |

(Continued)

OTHER PUBLICATIONS

CN Office Action in Application No. 201810118006.7 dated Dec. 9, 2019.

*Primary Examiner* — Joseph P Martinez
*Assistant Examiner* — Vipin Patel
(74) *Attorney, Agent, or Firm* — Maschoff Brennan

(57) ABSTRACT

An optical imaging lens assembly includes five lens elements which are, in order from an object side to an image side: a first lens element, a second lens element, a third lens element, a fourth lens element and a fifth lens element. The first lens element has an image-side surface being concave in a paraxial region thereof. The second lens element with negative refractive power has an image-side surface being concave in a paraxial region thereof. The third lens element with positive refractive power has an image-side surface being convex in a paraxial region thereof. The fourth lens element has positive refractive power. The fifth lens element has negative refractive power.

32 Claims, 29 Drawing Sheets

(56) References Cited

U.S. PATENT DOCUMENTS

| | | | |
|---|---|---|---|
| 2011/0096413 | A1 | 4/2011 | Lo et al. |
| 2011/0122512 | A1 | 5/2011 | Asami |
| 2014/0118846 | A1 | 5/2014 | Kubota et al. |
| 2014/0126070 | A1 | 5/2014 | Ning |
| 2014/0160582 | A1 | 6/2014 | Kubota et al. |
| 2014/0240853 | A1 | 8/2014 | Kubota et al. |
| 2015/0070788 | A1 | 3/2015 | Kubota et al. |
| 2015/0168675 | A1 | 6/2015 | Lee et al. |
| 2015/0226940 | A1 | 8/2015 | Kubota et al. |
| 2015/0331224 | A1 | 11/2015 | Shih et al. |
| 2016/0161706 | A1 | 6/2016 | Liao |
| 2016/0252707 | A1 | 9/2016 | Emi |
| 2017/0097498 | A1 | 4/2017 | Amanai |
| 2018/0052301 | A1 | 2/2018 | Lai et al. |
| 2018/0052305 | A1 | 2/2018 | Lai et al. |
| 2018/0059366 | A1 | 3/2018 | Lai et al. |
| 2018/0059367 | A1 | 3/2018 | Lai et al. |
| 2019/0086637 | A1 | 3/2019 | Yamazaki et al. |
| 2020/0073084 | A1 | 3/2020 | Yamazaki |

FOREIGN PATENT DOCUMENTS

| | | |
|---|---|---|
| CN | 107065144 A | 8/2017 |
| CN | 208432781 U | 1/2019 |
| CN | 208432782 U | 1/2019 |
| CN | 110346898 A | 10/2019 |
| JP | 08-050243 A | 2/1996 |
| JP | 10-039206 A | 2/1998 |
| JP | 10-111454 A | 4/1998 |
| JP | 10-288742 A | 10/1998 |
| JP | 2009-223251 A | 10/2009 |
| TW | M534825 U | 1/2017 |

\* cited by examiner

OPTICAL IMAGING LENS ASSEMBLY, IMAGE CAPTURING UNIT AND ELECTRONIC DEVICE

RELATED APPLICATIONS

This application claims priority to Taiwan Application 106139450, filed on Nov. 15, 2017, which is incorporated by reference herein in its entirety.

BACKGROUND

Technical Field

The present disclosure relates to an optical imaging lens assembly, an image capturing unit and an electronic device, more particularly to an optical imaging lens assembly and an image capturing unit applicable to an electronic device.

Description of Related Art

In recent years, with the popularity of electronic devices having camera functionalities, the demand of miniaturized optical systems has been increasing. As advanced semiconductor manufacturing technologies have reduced the pixel size of sensors, and compact optical systems have gradually evolved toward the field of higher megapixels, there is an increasing demand for compact optical systems featuring better image quality.

For fulfilling various market demands, the specification requirements of camera modules become much higher so that the camera modules can be applied to different kinds of electronic devices, such as advanced driver assistance systems (ADAS), dashboard cameras, lane departure warning systems (LDWS), vehicle backup cameras, blind spot detection systems, intelligent home systems, multi-lens devices, intelligent electronic devices, wearable devices, digital cameras, drones, sport cameras, network surveillance devices, human-computer interaction systems and other electronic imaging devices.

For conventional camera modules, due to limitations of the shape of lens surfaces and the material selection, it is difficult to reduce the size thereof as well as obtain a good balance covering between lens formation, lens assembling, and lens sensitivity. Furthermore, it is essential for camera modules to provide stable operational status with high quality images under various environmental conditions. Regarding the aforementioned automotive devices, for example, the camera modules can be disposed on the front side, the lateral side or other positions of a car in order to detect changes in the surrounding environment. The field of view of the camera modules can be determined according to its proposed sensing distance, direction and range. Moreover, the images captured by camera modules are processed by software to identify and react to changes in the surrounding environment, thereby achieving driver assistance or autonomous driving. The camera modules can be further integrated with telecommunication devices, radars, automatic high beam systems, blind spot sensors, pedestrian detectors, intelligent brake systems, road sign recognition systems or global positioning system (GPS) so as to improve traffic safety and bring convenience to daily life. To keep the automotive devices properly functioning in various conditions, such as high temperature variation environments or collisions due to outside forces, the camera modules are required to have high heat resistance, high corrosion resistance and high mechanical strength.

Therefore, there is a need to develop an optical system featuring wide field of view, compact size, high image quality and high environmental resistance.

SUMMARY

According to one aspect of the present disclosure, an optical imaging lens assembly includes five lens elements. The five lens elements are, in order from an object side to an image side, a first lens element, a second lens element, a third lens element, a fourth lens element and a fifth lens element. The first lens element has an image-side surface being concave in a paraxial region thereof. The second lens element with negative refractive power has an image-side surface being concave in a paraxial region thereof. The third lens element with positive refractive power has an image-side surface being convex in a paraxial region thereof. The fourth lens element has positive refractive power. The fifth lens element has negative refractive power. When a curvature radius of an object-side surface of the third lens element is R5, a curvature radius of the image-side surface of the third lens element is R6, a focal length of the optical imaging lens assembly is f, a focal length of the second lens element is f2, a focal length of the fourth lens element is f4, an axial distance between the first lens element and the second lens element is T12, an axial distance between the third lens element and the fourth lens element is T34, and a central thickness of the third lens element is CT3, the following conditions are satisfied:

$$0<(R5+R6)/(R5-R6);$$

$$f/T34<1.0;$$

$$T12/CT3<0.92; \text{ and}$$

$$|f4/f2|<0.70.$$

According to another aspect of the present disclosure, an optical imaging lens assembly includes five lens elements. The five lens elements are, in order from an object side to an image side, a first lens element, a second lens element, a third lens element, a fourth lens element and a fifth lens element. The first lens element has an image-side surface being concave in a paraxial region thereof. The second lens element with negative refractive power has an image-side surface being concave in a paraxial region thereof. The third lens element with positive refractive power has an image-side surface being convex in a paraxial region thereof. The fourth lens element has positive refractive power. The fifth lens element has negative refractive power. When a curvature radius of an object-side surface of the third lens element is R5, a curvature radius of the image-side surface of the third lens element is R6, a curvature radius of an image-side surface of the fourth lens element is R8, a focal length of the optical imaging lens assembly is f, and an axial distance between the third lens element and the fourth lens element is T34, the following conditions are satisfied:

$$0.20<(R5+R6)/(R5-R6);$$

$$0.10<f/T34<0.90; \text{ and}$$

$$|R8/f|<1.40.$$

According to still another aspect of the present disclosure, an optical imaging lens assembly includes five lens elements. The five lens elements are, in order from an object side to an image side, a first lens element, a second lens element, a third lens element, a fourth lens element and a fifth lens element. The first lens element has an image-side surface being concave in a paraxial region thereof. The second lens element with negative refractive power has an object-side surface being concave in a paraxial region thereof and an image-side surface being concave in a paraxial region thereof, wherein the object-side surface of the second lens element has at least one inflection point. The third lens element with positive refractive power has an image-side surface being convex in a paraxial region thereof. The fourth lens element has positive refractive power. The fifth lens element has negative refractive power. When a curvature radius of an object-side surface of the third lens element is R5, a curvature radius of the image-side surface of the third lens element is R6, a focal length of the optical imaging lens assembly is f, an axial distance between the first lens element and the second lens element is T12, an axial distance between the third lens element and the fourth lens element is T34, a central thickness of the third lens element is CT3, the following conditions are satisfied:

$-0.55<(R5+R6)/(R5-R6);$ $f/T34<1.50;$ and $T12/CT3<1.50.$

According to yet still another aspect of the present disclosure, an image capturing unit includes one of the aforementioned optical imaging lens assemblies and an image sensor, wherein the image sensor is disposed on an image surface of the optical imaging lens assembly.

According to yet still another aspect of the present disclosure, an electronic device includes the aforementioned image capturing unit.

BRIEF DESCRIPTION OF THE DRAWINGS

The disclosure can be better understood by reading the following detailed description of the embodiments, with reference made to the accompanying drawings as follows.

DETAILED DESCRIPTION

An optical imaging lens assembly includes five lens elements. The five lens elements are, in order from an object side to an image side, a first lens element, a second lens element, a third lens element, a fourth lens element and a fifth lens element.

The first lens element can have negative refractive power, and the first lens element has an image-side surface being concave in a paraxial region thereof. Therefore, it is favorable for the optical imaging lens assembly to have a short focal length for gathering light from a large angle of view, thereby broadening the imaging field.

Figure 23:
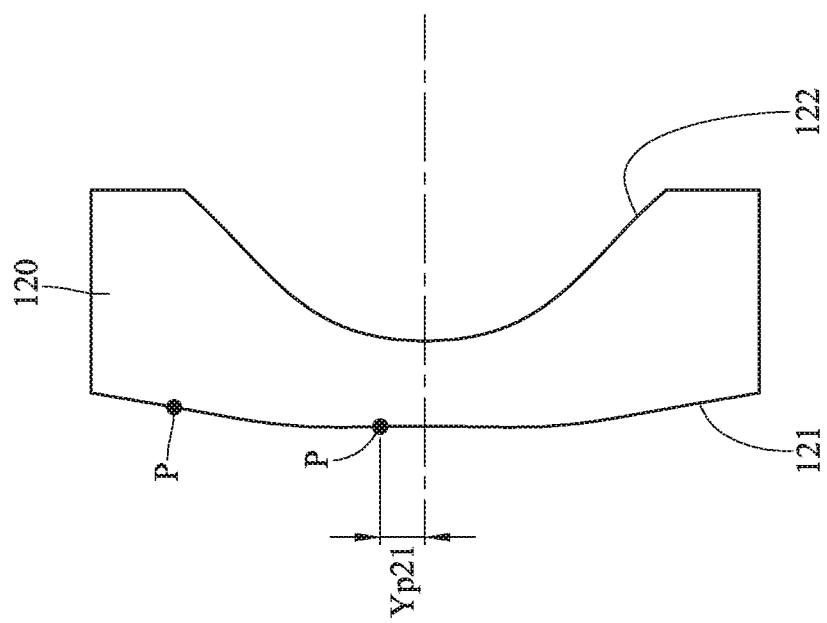
FIG. 23 shows a schematic view of Yp21 and inflection points on an object-side surface of a second lens element, according to the 1st embodiment of the present disclosure.

The second lens element has negative refractive power; therefore, it is favorable for balancing the refractive power distribution between the first lens element and the second lens element so as to broaden the field of view and reduce the sensitivity, such that the optical imaging lens assembly is applicable to more varieties of applications. The second lens element can have an object-side surface being concave in a paraxial region thereof, and the object-side surface of the second lens element can have at least one inflection point; therefore, it is favorable for correcting aberrations generated by light from a large field of view, and reducing a total track length of the optical imaging lens assembly. The second lens element has an image-side surface being concave in a paraxial region thereof; therefore, it is favorable for further correcting aberrations generated by light from the large field of view. Please refer to FIG. 23, which shows a schematic view of inflection points P on the object-side surface of the second lens element according to the 1st embodiment of the present disclosure.

The third lens element has positive refractive power; therefore, it is favorable for balancing the negative refractive power on the object side, reducing the incident angle of light from the large field of view, correcting aberrations generated due to an overly large incident angle, and reducing the sensitivity of the optical imaging lens assembly. The third lens element can have an object-side surface being concave in a paraxial region thereof; therefore, it is favorable for correcting astigmatism so as to improve the image quality. The third lens element has an image-side surface being convex in a paraxial region thereof; therefore, it is favorable for reducing the incident angle of light from the large field of view and correcting chromatic aberration so as to improve the image quality.

The fourth lens element has positive refractive power. Therefore, it is favorable for providing light convergence capability so as to reduce the total track length of the optical imaging lens assembly, thereby achieving compactness.

The fifth lens element has negative refractive power. Therefore, it is favorable for correcting chromatic aberration on the image side of the optical imaging lens assembly so as to improve the image quality.

Figure 24:
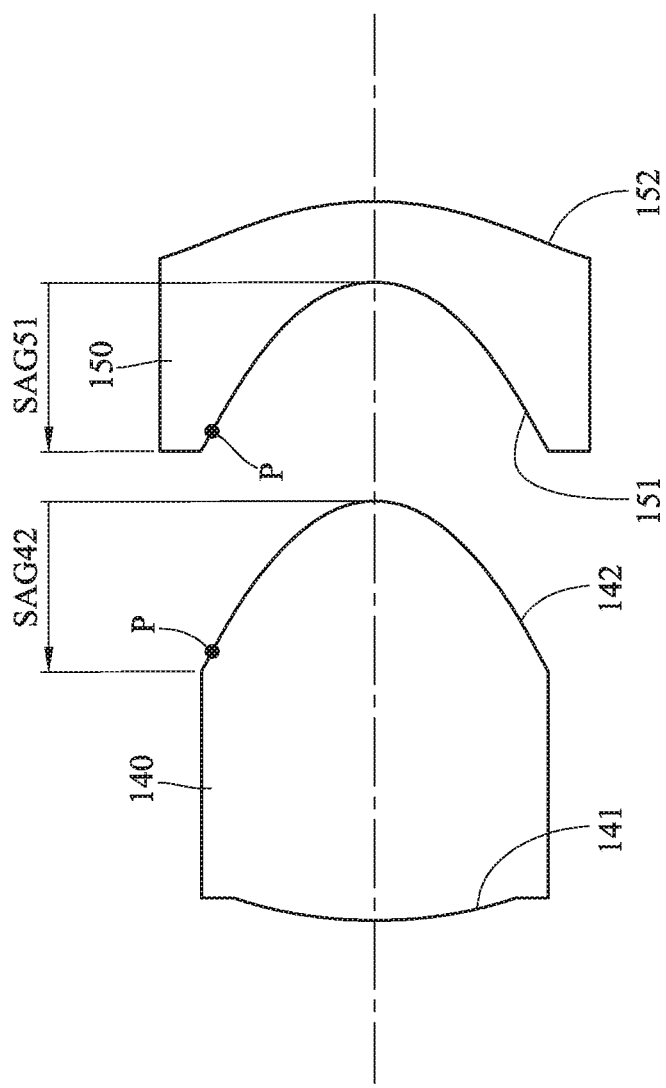
FIG. 24 shows a schematic view of SAG42, SAG51 and inflection points on an image-side surface of a fourth lens element and an object-side surface of a fifth lens element, according to the 1st embodiment of the present disclosure.

At least one of an image-side surface of the fourth lens element and an object-side surface of the fifth lens element can have at least one inflection point. Therefore, it is favorable for projecting peripheral light rays onto an image surface, thereby preventing the degradation of image quality due to stray light generated from an overly large incident angle; furthermore, it is favorable for reducing the incident angle in the off-axis region projecting onto the image surface so as to provide high illuminance and further improve the image quality. Please refer to FIG. 24, which shows a schematic view of inflection points P on the image-side surface of the fourth lens element and the object-side surface of the fifth lens element according to the 1st embodiment of the present disclosure. The fourth lens element and the fifth lens element are separately shown in FIG. 24 in order to clearly show the inflection points P on the lens surfaces.

When a curvature radius of the object-side surface of the third lens element is R5, and a curvature radius of the image-side surface of the third lens element is R6, the following condition is satisfied: $-0.55<(R5+R6)/(R5-R6)$. Therefore, the shape of the third lens element is favorable for reducing the incident angle of light from the large angle of view and correcting spherical aberration so as to gather light from the large field of view. Preferably, the following condition can be satisfied: $-0.30<(R5+R6)/(R5-R6)$. More preferably, the following condition can be satisfied: $0<(R5+R6)/(R5-R6)$. Much more preferably, the following condition can be satisfied: $0.20<(R5+R6)/(R5-R6)$. Still more preferably, the following condition can also be satisfied: $0.20<(R5+R6)/(R5-R6)<6.0$.

When a focal length of the optical imaging lens assembly is f, and an axial distance between the third lens element and the fourth lens element is T34, the following condition is satisfied: $f/T34<1.50$. Therefore, it is favorable for providing a shorter focal configuration for gathering light from the large field of view; furthermore, a proper axial distance between the third lens element and the fourth lens element is favorable for increasing assembling yield rate. Preferably, the following condition can be satisfied: $f/T34<1.0$. More preferably, the following condition can also be satisfied: $0.10<f/T34<0.90$.

When an axial distance between the first lens element and the second lens element is T12, and a central thickness of the third lens element is CT3, the following condition can be satisfied: $T12/CT3<1.50$. Therefore, the central thickness of the third lens element is favorable for reducing the incident angle of light from the large angle of view and reducing the sensitivity of the optical imaging lens assembly; furthermore, a proper ratio of the central thickness of the third lens element to the axial distance between the first lens element and the second lens element is favorable for providing a wide-angle lens configuration so as to broaden the field of view of the optical imaging lens assembly. Preferably, the following condition can be satisfied: $T12/CT3<1.20$. More preferably, the following condition can be satisfied: $T12/CT3<0.92$. Much more preferably, the following condition can also be satisfied: $0.10<T12/CT3<0.85$.

When a focal length of the second lens element is f2, and a focal length of the fourth lens element is f4, the following condition can be satisfied: $|f4/f2|<0.70$. Therefore, a proper ratio of the refractive power of the second lens element to the refractive power of the fourth lens element is favorable for obtaining a refractive power allocation for a wide-angle lens configuration, such that the optical imaging lens assembly becomes applicable to a wide range of applications. Preferably, the following condition can also be satisfied: $|f4/f2|<0.60$.

When a curvature radius of the image-side surface of the fourth lens element is R8, and the focal length of the optical imaging lens assembly is f, the following condition can be satisfied: $|R8/f|<1.40$. Therefore, the shape of the image-side surface of the fourth lens element is favorable for strengthening the refractive power of the fourth lens element so as to reduce the total track length of the optical imaging lens assembly, thereby achieving compactness.

When a curvature radius of an object-side surface of the fourth lens element is R7, and a curvature radius of an image-side surface of the fifth lens element is R10, the following condition can be satisfied: $0<(R7+R10)/(R7-R10)<1.0$. Therefore, it is favorable for adjusting the shape of the lens elements on the image side so as to reduce the total track length and the sensitivity of the optical imaging lens assembly.

When a curvature radius of the object-side surface of the second lens element is R3, and a curvature radius of the image-side surface of the second lens element is R4, the following condition can be satisfied: $-1.0<(R3+R4)/(R3-R4)<1.15$. Therefore, the shape of the second lens element is favorable for correcting aberrations so as to maintain high image quality.

When the curvature radius of the image-side surface of the fourth lens element is R8, and the axial distance between the third lens element and the fourth lens element is T34, the following condition can be satisfied: $|R8/T34|<0.80$. Therefore, the shape of the image-side surface of the fourth lens element and a proper axial distance between the third lens element and the fourth lens element are favorable for balancing between compactness and a higher yield rate.

When half of a maximum field of view of the optical imaging lens assembly is HFOV, the following condition can be satisfied: $1/|\tan(\text{HFOV})|<0.50$. Therefore, it is favorable for enlarging the field of view for various applications.

When the focal length of the optical imaging lens assembly is f, and an entrance pupil diameter of the optical imaging lens assembly is EPD, the following condition can be satisfied: $0.75<f/\text{EPD}<2.30$. Therefore, it is favorable for gathering sufficient amount of incident light to increase illuminance on the image surface, so that an imaging capturing unit including the optical imaging lens assembly is able to capture enough image information in a low light condition (e.g., at night) or short exposure photography (e.g., dynamic photography), and thus an electronic device equipped with the imaging capturing unit is able to work under various conditions.

Figure 25:
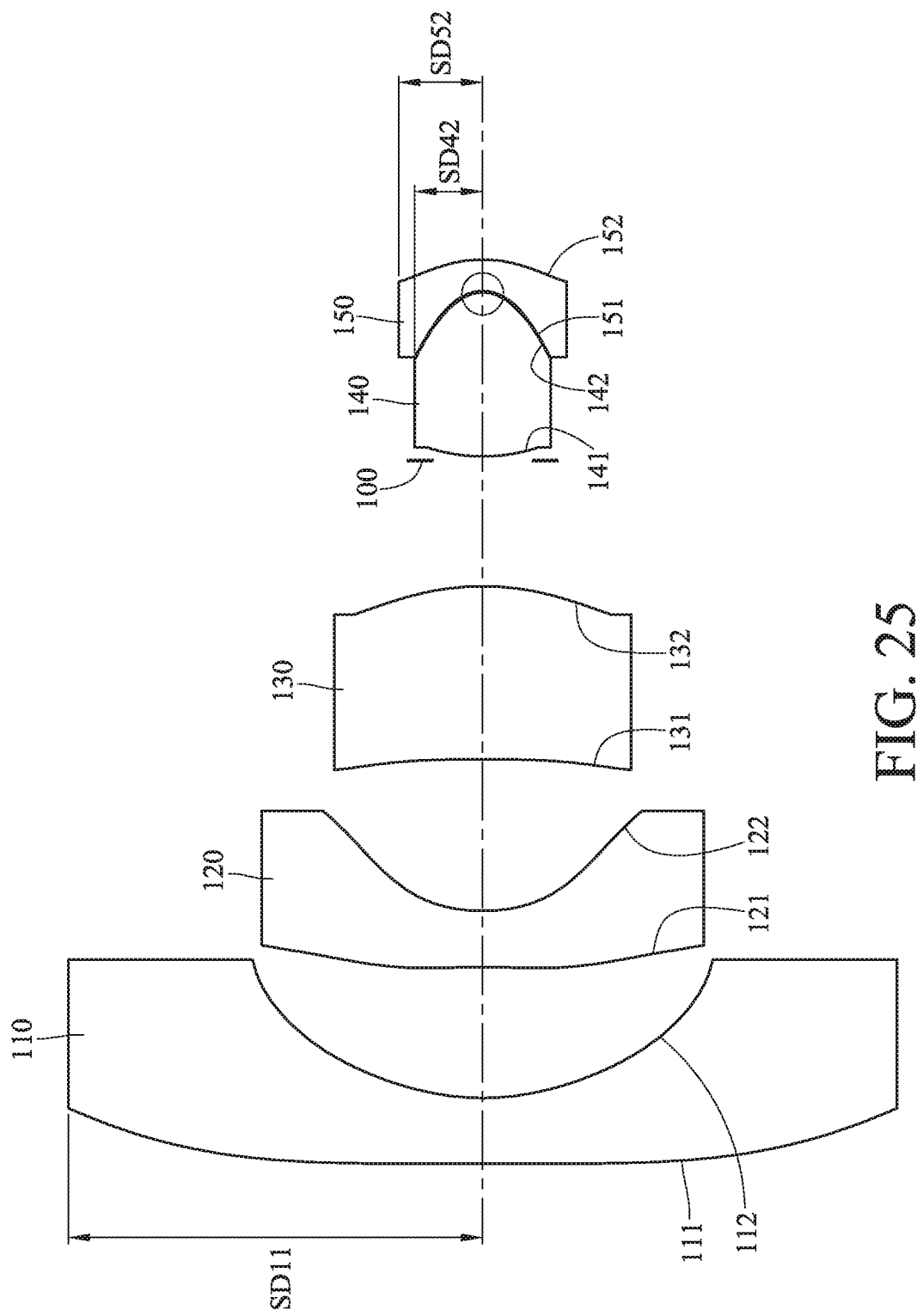
FIG. 25 shows a schematic view of SD11, SD42 and SD52 according to the 1st embodiment of the present disclosure.

When a maximum effective radius of an object-side surface of the first lens element is SD11, and a maximum effective radius of the image-side surface of the fifth lens element is SD52, the following condition can be satisfied: $0.08<\text{SD52}/\text{SD11}<0.32$. Therefore, a proper ratio of the effective diameters is favorable for providing a retro-focus configuration so as to enlarge the field of view of the optical imaging lens assembly for various applications. Please refer to FIG. 25, which shows a schematic view of SD11 and SD52 according to the 1st embodiment of the present disclosure.

When the axial distance between the first lens element and the second lens element is T12, and a central thickness of the fourth lens element is CT4, the following condition can be satisfied: $0.20<\text{T12}/\text{CT4}<1.70$. Therefore, a proper ratio of the central thickness of the fourth lens element to the axial distance between the first lens element and the second lens element is favorable for lens molding as well as increasing assembling yield rate. Preferably, the following condition can also be satisfied: $0.20<\text{T12}/\text{CT4}<1.20$.

When an Abbe number of the second lens element is V2, and an Abbe number of the third lens element is V3, the following condition can be satisfied: $0.10<\text{V3}/\text{V2}<0.60$. Therefore, the materials of the lens elements are properly selected so as to prevent f-theta (f-θ) distortion due to the optical imaging lens assembly having a wide field of view, thereby preventing image distortion.

Figure 26:
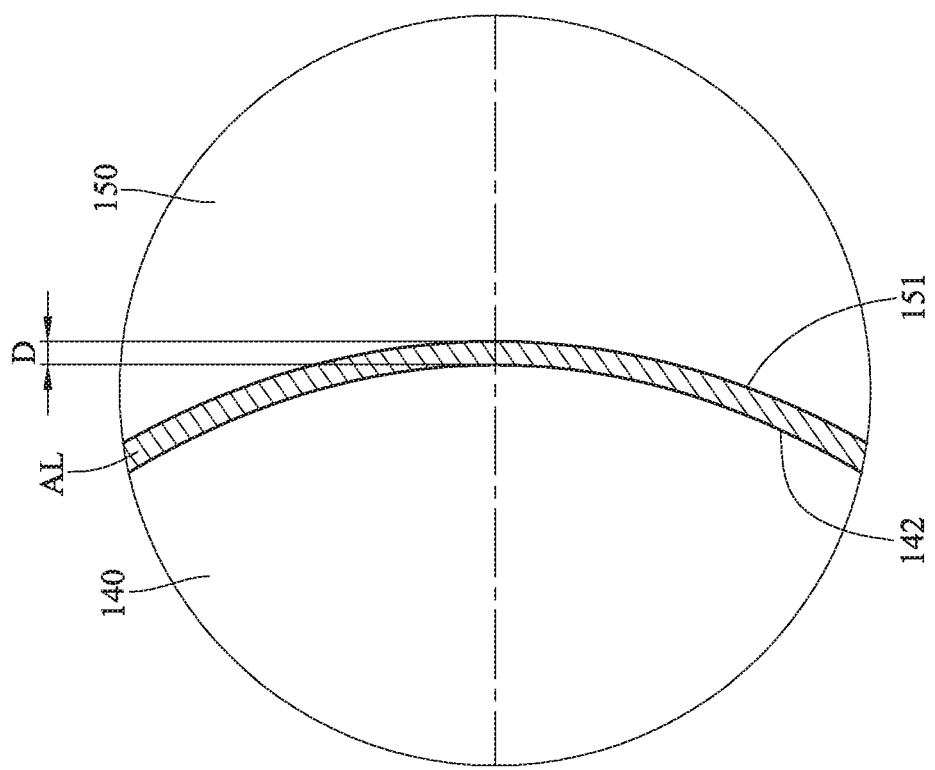
FIG. 26 shows a schematic view of a central thickness of an adhesive layer between the fourth lens element and the fifth lens element according to the 1st embodiment of the present disclosure.

According to the present disclosure, both the image-side surface of the fourth lens element and the object-side surface of the fifth lens element can be aspheric, and the fourth lens element and the fifth lens element can be cemented to each other. When the fourth lens element and the fifth lens element are cemented to each other, a central thickness of an adhesive layer between the image-side surface of the fourth lens element and the object-side surface of the fifth lens element is D, and the following condition can be satisfied: $0.015 \text{ [mm]} D<0.060 \text{ [mm]}$. Therefore, the fourth lens element and the fifth lens element being cemented to each other on their aspheric surfaces is favorable for reducing the influence of temperature variation on the optical imaging lens assembly and correcting off-axis aberrations. Please refer to FIG. 26, which shows an adhesive layer AL between an image-side surface 142 of a fourth lens element 140 and an object-side surface 151 of a fifth lens element 150, and the central thickness D of the adhesive layer AL, according to the 1st embodiment of the present disclosure.

When a refractive index of the fourth lens element is N4, and a refractive index of the fifth lens element is N5, the following condition can be satisfied: $3.0<\text{N4}+\text{N5}<3.30$. Therefore, proper materials of the fourth and the fifth lens elements are favorable for minimizing manufacturing cost and reducing the total track length.

When a maximum effective radius of the image-side surface of the fourth lens element is SD42, and a displacement in parallel with an optical axis from an axial vertex of the image-side surface of the fourth lens element to a maximum effective radius position of the image-side surface of the fourth lens element is SAG42, the following condition can be satisfied: $0.20<|\text{SD42}/\text{SAG42}|<1.50$. Therefore, the shape of the image-side surface of the fourth lens element is favorable for reducing stray light and correcting off-axis aberrations on the image side so as to improve the image quality. Please refer to FIG. 24 and FIG. 25, which respectively show a schematic view of SAG42 and SD42 according to the 1st embodiment of the present disclosure. When the direction from the axial vertex of one surface to the maximum effective radius position of the same surface is facing towards the image side of the optical imaging lens assembly, the value of SAG42 is positive; when the direction from the axial vertex of the surface to the maximum effective radius position of the same surface is facing towards the object side of the optical imaging lens assembly, the value of SAG42 is negative.

When the displacement in parallel with the optical axis from the axial vertex of the image-side surface of the fourth lens element to the maximum effective radius position of the image-side surface of the fourth lens element is SAG42, and a displacement in parallel with the optical axis from an axial vertex of the object-side surface of the fifth lens element to a maximum effective radius position of the object-side surface of the fifth lens element is SAG51, the following condition can be satisfied: $0.01 \text{ [mm]}<|\text{SAG42}-\text{SAG51}|\times 100<5.0 \text{ [mm]}$. Therefore, it is favorable for broadening the shape design flexibility of the lens surfaces and correcting off-axis aberrations. Preferably, the following condition can be satisfied: $0.01 \text{ [mm]}<|\text{SAG42}-\text{SAG51}|\times 100<3.0 \text{ [mm]}$. More preferably, the following condition can also be satisfied: $0.10 \text{ [mm]}<|\text{SAG42}-\text{SAG51}|\times 100<2.0 \text{ [mm]}$. Please refer to FIG. 24, which shows a schematic view of SAG42 and SAG51 according to the 1st embodiment of the present disclosure.

According to the present disclosure, the optical imaging lens assembly further includes an aperture stop. When an axial distance between the aperture stop and the object-side surface of the third lens element is Dsr5, and an axial distance between the aperture stop and the image-side surface of the third lens element is Dsr6, the following condition can be satisfied: $|\text{Dsr6}/\text{Dsr5}|<1.0$. Therefore, the position of the aperture stop is favorable for increasing image-sensing efficiency of the image sensor and maintaining sufficient field of view.

When a focal length of the first lens element is f1, the focal length of the second lens element is f2, and a focal length of the third lens element is f3, the following conditions can be satisfied: $|f2|<|f1|$; and $|f2|<|f3|$. Therefore, properly arranging the refractive power of the lens elements on the object side is favorable for obtaining the wide-angle lens configuration so as to become applicable to more types of applications.

When the focal length of the second lens element is f2, and a focal length of the fifth lens element is f5, the following condition can be satisfied: $0<f5/f2<0.85$. Therefore, it is favorable for allocating refractive power of a wide-angle lens configuration, such that the optical imaging lens assembly becomes applicable to a wide range of applications.

When the axial distance between the first lens element and the second lens element is T12, and an axial distance between the second lens element and the third lens element is T23, the following condition can be satisfied: $0<T12/T23<1.80$. Therefore, a proper ratio of axial distances between each adjacent lens element on the object side is favorable for efficiently utilizing the space in the optical imaging lens assembly and increasing assembling yield rate. Preferably, the following condition can also be satisfied: $0.10<T12/T23<1.50$.

When the Abbe number of the third lens element is V3, the following condition can be satisfied: $10.0<V3<24.0$. Therefore, it is favorable for correcting chromatic aberration and preventing image overlaps so as to improve the image quality.

When an axial distance between the object-side surface of the first lens element and the image-side surface of the fifth lens element is TD, and the axial distance between the second lens element and the third lens element is T23, the following condition can be satisfied: $2.0<TD/T23<8.0$. Therefore, it is favorable for reducing the total track length of the optical imaging lens assembly so as to achieve compactness and maintain high assembling yield rate.

When an axial distance between the image-side surface of the fifth lens element and an image surface is BL, and the central thickness of the fourth lens element is CT4, the following condition can be satisfied: $BL/CT4<1.80$. Therefore, it is favorable for reducing the back focal length and propagating light from the large field of view in the optical imaging lens assembly, thereby obtaining a balance among low sensitivity, compactness and high illuminance.

When a vertical distance between a non-axial inflection point closest to the optical axis on the object-side surface of the second lens element and the optical axis is Yp21, and the focal length of the optical imaging lens assembly is f, the following condition can be satisfied: $0<Yp21/f<1.50$. Therefore, the shape of the object-side surface of the second lens element is favorable for correcting aberrations generated by light from the large field of view, and reducing the total track length of the optical imaging lens assembly. Please refer to FIG. 23, which shows a schematic view of Yp21 according to the 1st embodiment of the present disclosure. According to the present disclosure, when the object-side surface of the second lens element has a single inflection point, Yp21 is a vertical distance between the inflection point and the optical axis. When the object-side surface of the second lens element has a plurality of inflection points, Yp21 is a vertical distance between one of the inflection points, which is closest to the optical axis, and the optical axis.

According to the present disclosure, an absolute value of the curvature radius of the image-side surface of the fourth lens element and an absolute value of a curvature radius of the object-side surface of the fifth lens element are both smaller than the absolute values of the curvature radii of the other lens surfaces of the five lens elements. That is, each of the image-side surface of the fourth lens element and the object-side surface of the fifth lens element has a smaller absolute value of curvature radius than the object-side surfaces and the image-side surfaces of the first through the third lens elements, the object-side surface of the fourth lens element, and the image-side surface of the fifth lens element. Therefore, a proper arrangement of the curvature radii of the lens surfaces of the five lens elements is favorable for correcting off-axis aberrations, increasing illuminance on the image surface and improving the image quality.

According to the present disclosure, the aforementioned features and conditions can be utilized in numerous combinations so as to achieve corresponding effects.

According to the present disclosure, the lens elements of the optical imaging lens assembly can be made of either glass or plastic material. When the lens elements are made of glass material, the refractive power distribution of the optical imaging lens assembly may be more flexible. The glass lens element can either be made by grinding or molding. When the lens elements are made of plastic material, the manufacturing cost can be effectively reduced. Furthermore, surfaces of each lens element can be arranged to be aspheric, which allows for more control variables for eliminating aberrations thereof, the required number of the lens elements can be reduced, and the total track length of the optical imaging lens assembly can be effectively shortened. The aspheric surfaces may be formed by plastic injection molding or glass molding.

According to the present disclosure, when a lens surface is aspheric, it means that the lens surface has an aspheric shape throughout its optically effective area, or a portion(s) thereof.

According to the present disclosure, each of an object-side surface and an image-side surface has a paraxial region and an off-axis region. The paraxial region refers to the region of the surface where light rays travel close to the optical axis, and the off-axis region refers to the region of the surface away from the paraxial region. Particularly, unless otherwise stated, when the lens element has a convex surface, it indicates that the surface is convex in the paraxial region thereof; when the lens element has a concave surface, it indicates that the surface is concave in the paraxial region thereof. Moreover, when a region of refractive power or focus of a lens element is not defined, it indicates that the region of refractive power or focus of the lens element is in the paraxial region thereof.

According to the present disclosure, an inflection point is a point on the surface of the lens element at which the surface changes from concave to convex, or vice versa.

According to the present disclosure, an image surface of the optical imaging lens assembly, based on the corresponding image sensor, can be flat or curved, especially a curved surface being concave facing towards the object side of the optical imaging lens assembly.

According to the present disclosure, an image correction unit, such as a field flattener, can be optionally disposed between the lens element closest to the image side of the optical imaging lens assembly and the image surface for correction of aberrations such as field curvature. The optical properties of the image correction unit, such as curvature, thickness, index of refraction, position and surface shape (convex or concave surface with spherical, aspheric, diffractive or Fresnel types), can be adjusted according to the specification of an image capturing unit. In general, a preferable image correction unit is, for example, a thin transparent element having a concave object-side surface and a planar image-side surface, and the thin transparent element is disposed near the image surface.

According to the present disclosure, the optical imaging lens assembly can include at least one stop, such as an aperture stop, a glare stop or a field stop. Said glare stop or said field stop is set for eliminating the stray light and thereby improving the image quality thereof.

According to the present disclosure, an aperture stop can be configured as a front stop or a middle stop. A front stop disposed between an imaged object and the first lens element can provide a longer distance between an exit pupil of the optical imaging lens assembly and the image surface to produce a telecentric effect, and thereby improves the image-sensing efficiency of an image sensor (for example, CCD or CMOS). A middle stop disposed between the first lens element and the image surface is favorable for enlarging the viewing angle of the optical imaging lens assembly and thereby provides a wider field of view for the same.

According to the present disclosure, an image capturing unit includes the aforementioned optical imaging lens assembly and an image sensor, wherein the image sensor is disposed on the image surface of the optical imaging lens assembly. In some embodiments, the image capturing unit can further include a barrel, a holder member or a combination thereof.

Figure 27:
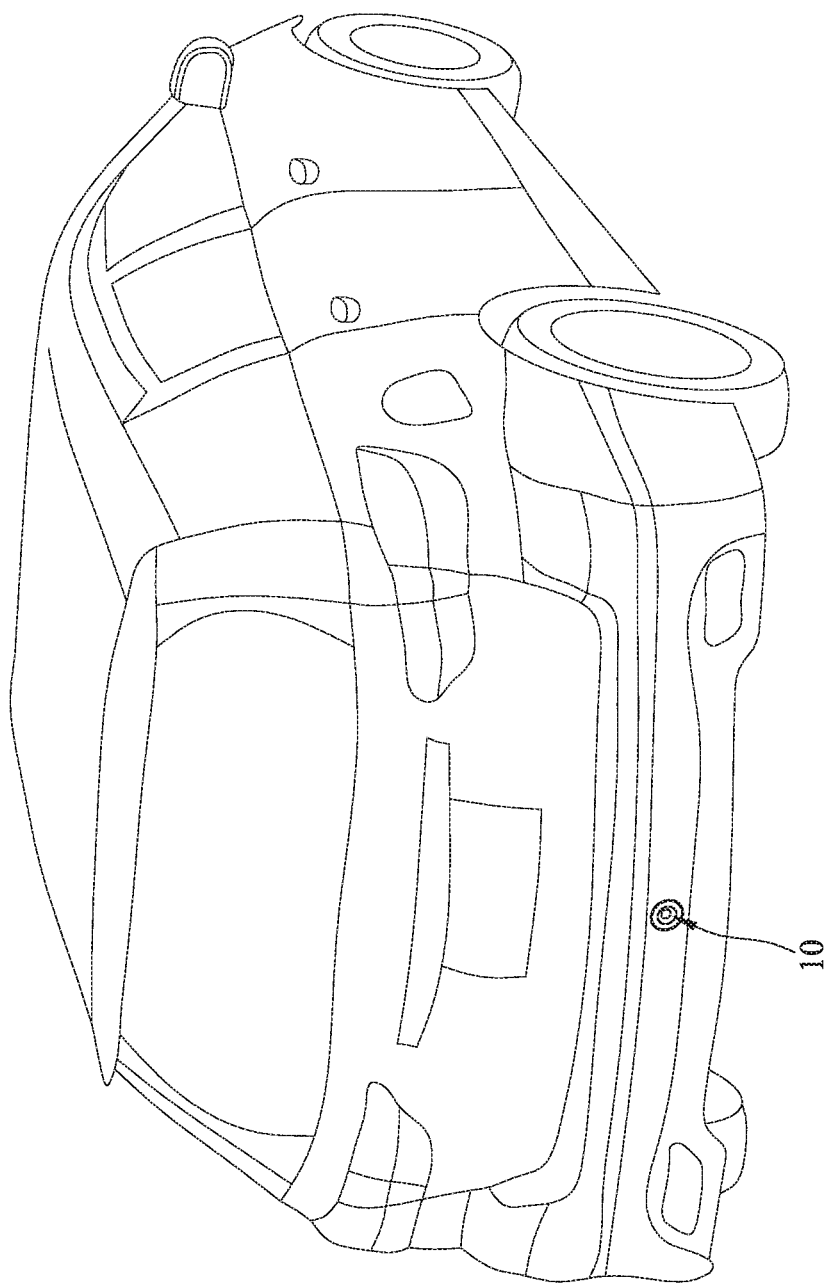
FIG. 27 shows an electronic device according to one embodiment.
Figure 28:
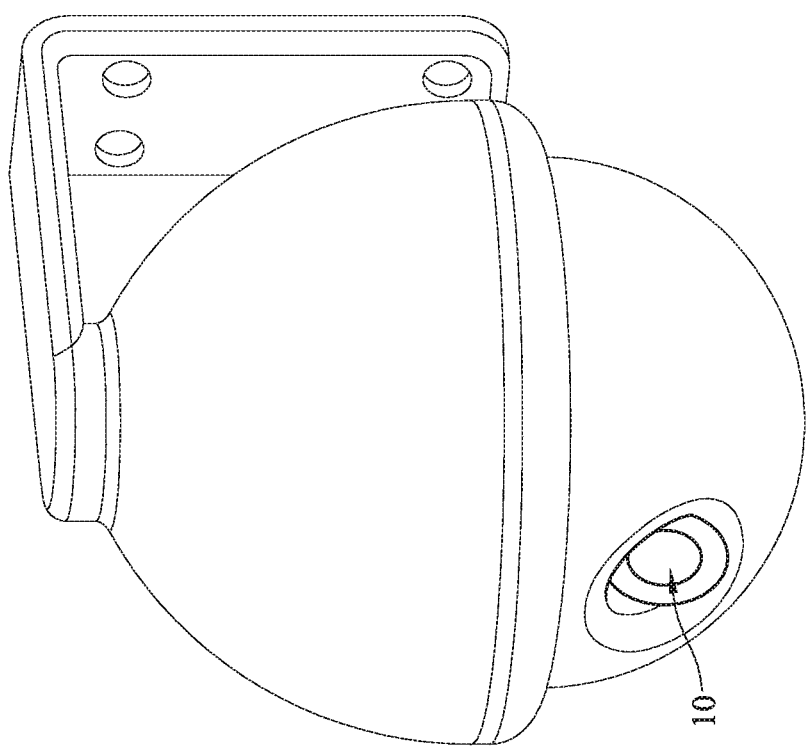
FIG. 28 shows an electronic device according to another embodiment.
Figure 29:
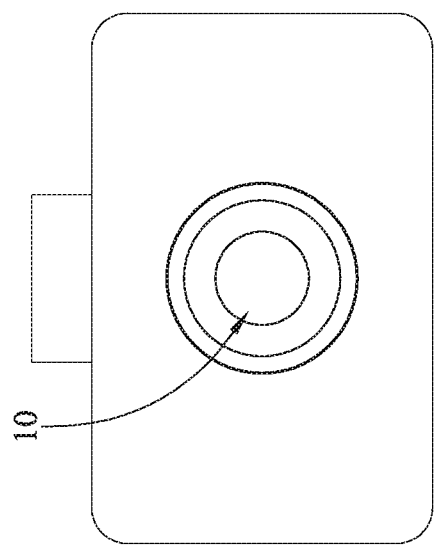
FIG. 29 shows an electronic device according to still another embodiment.

According to the present disclosure, the aforementioned image capturing unit may be installed in, but not limited to, an electronic device. Please refer to FIG. 27, FIG. 28 and FIG. 29, an image capturing unit 10 can be applied to electronic devices, such as a vehicle backup camera (FIG. 27), a network surveillance device (FIG. 28) or a dashboard camera (FIG. 29). In some embodiments, the electronic device can further include, but not limited to, a control unit, a display unit, a storage unit, a random access memory unit (RAM), a read only memory unit (ROM) or a combination thereof.

According to the present disclosure, the optical imaging lens assembly can be optionally applied to optical systems with a movable focus. Furthermore, the optical imaging lens assembly features good capability in aberration corrections and high image quality, and can be applied to 3D (three-dimensional) image capturing applications, in products, such as advanced driver assistance systems (ADAS), lane departure warning systems (LDWS), blind spot detection systems, multiple lens devices, smart phones, smart televisions, digital cameras, drones, sport cameras, mobile devices, digital tablets, network surveillance devices, motion sensing input devices, wearable devices and other electronic imaging devices. The aforementioned electronic devices are only exemplary for showing the image capturing unit of the present disclosure installed in an electronic device and are not limited thereto.

According to the above description of the present disclosure, the following specific embodiments are provided for further explanation.

1st Embodiment

Figure 1:
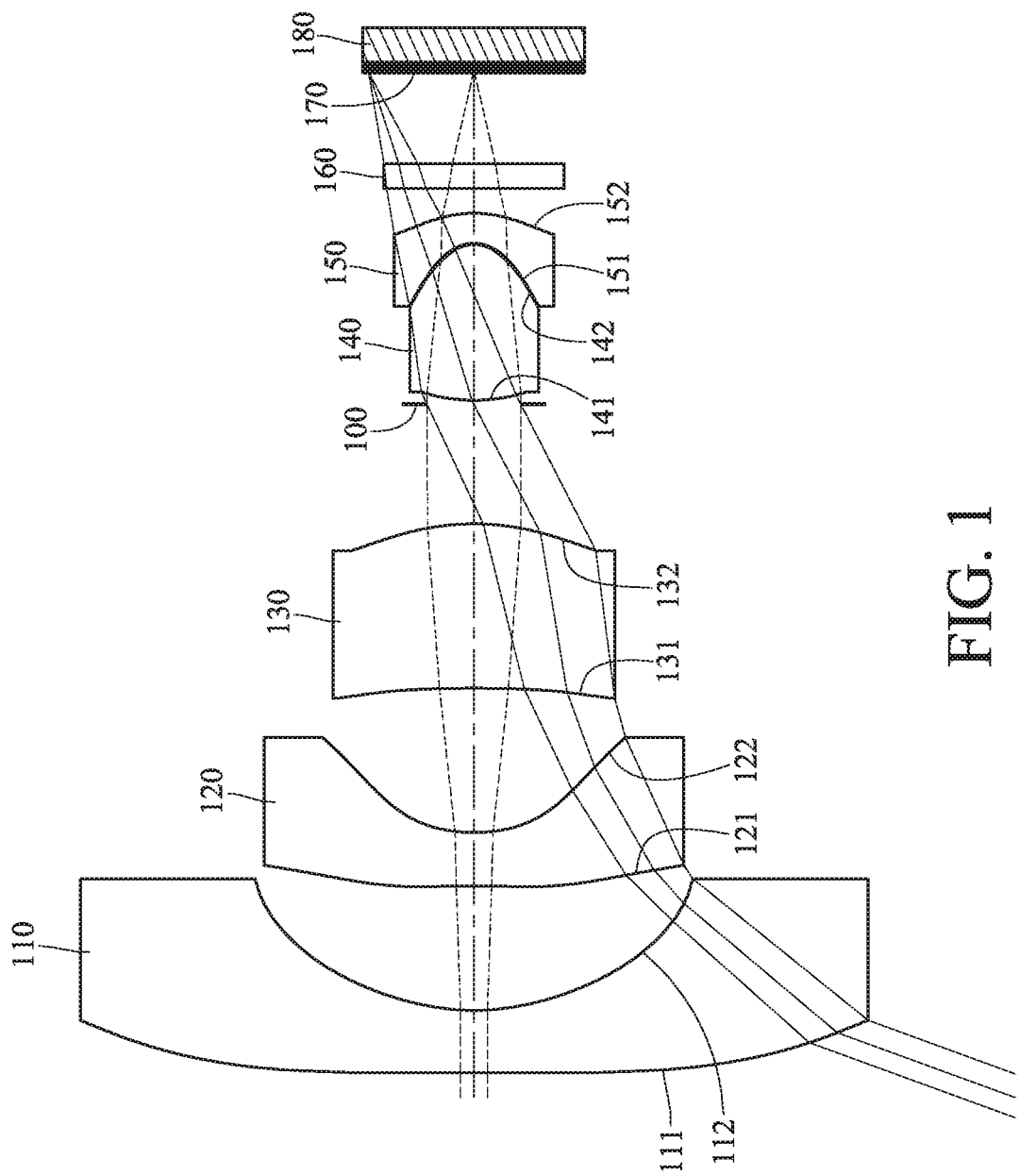
FIG. 1 is a schematic view of an image capturing unit according to the 1st embodiment of the present disclosure.
Figure 2:
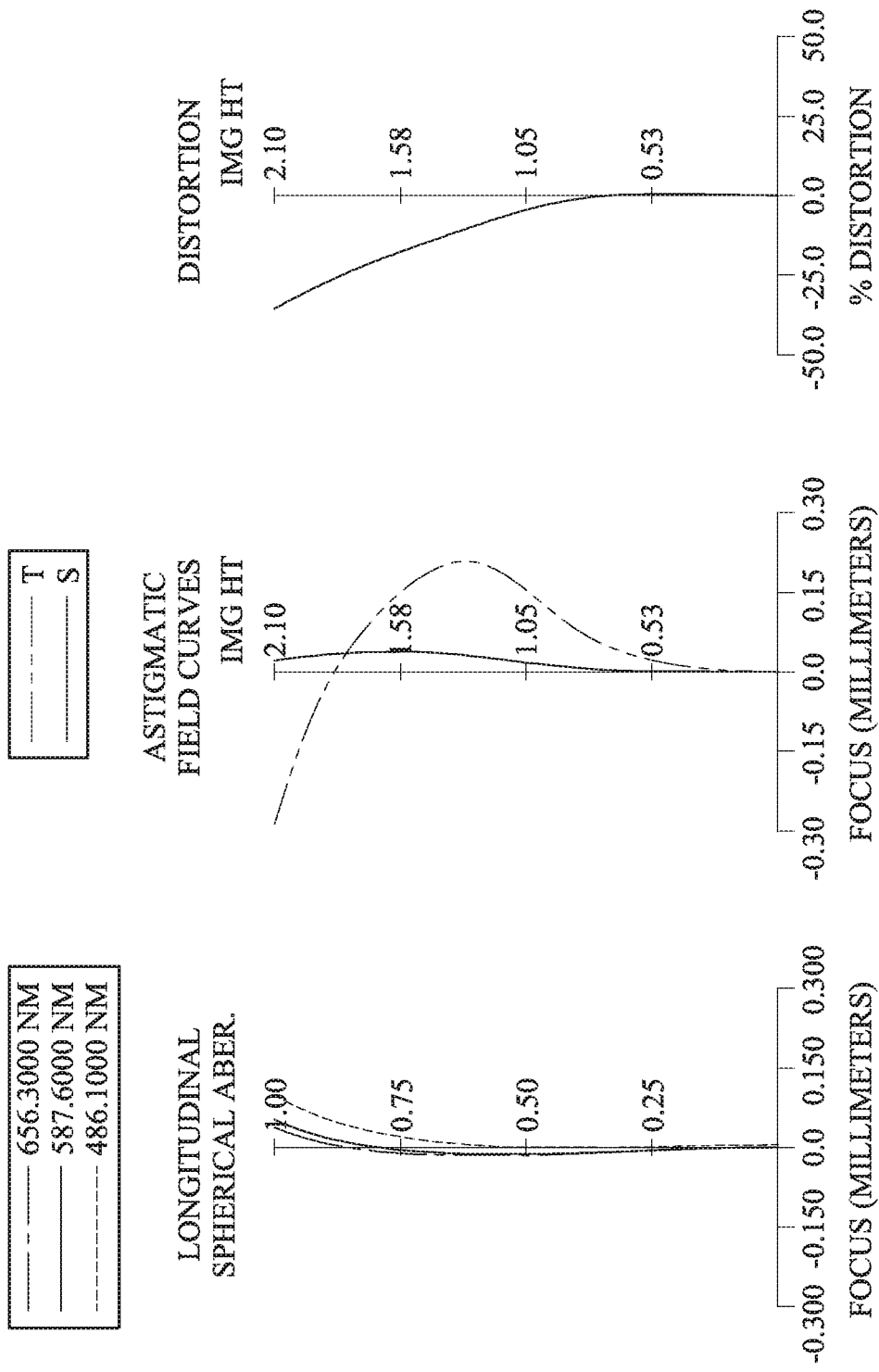
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the optical imaging lens assembly (its reference numeral is omitted) of the present disclosure and an image sensor 180. The optical imaging lens assembly includes, in order from an object side to an image side, a first lens element 110, a second lens element 120, a third lens element 130, an aperture stop 100, a fourth lens element 140, a fifth lens element 150, a filter 160 and an image surface 170. The optical imaging lens assembly includes five lens elements (110, 120, 130, 140 and 150) with no additional lens element disposed between each of the adjacent five lens elements.

The first lens element 110 with negative refractive power has an object-side surface 111 being concave in a paraxial region thereof and an image-side surface 112 being concave in a paraxial region thereof. The first lens element 110 is made of plastic material and has the object-side surface 111 and the image-side surface 112 being both aspheric.

The second lens element 120 with negative refractive power has an object-side surface 121 being concave in a paraxial region thereof and an image-side surface 122 being concave in a paraxial region thereof. The second lens element 120 is made of plastic material and has the object-side surface 121 and the image-side surface 122 being both aspheric. The object-side surface 121 of the second lens element 120 has at least one inflection point.

The third lens element 130 with positive refractive power has an object-side surface 131 being concave in a paraxial region thereof and an image-side surface 132 being convex in a paraxial region thereof. The third lens element 130 is made of plastic material and has the object-side surface 131 and the image-side surface 132 being both aspheric.

The fourth lens element 140 with positive refractive power has an object-side surface 141 being convex in a paraxial region thereof and an image-side surface 142 being convex in a paraxial region thereof. The fourth lens element 140 is made of plastic material and has the object-side surface 141 and the image-side surface 142 being both aspheric. The image-side surface 142 of the fourth lens element 140 has at least one inflection point.

The fifth lens element 150 with negative refractive power has an object-side surface 151 being concave in a paraxial region thereof and an image-side surface 152 being convex in a paraxial region thereof. The fifth lens element 150 is made of plastic material and has the object-side surface 151 and the image-side surface 152 being both aspheric. The object-side surface 151 of the fifth lens element 150 has at least one inflection point. The object-side surface 151 of the fifth lens element 150 and the image-side surface 142 of the fourth lens element 140 are cemented to each other.

The filter 160 is made of glass material and located between the fifth lens element 150 and the image surface 170, and will not affect the focal length of the optical imaging lens assembly. The image sensor 180 is disposed on or near the image surface 170 of the optical imaging lens assembly.

In this embodiment, an absolute value of a curvature radius of the image-side surface 142 of the fourth lens element 140 and an absolute value of a curvature radius of the object-side surface 151 of the fifth lens element 150 are both smaller than the absolute values of the curvature radii of the other lens surfaces (111-141 and 152) of the five lens elements. In detail, the absolute value of the curvature radius of the image-side surface 142 of the fourth lens element 140 is 0.670, and the absolute value of the curvature radius of the object-side surface 151 of the fifth lens element 150 is 0.745.

The equation of the aspheric surface profiles of the aforementioned lens elements of the 1st embodiment is expressed as follows:

$$X(Y) = (Y^2/R)/(1 + sqrt(1-(1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10 and 12.

In the optical imaging lens assembly of the image capturing unit according to the 1st embodiment, when a focal length of the optical imaging lens assembly is f, an f-number of the optical imaging lens assembly is Fno, and half of a maximum field of view of the optical imaging lens assembly is HFOV, these parameters have the following values: f=1.19 millimeters (mm), Fno=2.20, HFOV=69.9 degrees (deg.).

When half of the maximum field of view of the optical imaging lens assembly is HFOV, the following condition is satisfied: 1/|tan(HFOV)|=0.37.

When an Abbe number of the third lens element 130 is V3, the following condition is satisfied: V3=22.5.

When an Abbe number of the second lens element 120 is V2, and the Abbe number of the third lens element 130 is V3, the following condition is satisfied: V3/V2=0.40.

When a refractive index of the fourth lens element 140 is N4, and a refractive index of the fifth lens element 150 is N5, the following condition is satisfied: N4+N5=3.186.

When a curvature radius of the object-side surface 121 of the second lens element 120 is R3, and a curvature radius of the image-side surface 122 of the second lens element 120 is R4, the following condition is satisfied: (R3+R4)/(R3−R4)=0.68.

When a curvature radius of the object-side surface 131 of the third lens element 130 is R5, and a curvature radius of the image-side surface 132 of the third lens element 130 is R6, the following condition is satisfied: (R5+R6)/(R5−R6)=1.36.

When a curvature radius of the object-side surface 141 of the fourth lens element 140 is R7, and a curvature radius of the image-side surface 152 of the fifth lens element 150 is R10, the following condition is satisfied: (R7+R10)/(R7−R10)=0.20.

When the curvature radius of the image-side surface 142 of the fourth lens element 140 is R8, and the focal length of the optical imaging lens assembly is f, the following condition is satisfied: |R8/f|=0.56.

When the curvature radius of the image-side surface 142 of the fourth lens element 140 is R8, and an axial distance between the third lens element 130 and the fourth lens element 140 is T34, the following condition is satisfied: |R8/T34|=0.27. In this embodiment, an axial distance between two adjacent lens elements is an air gap in a paraxial region between the two adjacent lens elements.

When an axial distance between the first lens element 110 and the second lens element 120 is T12, and a central thickness of the third lens element 130 is CT3, the following condition is satisfied: T12/CT3=0.76.

When the axial distance between the first lens element 110 and the second lens element 120 is T12, and a central thickness of the fourth lens element 140 is CT4, the following condition is satisfied: T12/CT4=0.80.

When the axial distance between the first lens element 110 and the second lens element 120 is T12, and an axial distance between the second lens element 120 and the third lens element 130 is T23, the following condition is satisfied: T12/T23=0.86.

When the focal length of the optical imaging lens assembly is f, and the axial distance between the third lens element 130 and the fourth lens element 140 is T34, the following condition is satisfied: f/T34=0.48.

When a focal length of the second lens element 120 is f2, and a focal length of the fourth lens element 140 is f4, the following condition is satisfied: |f4/f2|=0.27.

When the focal length of the second lens element 120 is f2, and a focal length of the fifth lens element 150 is f5, the following condition is satisfied: f5/f2=0.38.

When the focal length of the optical imaging lens assembly is f, and an entrance pupil diameter of the optical imaging lens assembly is EPD, the following condition is satisfied: f/EPD=2.20.

When the central thickness of the fourth lens element 140 is CT4, and an axial distance between the image-side surface 152 of the fifth lens element 150 and the image surface 170 is BL, the following condition is satisfied: BL/CT4=0.90.

When an axial distance between the object-side surface 111 of the first lens element 110 and the image-side surface 152 of the fifth lens element 150 is TD, and the axial distance between the second lens element 120 and the third lens element 130 is T23, the following condition is satisfied: TD/T23=5.96.

When a displacement in parallel with an optical axis from an axial vertex of the image-side surface 142 of the fourth lens element 140 to a maximum effective radius position of the image-side surface 142 of the fourth lens element 140 is SAG42, and a displacement in parallel with the optical axis from an axial vertex of the object-side surface 151 of the fifth lens element 150 to a maximum effective radius position of the object-side surface 151 of the fifth lens element 150 is SAG51, the following condition is satisfied: |SAG42−SAG51|×100=1.073 [mm].

When an axial distance between the aperture stop 100 and the object-side surface 131 of the third lens element 130 is Dsr5, and an axial distance between the aperture stop 100 and the image-side surface 132 of the third lens element 130 is Dsr6, the following condition is satisfied: |Dsr6/Dsr5|=0.42.

When a maximum effective radius of the object-side surface 111 of the first lens element 110 is SD11, and a maximum effective radius of the image-side surface 152 of the fifth lens element 150 is SD52, the following condition is satisfied: SD52/SD11=0.20.

When a maximum effective radius of the image-side surface 142 of the fourth lens element 140 is SD42, and the displacement in parallel with the optical axis from the axial vertex of the image-side surface 142 of the fourth lens element 140 to the maximum effective radius position of the image-side surface 142 of the fourth lens element 140 is SAG42, the following condition is satisfied: |SD42/SAG42|=1.02.

When a vertical distance between a non-axial inflection point closest to the optical axis on the object-side surface 121 of the second lens element 120 and the optical axis is Yp21, and the focal length of the optical imaging lens assembly is f, the following condition is satisfied: Yp21/f=0.50.

When a central thickness of an adhesive layer between the image-side surface 142 of the fourth lens element 140 and the object-side surface 151 of the fifth lens element 150 is D, the following condition is satisfied: D=0.025 [mm].

The detailed optical data of the 1st embodiment are shown in Table 1 and the aspheric surface data are shown in Table 2 below.

TABLE 1

1st Embodiment
f = 1.19 mm, Fno = 2.20, HFOV = 69.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −523.963 | (ASP) | 1.250 | Plastic | 1.566 | 37.4 | −8.18 |
| 2 | | 4.677 | (ASP) | 2.490 | | | | |
| 3 | Lens 2 | −17.770 | (ASP) | 1.072 | Plastic | 1.544 | 55.9 | −5.19 |
| 4 | | 3.427 | (ASP) | 2.889 | | | | |
| 5 | Lens 3 | −32.238 | (ASP) | 3.291 | Plastic | 1.642 | 22.5 | 8.58 |
| 6 | | −4.891 | (ASP) | 2.395 | | | | |
| 7 | Ape. Stop | Plano | | 0.079 | | | | |
| 8 | Lens 4 | 3.560 | (ASP) | 3.119 | Plastic | 1.544 | 55.9 | 1.40 |
| 9 | | −0.670 | (ASP) | 0.025 | Cemented | 1.485 | 53.2 | |
| 10 | Lens 5 | −0.745 | (ASP) | 0.600 | Plastic | 1.642 | 22.5 | −1.97 |
| 11 | | −2.392 | (ASP) | 0.491 | | | | |
| 12 | Filter | Plano | | 0.500 | Glass | 1.517 | 64.2 | — |
| 13 | | Plano | | 1.817 | | | | |
| 14 | Image | Plano | | — | | | | |

Note:
Reference wavelength is 587.6 nm (d-line).

TABLE 2

Aspheric Coefficients

| | Surface # | | | | |
|---|---|---|---|---|---|
| | 1 | 2 | 3 | 4 | 5 |
| k = | −3.6483E+01 | 1.0765E−01 | −8.6985E+01 | −5.7328E−01 | 9.4141E+01 |
| A4 = | 3.7445E−04 | −4.0223E−03 | 1.3392E−02 | 2.3501E−02 | −2.7428E−03 |
| A6 = | −5.6721E−07 | 2.0805E−04 | −1.5725E−03 | −6.0727E−04 | 1.8510E−04 |
| A8 = | −2.4174E−08 | −4.0476E−06 | 8.8202E−05 | −4.3127E−04 | −4.4674E−06 |
| A10 = | 2.9848E−10 | −1.1912E−07 | −2.4324E−06 | 3.7892E−05 | 1.7261E−06 |
| A12 = | −1.8936E−12 | 5.1969E−14 | 2.6095E−08 | −8.2606E−07 | — |

| | Surface # | | | | |
|---|---|---|---|---|---|
| | 6 | 8 | 9 | 10 | 11 |
| k = | −1.3151E+00 | 4.8729E−02 | −7.9424E−01 | −1.1772E+00 | −1.6686E+00 |
| A4 = | 3.9884E−04 | 9.4141E−03 | 8.9877E−03 | −1.9670E−01 | −4.5404E−03 |
| A6 = | 2.2525E−04 | −4.2860E−03 | 1.5386E−01 | 7.8157E−02 | 7.6619E−03 |
| A8 = | −2.0022E−05 | 4.0386E−03 | −4.8958E−02 | 4.1198E−02 | −7.6761E−04 |
| A10 = | 3.0443E−06 | −1.7678E−03 | −3.9009E−02 | −2.3648E−02 | 9.0943E−05 |
| A12 = | — | — | 2.5476E−02 | 9.3746E−03 | — |

In Table 1, the curvature radius, the thickness and the focal length are shown in millimeters (mm). Surface numbers 0-14 represent the surfaces sequentially arranged from the object side to the image side along the optical axis. In Table 2, k represents the conic coefficient of the equation of the aspheric surface profiles. A4-A12 represent the aspheric coefficients ranging from the 4th order to the 12th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
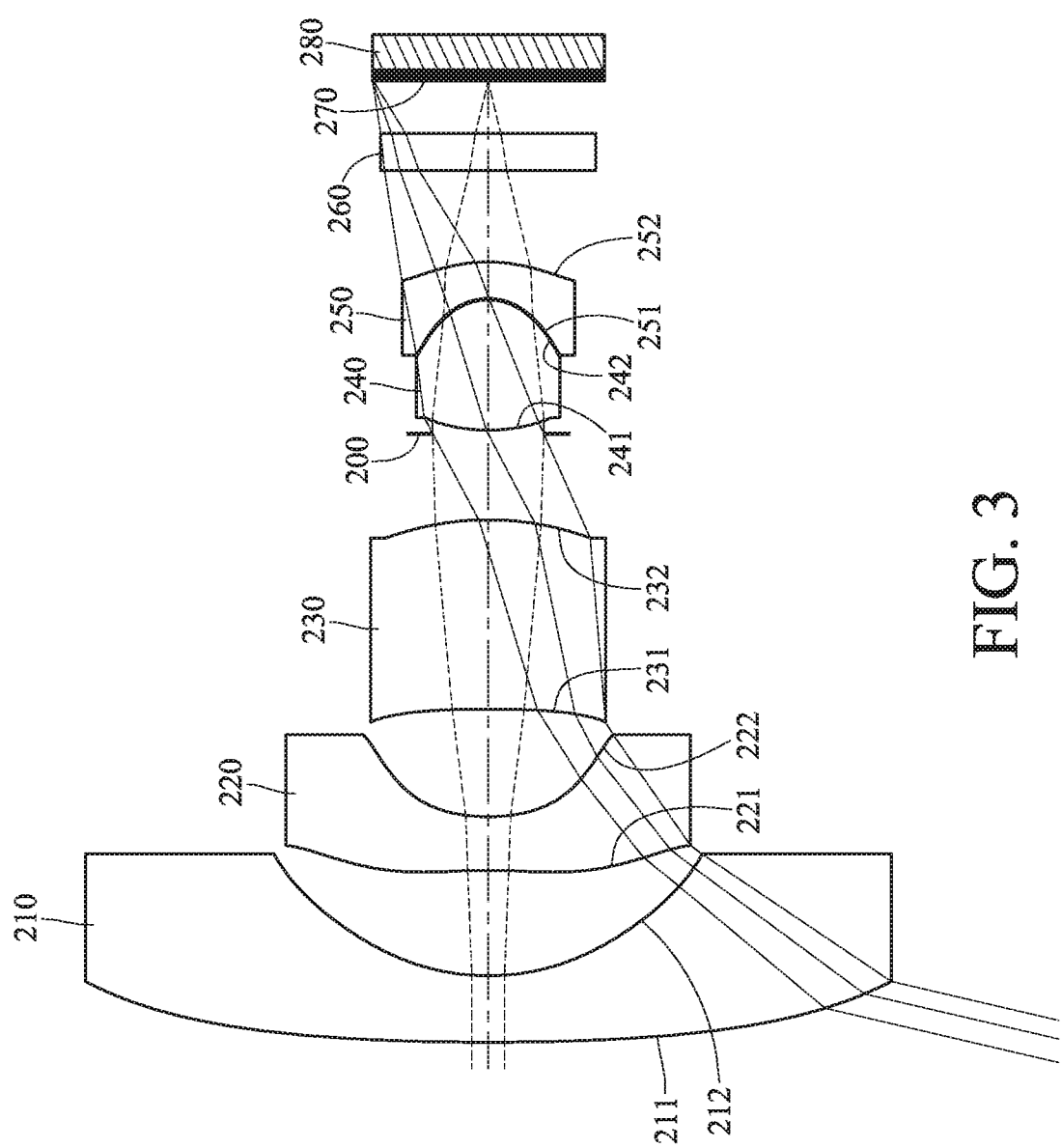
FIG. 3 is a schematic view of an image capturing unit according to the 2nd embodiment of the present disclosure.
Figure 4:
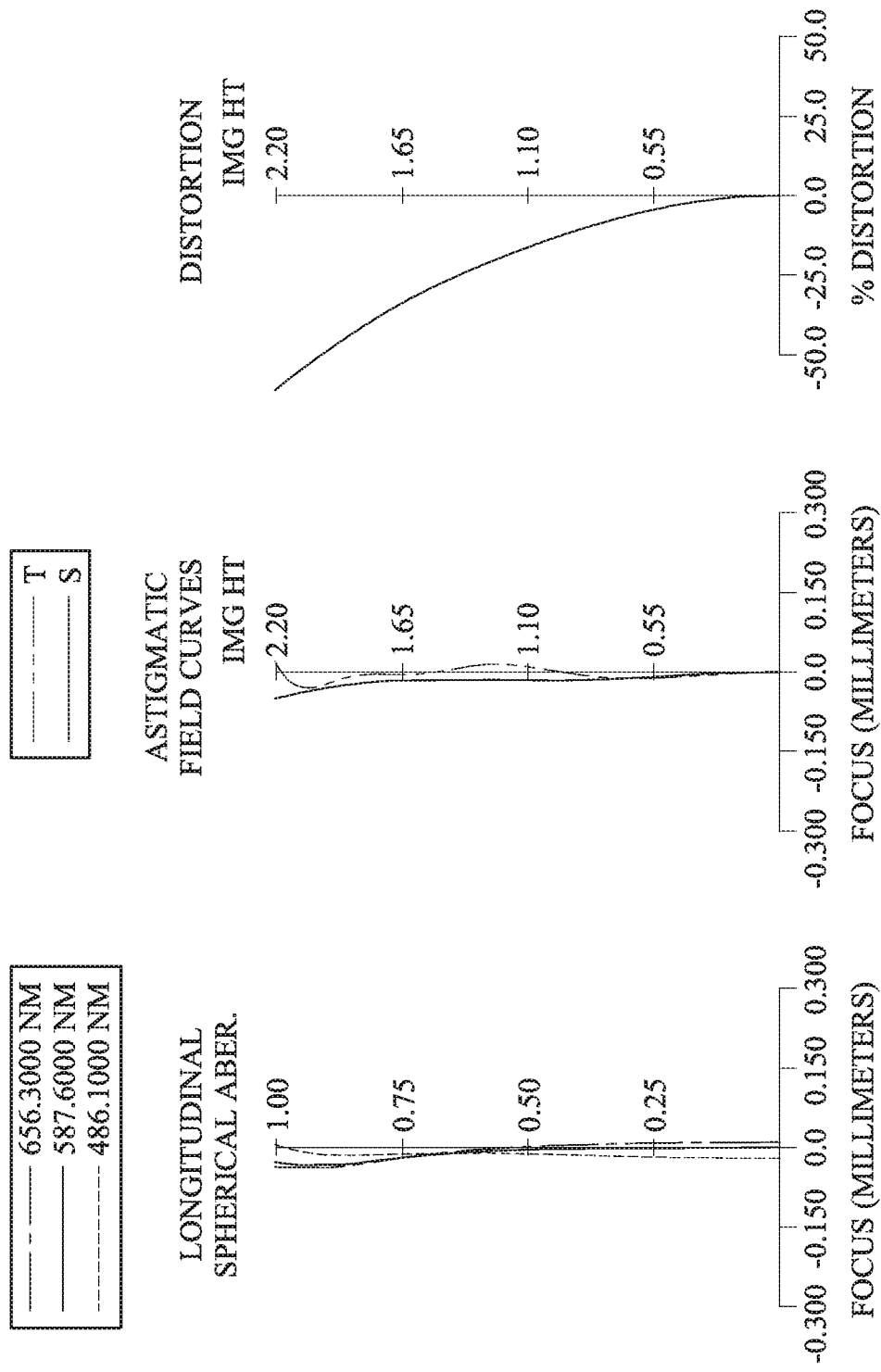
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the optical imaging lens assembly (its reference numeral is omitted) of the present disclosure and an image sensor 280. The optical imaging lens assembly includes, in order from an object side to an image side, a first lens element 210, a second lens element 220, a third lens element 230, an aperture stop 200, a fourth lens element 240, a fifth lens element 250, a filter 260 and an image surface 270. The optical imaging lens assembly includes five lens elements (210, 220, 230, 240 and 250) with no additional lens element disposed between each of the adjacent five lens elements.

The first lens element 210 with negative refractive power has an object-side surface 211 being convex in a paraxial region thereof and an image-side surface 212 being concave in a paraxial region thereof. The first lens element 210 is made of glass material and has the object-side surface 211 and the image-side surface 212 being both aspheric.

The second lens element 220 with negative refractive power has an object-side surface 221 being concave in a paraxial region thereof and an image-side surface 222 being concave in a paraxial region thereof. The second lens element 220 is made of plastic material and has the object-side surface 221 and the image-side surface 222 being both aspheric. The object-side surface 221 of the second lens element 220 has at least one inflection point.

The third lens element 230 with positive refractive power has an object-side surface 231 being concave in a paraxial region thereof and an image-side surface 232 being convex in a paraxial region thereof. The third lens element 230 is made of plastic material and has the object-side surface 231 and the image-side surface 232 being both aspheric.

The fourth lens element 240 with positive refractive power has an object-side surface 241 being convex in a paraxial region thereof and an image-side surface 242 being convex in a paraxial region thereof. The fourth lens element 240 is made of plastic material and has the object-side surface 241 and the image-side surface 242 being both aspheric. The image-side surface 242 of the fourth lens element 240 has at least one inflection point.

The fifth lens element 250 with negative refractive power has an object-side surface 251 being concave in a paraxial region thereof and an image-side surface 252 being convex in a paraxial region thereof. The fifth lens element 250 is made of plastic material and has the object-side surface 251 and the image-side surface 252 being both aspheric. The object-side surface 251 of the fifth lens element 250 has at least one inflection point. The object-side surface 251 of the fifth lens element 250 and the image-side surface 242 of the fourth lens element 240 are cemented to each other.

The filter 260 is made of glass material and located between the fifth lens element 250 and the image surface 270, and will not affect the focal length of the optical imaging lens assembly. The image sensor 280 is disposed on or near the image surface 270 of the optical imaging lens assembly.

In this embodiment, an absolute value of a curvature radius of the image-side surface 242 of the fourth lens element 240 and an absolute value of a curvature radius of the object-side surface 251 of the fifth lens element 250 are both smaller than the absolute values of the curvature radii of the other lens surfaces (211-241 and 252) of the five lens elements. In detail, the absolute value of the curvature radius of the image-side surface 242 of the fourth lens element 240 is 1.133, and the absolute value of the curvature radius of the object-side surface 251 of the fifth lens element 250 is 1.134.

The detailed optical data of the 2nd embodiment are shown in Table 3 and the aspheric surface data are shown in Table 4 below.

TABLE 3

2nd Embodiment
f = 1.32 mm, Fno = 2.10, HFOV = 76.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 57.349 (ASP) | 1.262 | Glass | 1.587 | 61.3 | −8.05 |
| 2 | | 4.329 (ASP) | 2.006 | | | | |
| 3 | Lens 2 | −11.054 (ASP) | 1.022 | Plastic | 1.544 | 56.0 | −4.76 |
| 4 | | 3.494 (ASP) | 2.047 | | | | |
| 5 | Lens 3 | −22.945 (ASP) | 3.600 | Plastic | 1.669 | 19.5 | 10.20 |
| 6 | | −5.590 (ASP) | 1.641 | | | | |
| 7 | Ape. Stop | Plano | 0.065 | | | | |
| 8 | Lens 4 | 3.298 (ASP) | 2.476 | Plastic | 1.544 | 56.0 | 1.93 |
| 9 | | −1.133 (ASP) | 0.030 | Cemented | 1.485 | 53.2 | |
| 10 | Lens 5 | −1.134 (ASP) | 0.692 | Plastic | 1.639 | 23.5 | −3.26 |
| 11 | | −3.080 (ASP) | 1.740 | | | | |
| 12 | Filter | Plano | 0.700 | Glass | 1.517 | 64.2 | — |
| 13 | | Plano | 1.003 | | | | |
| 14 | Image | Plano | — | | | | |

Note:
Reference wavelength is 587.6 nm (d-line).

TABLE 4

Aspheric Coefficients

| | Surface # | | | | |
|---|---|---|---|---|---|
| | 1 | 2 | 3 | 4 | 5 |
| k = | 4.4730E+00 | −3.3000E−01 | −9.8979E+01 | 5.0713E−01 | 9.5630E+01 |
| A4 = | 1.7965E−04 | 4.6578E−04 | 1.2006E−02 | 1.9670E−02 | −3.8915E−03 |
| A6 = | −1.5965E−06 | −2.5709E−05 | −1.1286E−03 | −4.9483E−04 | 2.3199E−04 |
| A8 = | 4.2501E−08 | −1.2212E−05 | 7.3309E−05 | 7.7724E−04 | −1.5501E−05 |
| A10 = | −2.4147E−10 | 7.1465E−07 | −3.3628E−06 | −5.7737E−05 | −8.9198E−07 |
| A12 = | — | — | 6.3603E−08 | −1.4906E−05 | — |

| | Surface # | | | | |
|---|---|---|---|---|---|
| | 6 | 8 | 9 | 10 | 11 |
| k = | 2.3947E−01 | −2.9710E+00 | −4.0967E−01 | −8.2539E−01 | −1.1547E+00 |
| A4 = | −1.0483E−04 | 1.4046E−02 | −9.6365E−02 | −1.2059E−01 | −1.4479E−03 |

TABLE 4-continued

| Aspheric Coefficients | | | | |
|---|---|---|---|---|
| A6 = | −2.2288E−04 | −1.8439E−03 | 9.8575E−02 | 9.2014E−02 | 9.1620E−03 |
| A8 = | 2.1848E−04 | 3.3785E−03 | 1.6837E−02 | −3.1057E−02 | −3.1946E−03 |
| A10 = | −3.1931E−05 | −1.2218E−03 | −6.5328E−02 | −1.7678E−02 | 5.2352E−04 |
| A12 = | — | — | 2.5476E−02 | 9.3746E−03 | — |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.32 | T12/T23 | 0.98 |
| Fno | 2.10 | f/T34 | 0.77 |
| HFOV [deg.] | 76.9 | |f4/f2| | 0.41 |
| 1/|tan(HFOV)| | 0.23 | f5/f2 | 0.69 |
| V3 | 19.5 | f/EPD | 2.10 |
| V3/V2 | 0.35 | BL/CT4 | 1.39 |
| N4 + N5 | 3.183 | TD/T23 | 7.25 |
| (R3 + R4)/(R3 − R4) | 0.52 | |SAG42 − SAG51| × 100 [mm] | 0.017 |
| (R5 + R6)/(R5 − R6) | 1.64 | |Dsr6/Dsr5| | 0.31 |
| (R7 + R10)/(R7 − R10) | 0.03 | SD52/SD11 | 0.21 |
| |R8/f| | 0.86 | |SD42/SAG42| | 1.26 |
| |R8/T34| | 0.66 | Yp21/f | 0.51 |
| T12/CT3 | 0.56 | D [mm] | 0.030 |
| T12/CT4 | 0.81 | — | — |

3rd Embodiment

Figure 5:
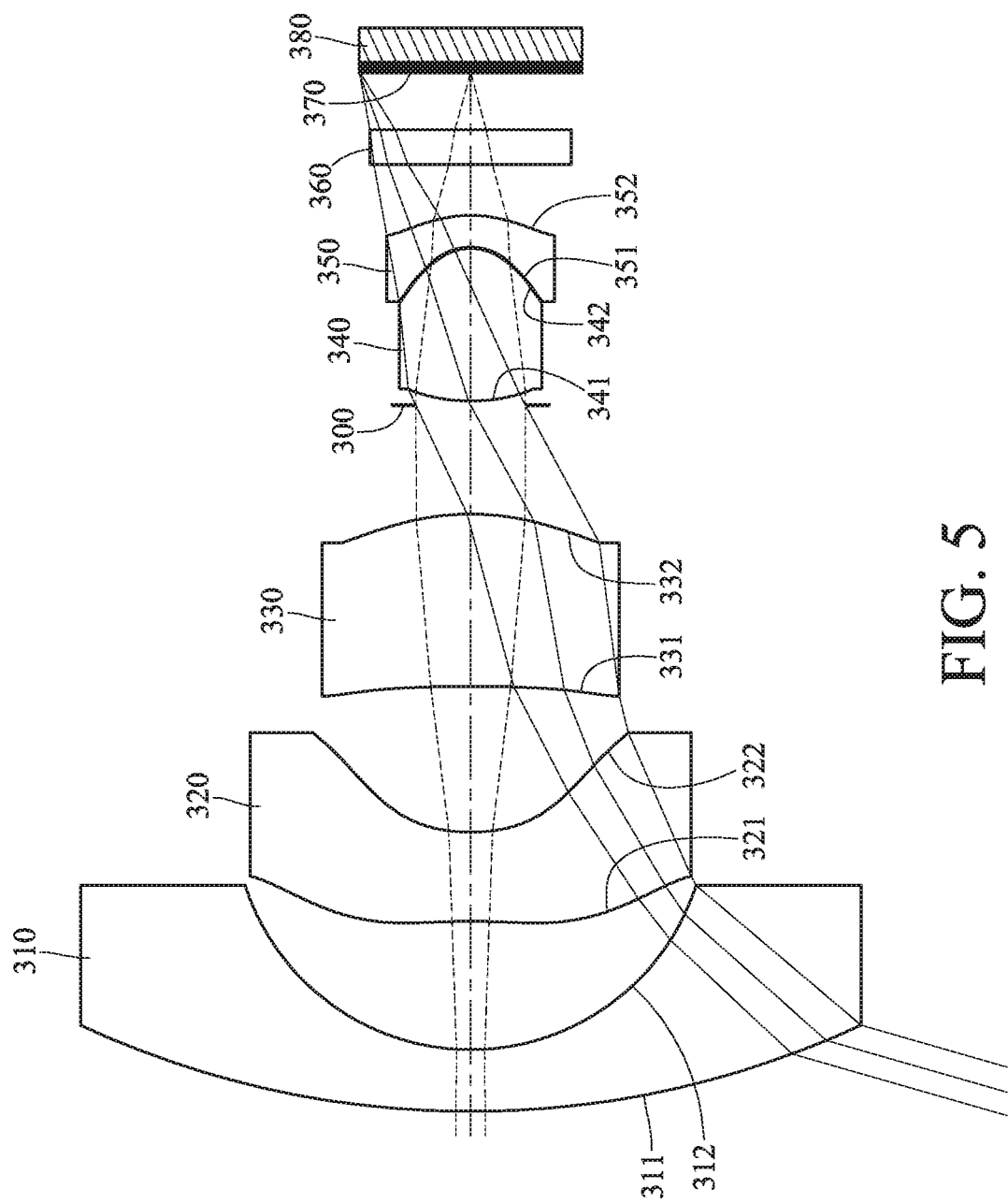
FIG. 5 is a schematic view of an image capturing unit according to the 3rd embodiment of the present disclosure.
Figure 6:
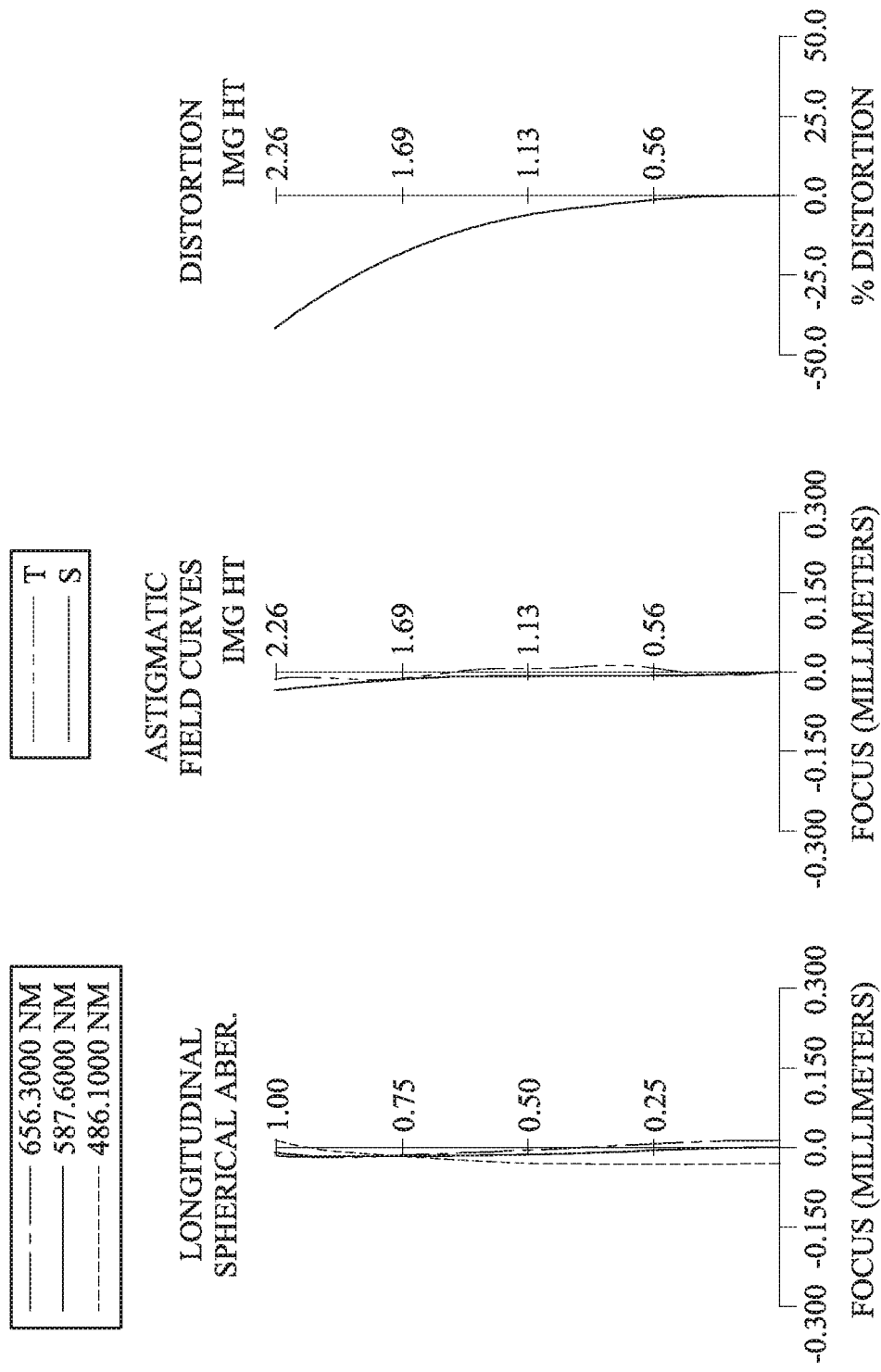
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the optical imaging lens assembly (its reference numeral is omitted) of the present disclosure and an image sensor 380. The optical imaging lens assembly includes, in order from an object side to an image side, a first lens element 310, a second lens element 320, a third lens element 330, an aperture stop 300, a fourth lens element 340, a fifth lens element 350, a filter 360 and an image surface 370. The optical imaging lens assembly includes five lens elements (310, 320, 330, 340 and 350) with no additional lens element disposed between each of the adjacent five lens elements.

The first lens element 310 with negative refractive power has an object-side surface 311 being convex in a paraxial region thereof and an image-side surface 312 being concave in a paraxial region thereof. The first lens element 310 is made of glass material and has the object-side surface 311 and the image-side surface 312 being both spherical.

The second lens element 320 with negative refractive power has an object-side surface 321 being concave in a paraxial region thereof and an image-side surface 322 being concave in a paraxial region thereof. The second lens element 320 is made of plastic material and has the object-side surface 321 and the image-side surface 322 being both aspheric. The object-side surface 321 of the second lens element 320 has at least one inflection point.

The third lens element 330 with positive refractive power has an object-side surface 331 being concave in a paraxial region thereof and an image-side surface 332 being convex in a paraxial region thereof. The third lens element 330 is made of plastic material and has the object-side surface 331 and the image-side surface 332 being both aspheric.

The fourth lens element 340 with positive refractive power has an object-side surface 341 being convex in a paraxial region thereof and an image-side surface 342 being convex in a paraxial region thereof. The fourth lens element 340 is made of plastic material and has the object-side surface 341 and the image-side surface 342 being both aspheric. The image-side surface 342 of the fourth lens element 340 has at least one inflection point.

The fifth lens element 350 with negative refractive power has an object-side surface 351 being concave in a paraxial region thereof and an image-side surface 352 being convex in a paraxial region thereof. The fifth lens element 350 is made of plastic material and has the object-side surface 351 and the image-side surface 352 being both aspheric. The object-side surface 351 of the fifth lens element 350 has at least one inflection point. The object-side surface 351 of the fifth lens element 350 and the image-side surface 342 of the fourth lens element 340 are cemented to each other.

The filter 360 is made of glass material and located between the fifth lens element 350 and the image surface 370, and will not affect the focal length of the optical imaging lens assembly. The image sensor 380 is disposed on or near the image surface 370 of the optical imaging lens assembly.

In this embodiment, an absolute value of a curvature radius of the image-side surface 342 of the fourth lens element 340 and an absolute value of a curvature radius of the object-side surface 351 of the fifth lens element 350 are both smaller than the absolute values of the curvature radii of the other lens surfaces (311-341 and 352) of the five lens elements. In detail, the absolute value of the curvature radius of the image-side surface 342 of the fourth lens element 340 is 1.146, and the absolute value of the curvature radius of the object-side surface 351 of the fifth lens element 350 is 1.166.

The detailed optical data of the 3rd embodiment are shown in Table 5 and the aspheric surface data are shown in Table 6 below.

TABLE 5

3rd Embodiment
f = 1.11 mm, Fno = 1.88, HFOV = 74.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 18.677 | 1.250 | Glass | 1.806 | 40.7 | −8.31 |
| 2 | | 4.785 | 2.600 | | | | |
| 3 | Lens 2 | −9.734 (ASP) | 1.799 | Plastic | 1.544 | 56.0 | −4.68 |
| 4 | | 3.672 (ASP) | 2.950 | | | | |
| 5 | Lens 3 | −33.220 (ASP) | 3.484 | Plastic | 1.669 | 19.5 | 8.49 |
| 6 | | −5.054 (ASP) | 2.204 | | | | |
| 7 | Ape. Stop | Plano | 0.081 | | | | |
| 8 | Lens 4 | 3.647 (ASP) | 3.085 | Plastic | 1.544 | 56.0 | 2.07 |
| 9 | | −1.146 (ASP) | 0.030 | Cemented | 1.485 | 53.2 | |
| 10 | Lens 5 | −1.166 (ASP) | 0.639 | Plastic | 1.669 | 19.5 | −3.74 |
| 11 | | −2.665 (ASP) | 1.025 | | | | |
| 12 | Filter | Plano | 0.700 | Glass | 1.517 | 64.2 | — |
| 13 | | Plano | 1.154 | | | | |
| 14 | Image | Plano | — | | | | |

Note:
Reference wavelength is 587.6 nm (d-line).

TABLE 6

Aspheric Coefficients

| | Surface # | | | |
|---|---|---|---|---|
| | 3 | 4 | 5 | 6 |
| k = | −9.9000E+01 | −1.0166E+00 | 9.9000E+01 | −1.9916E+00 |
| A4 = | 1.1118E−02 | 2.4142E−02 | −1.2170E−03 | 4.3732E−04 |
| A6 = | −8.1204E−04 | −2.2362E−04 | −1.6025E−05 | 2.8503E−05 |
| A8 = | 4.0026E−05 | −4.4367E−04 | −1.7877E−07 | 2.9292E−06 |
| A10 = | −1.3199E−06 | 3.7059E−05 | 1.6693E−06 | 1.0212E−06 |
| A12 = | 1.7939E−08 | −8.2585E−07 | — | — |

| | Surface # | | | |
|---|---|---|---|---|
| | 8 | 9 | 10 | 11 |
| k = | −2.5858E+00 | −4.3412E−01 | −4.7674E−01 | −1.1811E+00 |
| A4 = | 1.4357E−02 | −2.5104E−01 | −1.4888E−01 | −3.8271E−03 |
| A6 = | −3.2525E−03 | 3.3742E−01 | 1.4250E−01 | 9.3515E−03 |
| A8 = | 3.1849E−03 | −7.9090E−02 | −1.5477E−02 | −1.5086E−03 |
| A10 = | −9.8900E−04 | −5.8084E−02 | −2.4926E−02 | 1.7255E−04 |
| A12 = | — | 2.5476E−02 | 9.3746E−03 | — |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.11 | T12/T23 | 0.88 |
| Fno | 1.88 | f/T34 | 0.48 |
| HFOV [deg.] | 74.0 | |f4/f2| | 0.44 |
| 1/|tan(HFOV)| | 0.29 | f5/f2 | 0.80 |
| V3 | 19.5 | f/EPD | 1.88 |
| V3/V2 | 0.35 | BL/CT4 | 0.93 |
| N4 + N5 | 3.213 | TD/T23 | 6.14 |

| 3rd Embodiment | | | |
|---|---|---|---|
| (R3 + R4)/(R3 − R4) | 0.45 | |SAG42 − SAG51| × 100 [mm] | 0.015 |
| (R5 + R6)/(R5 − R6) | 1.36 | |Dsr6/Dsr5| | 0.39 |
| (R7 + R10)/(R7 − R10) | 0.16 | SD52/SD11 | 0.21 |
| |R8/f| | 1.04 | |SD42/SAG42| | 1.31 |
| |R8/T34| | 0.50 | Yp21/f | 0.62 |
| T12/CT3 | 0.75 | D [mm] | 0.030 |
| T12/CT4 | 0.84 | — | — |

4th Embodiment

Figure 7:
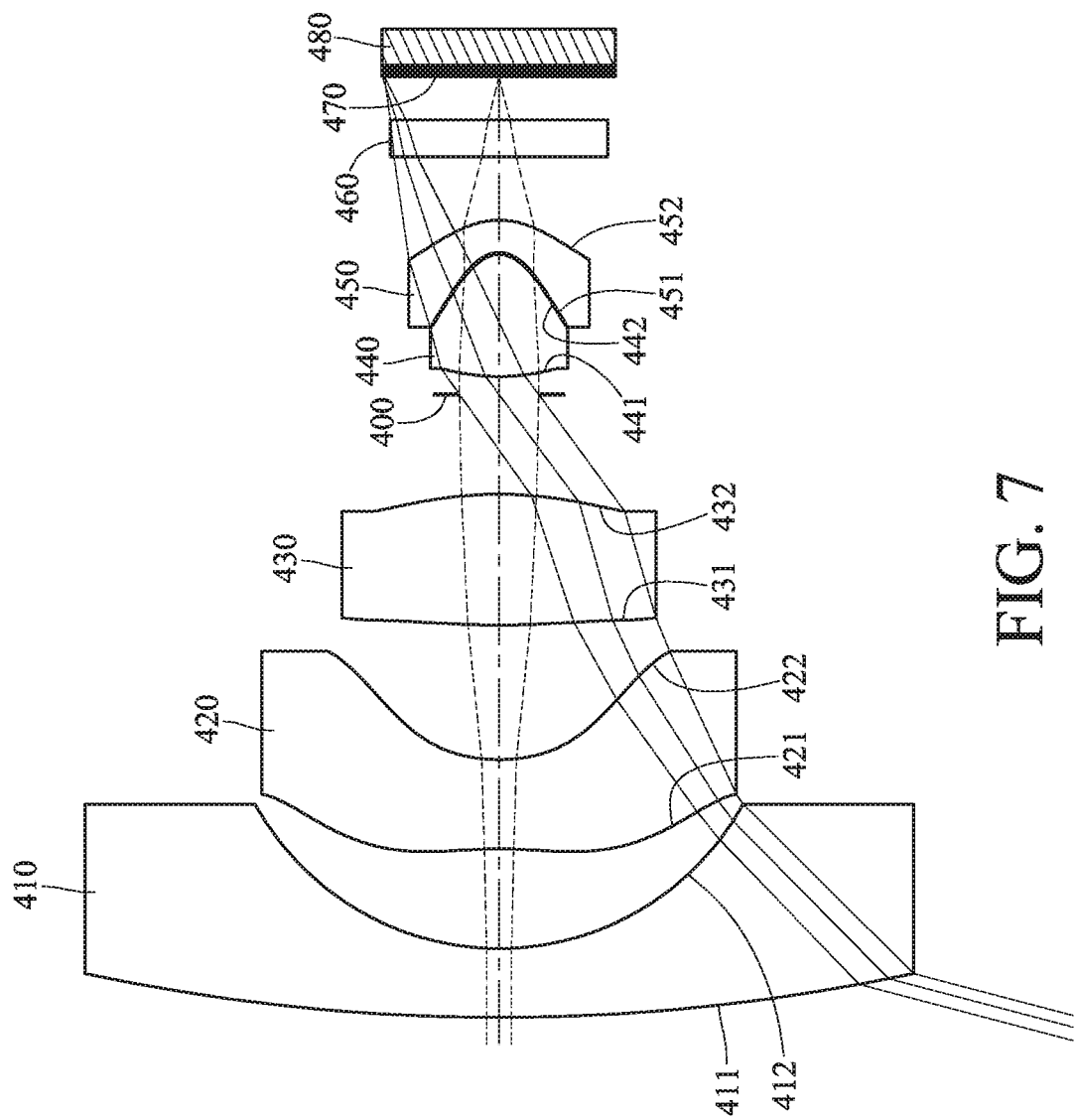
FIG. 7 is a schematic view of an image capturing unit according to the 4th embodiment of the present disclosure.
Figure 8:
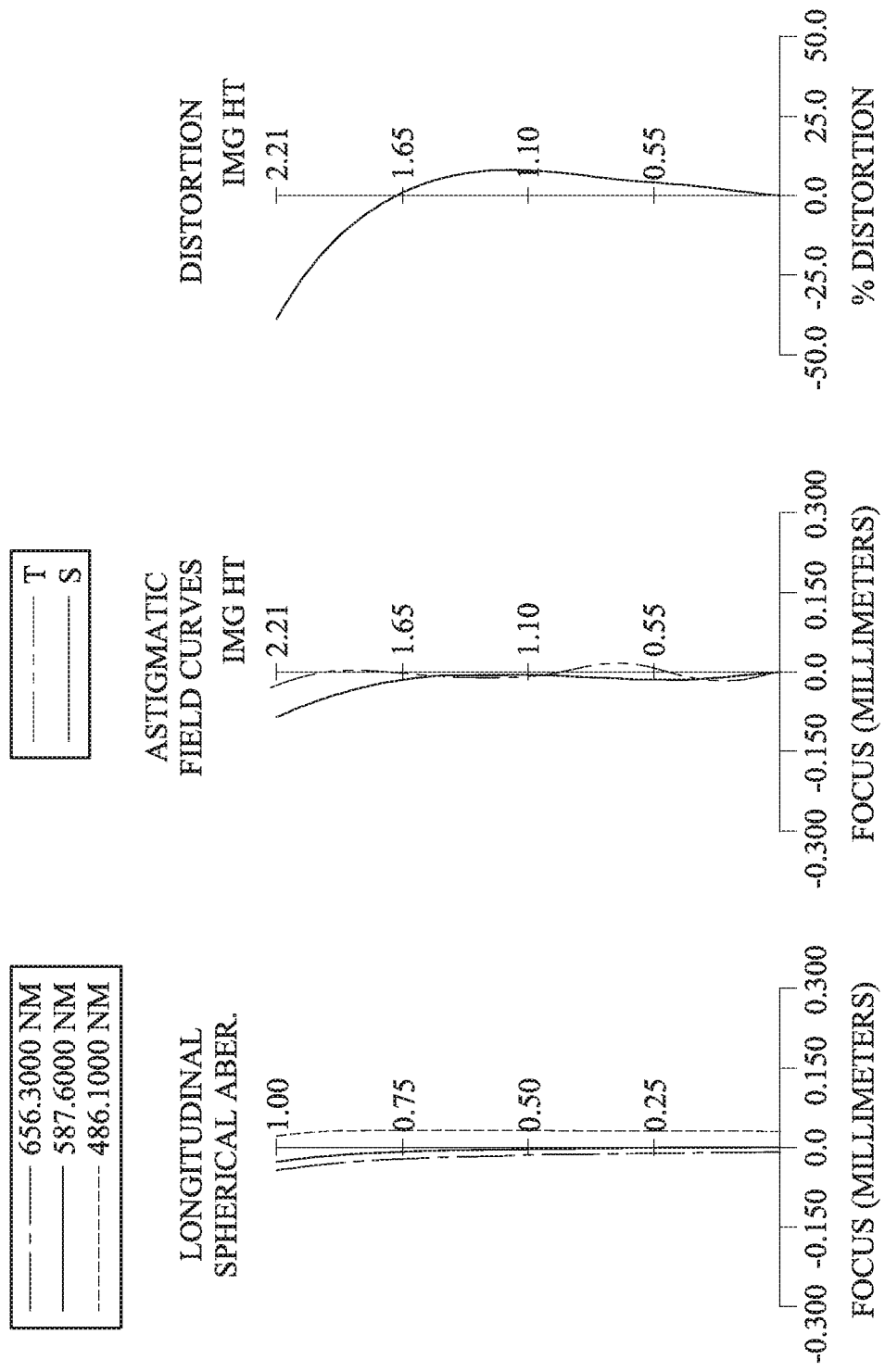
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the optical imaging lens assembly (its reference numeral is omitted) of the present disclosure and an image sensor 480. The optical imaging lens assembly includes, in order from an object side to an image side, a first lens element 410, a second lens element 420, a third lens element 430, an aperture stop 400, a fourth lens element 440, a fifth lens element 450, a filter 460 and an image surface 470. The optical imaging lens assembly includes five lens elements (410, 420, 430, 440 and 450) with no additional lens element disposed between each of the adjacent five lens elements.

The first lens element 410 with negative refractive power has an object-side surface 411 being convex in a paraxial region thereof and an image-side surface 412 being concave in a paraxial region thereof. The first lens element 410 is made of glass material and has the object-side surface 411 and the image-side surface 412 being both spherical.

The second lens element 420 with negative refractive power has an object-side surface 421 being concave in a paraxial region thereof and an image-side surface 422 being concave in a paraxial region thereof. The second lens element 420 is made of plastic material and has the object-side surface 421 and the image-side surface 422 being both aspheric. The object-side surface 421 of the second lens element 420 has at least one inflection point.

The third lens element 430 with positive refractive power has an object-side surface 431 being convex in a paraxial region thereof and an image-side surface 432 being convex in a paraxial region thereof. The third lens element 430 is made of plastic material and has the object-side surface 431 and the image-side surface 432 being both aspheric.

The fourth lens element 440 with positive refractive power has an object-side surface 441 being convex in a paraxial region thereof and an image-side surface 442 being convex in a paraxial region thereof. The fourth lens element 440 is made of plastic material and has the object-side surface 441 and the image-side surface 442 being both aspheric. The image-side surface 442 of the fourth lens element 440 has at least one inflection point.

The fifth lens element 450 with negative refractive power has an object-side surface 451 being concave in a paraxial region thereof and an image-side surface 452 being convex in a paraxial region thereof. The fifth lens element 450 is made of plastic material and has the object-side surface 451 and the image-side surface 452 being both aspheric. The object-side surface 451 of the fifth lens element 450 has at least one inflection point. The object-side surface 451 of the fifth lens element 450 and the image-side surface 442 of the fourth lens element 440 are cemented to each other.

The filter 460 is made of glass material and located between the fifth lens element 450 and the image surface 470, and will not affect the focal length of the optical imaging lens assembly. The image sensor 480 is disposed on or near the image surface 470 of the optical imaging lens assembly.

In this embodiment, an absolute value of a curvature radius of the image-side surface 442 of the fourth lens element 440 and an absolute value of a curvature radius of the object-side surface 451 of the fifth lens element 450 are both smaller than the absolute values of the curvature radii of the other lens surfaces (411-441 and 452) of the five lens elements. In detail, the absolute value of the curvature radius of the image-side surface 442 of the fourth lens element 440 is 0.507, and the absolute value of the curvature radius of the object-side surface 451 of the fifth lens element 450 is 0.518.

The detailed optical data of the 4th embodiment are shown in Table 7 and the aspheric surface data are shown in Table 8 below.

TABLE 7

4th Embodiment f = 0.95 mm, Fno = 2.00, HFOV = 75.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 37.239 | 1.303 | Glass | 1.639 | 55.4 | −9.74 |
| 2 | | 5.256 | 1.887 | | | | |
| 3 | Lens 2 | −6.634 (ASP) | 1.686 | Plastic | 1.544 | 55.9 | −3.80 |
| 4 | | 3.266 (ASP) | 2.546 | | | | |
| 5 | Lens 3 | 15.608 (ASP) | 2.470 | Plastic | 1.639 | 23.3 | 8.18 |
| 6 | | −7.375 (ASP) | 1.888 | | | | |
| 7 | Ape. Stop | Plano | 0.341 | | | | |
| 8 | Lens 4 | 3.929 (ASP) | 2.305 | Plastic | 1.544 | 55.9 | 1.01 |
| 9 | | −0.507 (ASP) | 0.040 | Cemented | 1.485 | 53.2 | |
| 10 | Lens 5 | −0.518 (ASP) | 0.611 | Plastic | 1.639 | 23.5 | −1.70 |
| 11 | | −1.450 (ASP) | 1.200 | | | | |
| 12 | Filter | Plano | 0.700 | Glass | 1.517 | 64.2 | — |
| 13 | | Plano | 0.806 | | | | |
| 14 | Image | Plano | — | | | | |

Note:

Reference wavelength is 587.6 nm (d-line).

TABLE 8

Aspheric Coefficients

| Surface # | | | | |
|---|---|---|---|---|
| | 3 | 4 | 5 | 6 |
| k = | −8.0771E+01 | −9.5353E−01 | −3.8476E+01 | −1.7067E+00 |
| A4 = | 1.1521E−02 | 2.3017E−02 | −3.0672E−03 | 1.2486E−03 |
| A6 = | −7.8122E−04 | −2.0463E−04 | 2.6031E−04 | −2.2357E−04 |
| A8 = | 4.0106E−05 | −4.4213E−04 | −1.4023E−05 | 6.7902E−05 |
| A10 = | −1.3892E−06 | 3.6104E−05 | 1.0161E−06 | −2.7438E−06 |
| A12 = | 1.7547E−08 | −8.2554E−07 | — | — |

| Surface # | | | | |
|---|---|---|---|---|
| | 8 | 9 | 10 | 11 |
| k = | 1.7021E+00 | −8.8067E−01 | −9.7856E−01 | −1.1771E+00 |
| A4 = | −4.2072E−03 | 3.4126E−02 | −7.6505E−02 | 1.6598E−02 |
| A6 = | −6.1316E−03 | 2.3548E−01 | 1.7781E−01 | 7.6848E−03 |
| A8 = | 3.9294E−03 | −3.1997E−02 | −2.1242E−02 | −2.5779E−03 |
| A10 = | −2.7576E−04 | −5.0366E−02 | −2.9452E−02 | 2.5543E−04 |
| A12 = | — | 2.5476E−02 | 9.3746E−03 | — |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 0.95 | T12/T23 | 0.74 |
| Fno | 2.00 | f/T34 | 0.42 |
| HFOV [deg.] | 75.2 | |f4/f2| | 0.27 |
| 1/|tan(HFOV)| | 0.26 | f5/f2 | 0.45 |
| V3 | 23.3 | f/EPD | 2.00 |
| V3/V2 | 0.42 | BL/CT4 | 1.17 |
| N4 + N5 | 3.183 | TD/T23 | 5.92 |
| (R3 + R4)/(R3 − R4) | 0.34 | |SAG42 − SAG51| × 100 [mm] | 1.184 |
| (R5 + R6)/(R5 − R6) | 0.36 | |Dsr6/Dsr5| | 0.43 |
| (R7 + R10)/(R7 − R10) | 0.46 | SD52/SD11 | 0.22 |
| |R8/f| | 0.54 | |SD42/SAG42| | 0.92 |
| |R8/T34| | 0.23 | Yp21/f | 0.73 |
| T12/CT3 | 0.76 | D [mm] | 0.040 |
| T12/CT4 | 0.82 | — | — |

5th Embodiment

Figure 9:
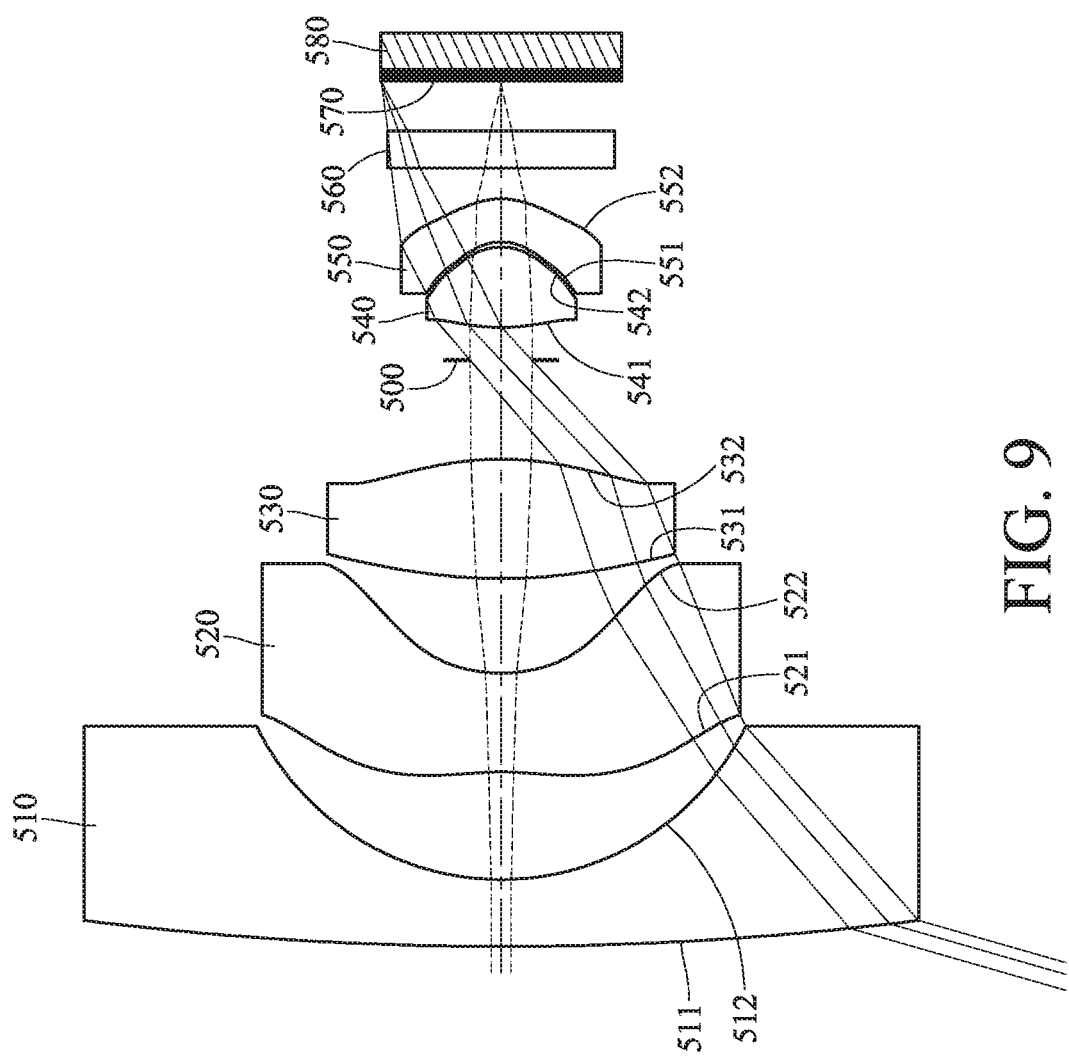
FIG. 9 is a schematic view of an image capturing unit according to the 5th embodiment of the present disclosure.
Figure 10:
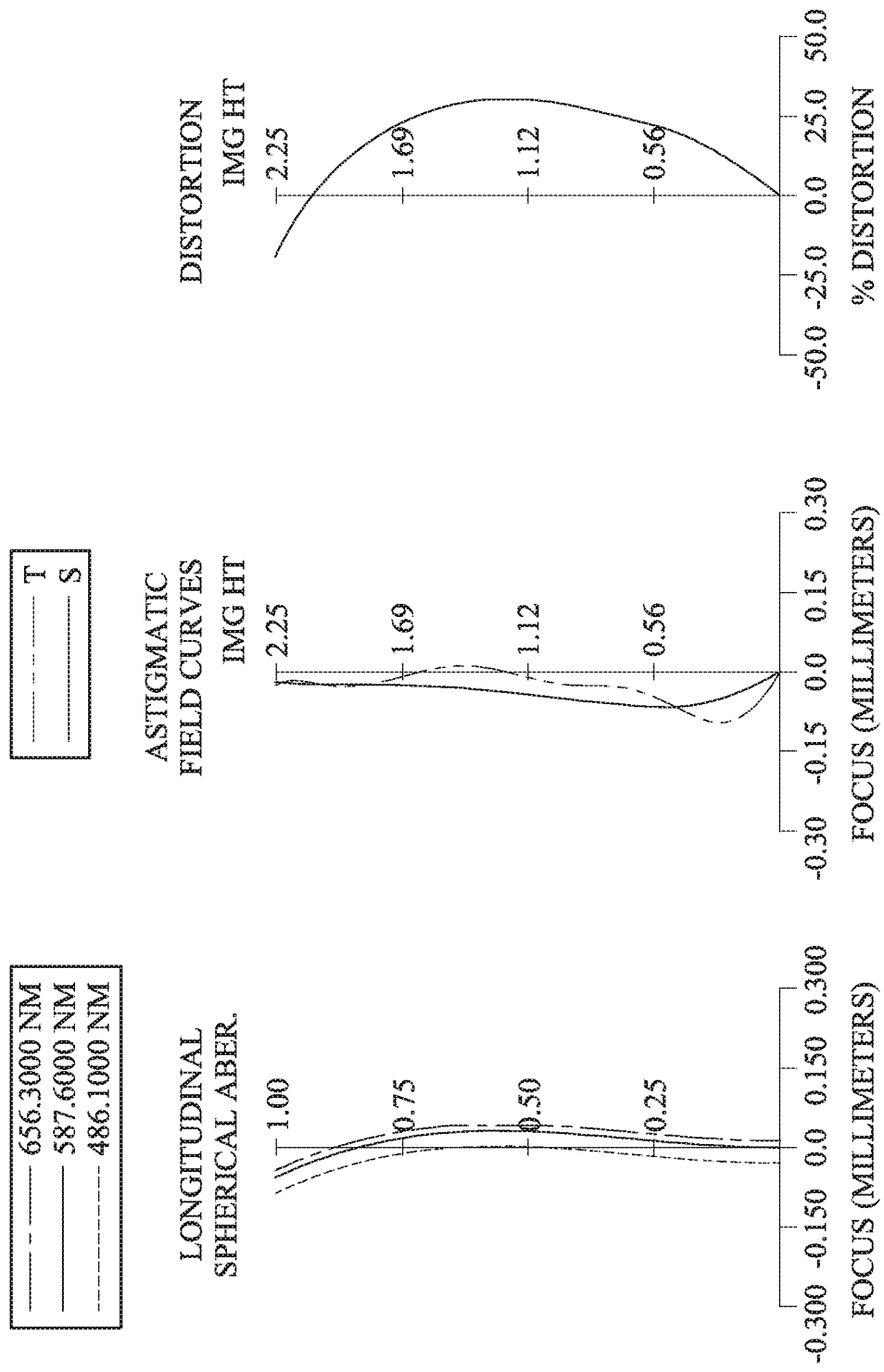
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the optical imaging lens assembly (its reference numeral is omitted) of the present disclosure and an image sensor 580. The optical imaging lens assembly includes, in order from an object side to an image side, a first lens element 510, a second lens element 520, a third lens element 530, an aperture stop 500, a fourth lens element 540, a fifth lens element 550, a filter 560 and an image surface 570. The optical imaging lens assembly includes five lens elements (510, 520, 530, 540 and 550) with no additional lens element disposed between each of the adjacent five lens elements.

The first lens element 510 with negative refractive power has an object-side surface 511 being convex in a paraxial region thereof and an image-side surface 512 being concave in a paraxial region thereof. The first lens element 510 is made of glass material and has the object-side surface 511 and the image-side surface 512 being both spherical.

The second lens element 520 with negative refractive power has an object-side surface 521 being concave in a paraxial region thereof and an image-side surface 522 being concave in a paraxial region thereof. The second lens element 520 is made of plastic material and has the object-side surface 521 and the image-side surface 522 being both aspheric. The object-side surface 521 of the second lens element 520 has at least one inflection point.

The third lens element 530 with positive refractive power has an object-side surface 531 being convex in a paraxial region thereof and an image-side surface 532 being convex in a paraxial region thereof. The third lens element 530 is made of plastic material and has the object-side surface 531 and the image-side surface 532 being both aspheric.

The fourth lens element 540 with positive refractive power has an object-side surface 541 being convex in a paraxial region thereof and an image-side surface 542 being convex in a paraxial region thereof. The fourth lens element 540 is made of plastic material and has the object-side surface 541 and the image-side surface 542 being both aspheric. The image-side surface 542 of the fourth lens element 540 has at least one inflection point.

The fifth lens element 550 with negative refractive power has an object-side surface 551 being concave in a paraxial region thereof and an image-side surface 552 being convex in a paraxial region thereof. The fifth lens element 550 is made of plastic material and has the object-side surface 551 and the image-side surface 552 being both aspheric.

The filter 560 is made of glass material and located between the fifth lens element 550 and the image surface 570, and will not affect the focal length of the optical imaging lens assembly. The image sensor 580 is disposed on or near the image surface 570 of the optical imaging lens assembly.

In this embodiment, an absolute value of a curvature radius of the image-side surface 542 of the fourth lens element 540 and an absolute value of a curvature radius of the object-side surface 551 of the fifth lens element 550 are both smaller than the absolute values of the curvature radii of the other lens surfaces (511-541 and 552) of the five lens elements. In detail, the absolute value of the curvature radius of the image-side surface 542 of the fourth lens element 540 is 1.029, and the absolute value of the curvature radius of the object-side surface 551 of the fifth lens element 550 is 0.940.

The detailed optical data of the 5th embodiment are shown in Table 9 and the aspheric surface data are shown in Table 10 below.

TABLE 9

5th Embodiment
f = 0.80 mm, Fno = 2.10, HFOV = 74.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 62.700 | 1.250 | Glass | 1.623 | 58.1 | −8.92 |
| 2 | | 5.065 | 2.010 | | | | |
| 3 | Lens 2 | −3.842 (ASP) | 1.847 | Plastic | 1.544 | 55.9 | −2.91 |
| 4 | | 3.149 (ASP) | 1.763 | | | | |
| 5 | Lens 3 | 9.582 (ASP) | 2.230 | Plastic | 1.639 | 23.5 | 5.89 |
| 6 | | −5.628 (ASP) | 1.848 | | | | |
| 7 | Ape. Stop | Plano | 0.613 | | | | |
| 8 | Lens 4 | 3.417 (ASP) | 1.500 | Plastic | 1.544 | 55.9 | 1.65 |
| 9 | | −1.029 (ASP) | 0.096 | | | | |
| 10 | Lens 5 | −0.940 (ASP) | 0.804 | Plastic | 1.639 | 23.5 | −11.14 |
| 11 | | −1.444 (ASP) | 0.568 | | | | |
| 12 | Filter | Plano | 0.700 | Glass | 1.517 | 64.2 | — |
| 13 | | Plano | 0.926 | | | | |
| 14 | Image | Plano | — | | | | |

Note:
Reference wavelength is 587.6 nm (d-line).

TABLE 10

Aspheric Coefficients

| Surface # | 3 | 4 | 5 | 6 |
|---|---|---|---|---|
| k = | −9.9000E+01 | −9.1548E−01 | 6.1465E−02 | −3.6876E+00 |
| A4 = | 1.1772E−02 | 2.2525E−02 | −1.6633E−03 | 1.7944E−03 |
| A6 = | −8.0034E−04 | −1.7886E−04 | 1.3830E−04 | −1.3202E−04 |
| A8 = | 4.0481E−05 | −4.4242E−04 | −1.0377E−04 | 1.3335E−05 |
| A10 = | −1.3963E−06 | 3.5441E−05 | 3.1582E−07 | 1.5235E−06 |
| A12 = | 1.8229E−08 | −8.2626E−07 | — | — |

| Surface # | 8 | 9 | 10 | 11 |
|---|---|---|---|---|
| k = | −3.9709E+01 | −5.5741E−01 | −1.0900E+00 | −1.2089E+00 |
| A4 = | 4.7200E−02 | −7.8289E−02 | −1.5999E−01 | 2.3413E−02 |
| A6 = | −3.3079E−02 | 2.0961E−01 | 3.4336E−01 | 2.8449E−02 |
| A8 = | 4.3577E−03 | −2.0458E−02 | −1.7029E−01 | −1.2021E−02 |
| A10 = | −6.0465E−04 | −7.1513E−02 | 1.0169E−03 | 1.0422E−03 |
| A12 = | — | 2.5476E−02 | 9.3746E−03 | — |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 0.80 | T12/T23 | 1.14 |
| Fno | 2.10 | f/T34 | 0.32 |
| HFOV [deg.] | 74.0 | |f4/f2| | 0.57 |
| 1/|tan(HFOV)| | 0.29 | f5/f2 | 3.83 |
| V3 | 23.5 | f/EPD | 2.10 |
| V3/V2 | 0.42 | BL/CT4 | 1.46 |
| N4 + N5 | 3.183 | TD/T23 | 7.92 |
| (R3 + R4)/(R3 − R4) | 0.10 | |SAG42 − SAG51| × 100 [mm] | 0.734 |
| (R5 + R6)/(R5 − R6) | 0.26 | |Dsr6/Dsr5| | 0.45 |
| (R7 + R10)/(R7 − R10) | 0.41 | SD52/SD11 | 0.24 |

-continued

| 5th Embodiment | | | |
|---|---|---|---|
| |R8/f| | 1.29 | |SD42/SAG42| | 1.43 |
| |R8/T34| | 0.42 | Yp21/f | 0.73 |
| T12/CT3 | 0.90 | D [mm] | — |
| T12/CT4 | 1.34 | — | — |

6th Embodiment

Figure 11:
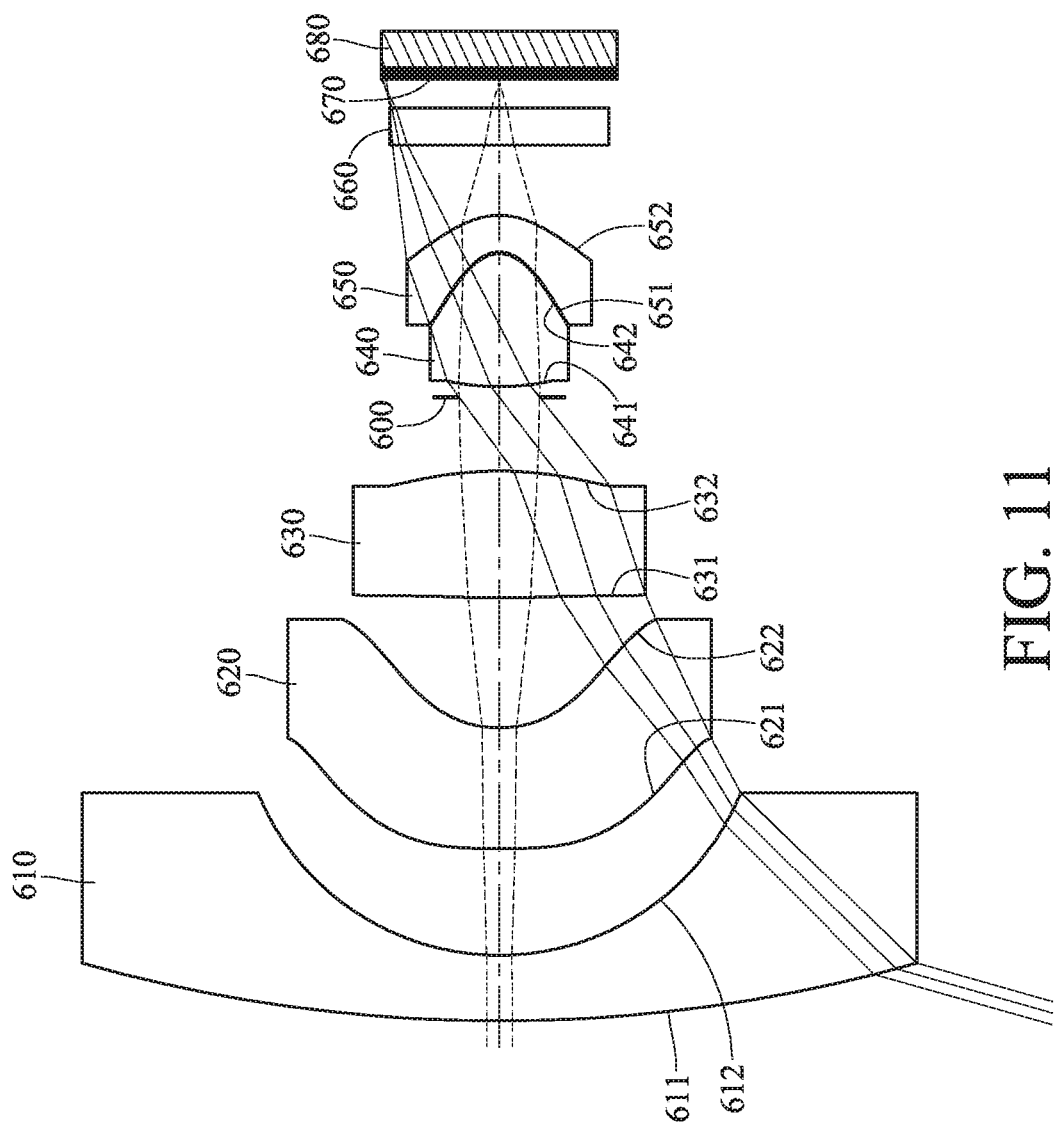
FIG. 11 is a schematic view of an image capturing unit according to the 6th embodiment of the present disclosure.
Figure 12:
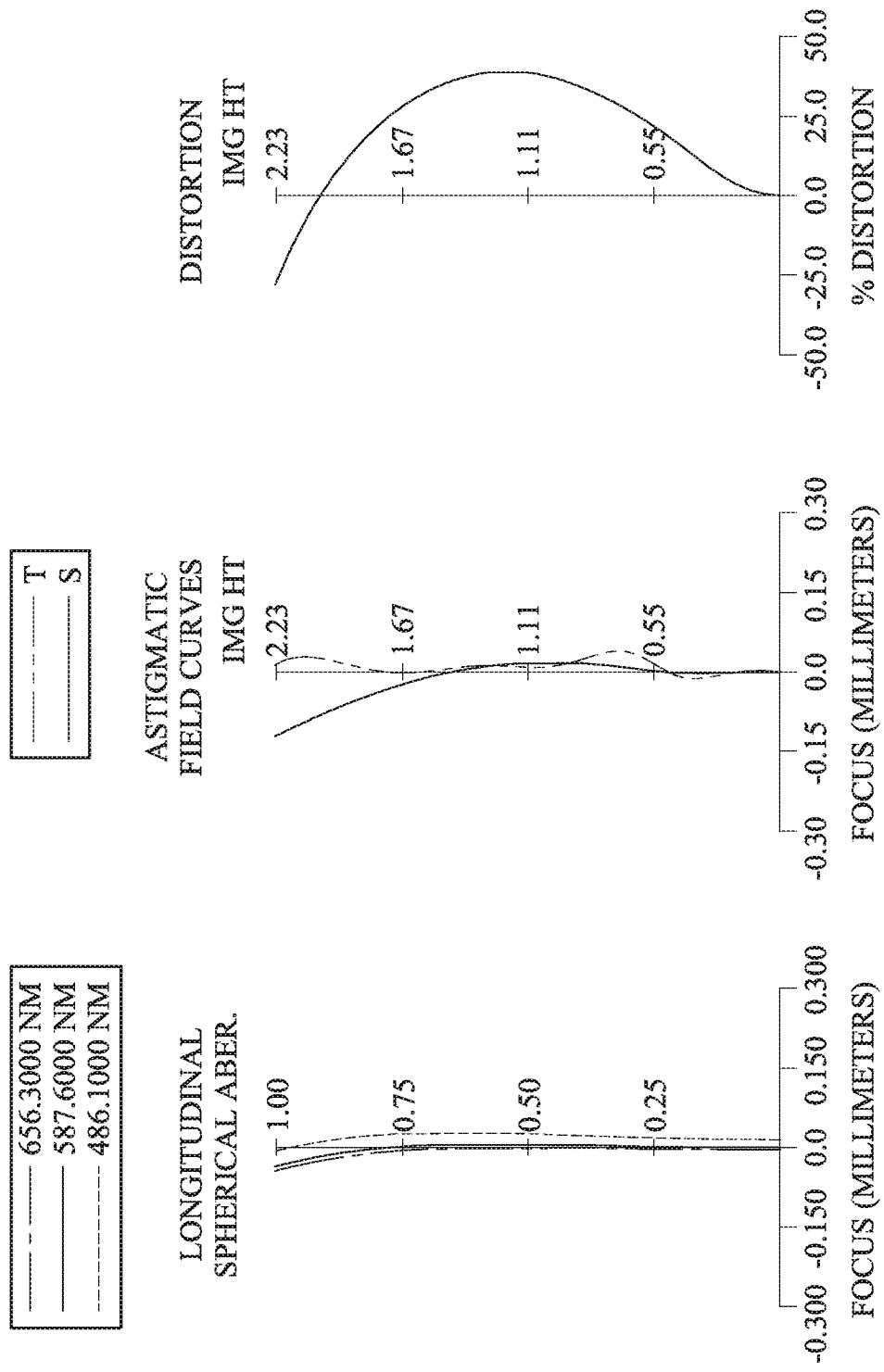
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the optical imaging lens assembly (its reference numeral is omitted) of the present disclosure and an image sensor 680. The optical imaging lens assembly includes, in order from an object side to an image side, a first lens element 610, a second lens element 620, a third lens element 630, an aperture stop 600, a fourth lens element 640, a fifth lens element 650, a filter 660 and an image surface 670. The optical imaging lens assembly includes five lens elements (610, 620, 630, 640 and 650) with no additional lens element disposed between each of the adjacent five lens elements.

The first lens element 610 with negative refractive power has an object-side surface 611 being convex in a paraxial region thereof and an image-side surface 612 being concave in a paraxial region thereof. The first lens element 610 is made of glass material and has the object-side surface 611 and the image-side surface 612 being both spherical.

The second lens element 620 with negative refractive power has an object-side surface 621 being convex in a paraxial region thereof and an image-side surface 622 being concave in a paraxial region thereof. The second lens element 620 is made of plastic material and has the object-side surface 621 and the image-side surface 622 being both aspheric. The object-side surface 621 of the second lens element 620 has at least one inflection point.

The third lens element 630 with positive refractive power has an object-side surface 631 being convex in a paraxial region thereof and an image-side surface 632 being convex in a paraxial region thereof. The third lens element 630 is made of plastic material and has the object-side surface 631 and the image-side surface 632 being both aspheric.

The fourth lens element 640 with positive refractive power has an object-side surface 641 being convex in a paraxial region thereof and an image-side surface 642 being convex in a paraxial region thereof. The fourth lens element 640 is made of plastic material and has the object-side surface 641 and the image-side surface 642 being both aspheric. The image-side surface 642 of the fourth lens element 640 has at least one inflection point.

The fifth lens element 650 with negative refractive power has an object-side surface 651 being concave in a paraxial region thereof and an image-side surface 652 being convex in a paraxial region thereof. The fifth lens element 650 is made of plastic material and has the object-side surface 651 and the image-side surface 652 being both aspheric. The object-side surface 651 of the fifth lens element 650 has at least one inflection point. The object-side surface 651 of the fifth lens element 650 and the image-side surface 642 of the fourth lens element 640 are cemented to each other.

The filter 660 is made of glass material and located between the fifth lens element 650 and the image surface 670, and will not affect the focal length of the optical imaging lens assembly. The image sensor 680 is disposed on or near the image surface 670 of the optical imaging lens assembly.

In this embodiment, an absolute value of a curvature radius of the image-side surface 642 of the fourth lens element 640 and an absolute value of a curvature radius of the object-side surface 651 of the fifth lens element 650 are both smaller than the absolute values of the curvature radii of the other lens surfaces (611-641 and 652) of the five lens elements. In detail, the absolute value of the curvature radius of the image-side surface 642 of the fourth lens element 640 is 0.541, and the absolute value of the curvature radius of the object-side surface 651 of the fifth lens element 650 is 0.544.

The detailed optical data of the 6th embodiment are shown in Table 11 and the aspheric surface data are shown in Table 12 below.

TABLE 11

6th Embodiment
f = 0.87 mm, Fno = 1.78, HFOV = 74.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 29.235 | 1.250 | Glass | 1.697 | 55.5 | −8.76 |
| 2 | | 4.960 | 2.038 | | | | |
| 3 | Lens 2 | 37.037 (ASP) | 2.300 | Plastic | 1.544 | 55.9 | −4.43 |
| 4 | | 2.211 (ASP) | 2.482 | | | | |
| 5 | Lens 3 | 23.548 (ASP) | 2.411 | Plastic | 1.639 | 23.5 | 8.81 |
| 6 | | −7.093 (ASP) | 1.409 | | | | |
| 7 | Ape. Stop | Plano | 0.200 | | | | |
| 8 | Lens 4 | 4.340 (ASP) | 2.540 | Plastic | 1.544 | 55.9 | 1.08 |
| 9 | | −0.541 (ASP) | 0.030 | Cemented | 1.485 | 53.2 | |
| 10 | Lens 5 | −0.544 (ASP) | 0.700 | Plastic | 1.639 | 23.5 | −2.25 |
| 11 | | −1.314 (ASP) | 1.341 | | | | |
| 12 | Filter | Plano | 0.700 | Glass | 1.517 | 64.2 | — |
| 13 | | Plano | 0.552 | | | | |
| 14 | Image | Plano | — | | | | |

Note:
Reference wavelength is 587.6 nm (d-line).

TABLE 12

| Aspheric Coefficients | | | | |
|---|---|---|---|---|
| Surface # | 3 | 4 | 5 | 6 |
| k = | 2.9377E+01 | −7.0832E−01 | 5.5744E+01 | 2.6397E−01 |
| A4 = | 2.9687E−02 | 2.5100E−02 | −4.7472E−03 | 1.3651E−03 |
| A6 = | −5.6164E−03 | −2.4001E−03 | 2.8533E−04 | −1.7689E−04 |
| A8 = | 8.8974E−04 | −3.8811E−04 | −3.2828E−05 | −4.0509E−05 |
| A10 = | −9.1326E−05 | 4.0013E−05 | 3.8769E−06 | 2.6346E−05 |
| A12 = | 5.6908E−06 | −8.2583E−07 | — | — |
| A14 = | −1.9825E−07 | — | — | — |
| A16 = | 2.8998E−09 | — | — | — |
| Surface # | 8 | 9 | 10 | 11 |
| k = | −6.2191E+00 | −8.5505E−01 | −9.8016E−01 | −1.9241E+00 |
| A4 = | 3.7293E−03 | 1.0263E−01 | −2.4247E−02 | −3.4972E−03 |
| A6 = | −6.9703E−03 | 1.1599E−01 | 1.4906E−01 | 4.9254E−03 |
| A8 = | 1.1977E−02 | 2.5340E−03 | −5.5390E−02 | −1.3387E−03 |
| A10 = | −6.2865E−03 | −4.4026E−02 | −1.2888E−02 | 1.0822E−04 |
| A12 = | — | 2.5476E−02 | 9.3746E−03 | — |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 0.87 | T12/T23 | 0.82 |
| Fno | 1.78 | f/T34 | 0.54 |
| HFOV [deg.] | 74.2 | |f4/f2| | 0.24 |
| 1/|tan(HFOV)| | 0.28 | f5/f2 | 0.51 |
| V3 | 23.5 | f/EPD | 1.78 |
| V3/V2 | 0.42 | BL/CT4 | 1.02 |
| N4 + N5 | 3.183 | TD/T23 | 6.19 |
| (R3 + R4)/(R3 − R4) | 1.13 | |SAG42 − SAG51| × 100 [mm] | 0.911 |
| (R5 + R6)/(R5 − R6) | 0.54 | |Dsr6/Dsr5| | 0.37 |
| (R7 + R10)/(R7 − R10) | 0.54 | SD52/SD11 | 0.22 |
| |R8/f| | 0.62 | |SD42/SAG42| | 0.95 |
| |R8/T34| | 0.34 | Yp21/f | 3.90 |
| T12/CT3 | 0.85 | D [mm] | 0.030 |
| T12/CT4 | 0.80 | — | — |

7th Embodiment

Figure 13:
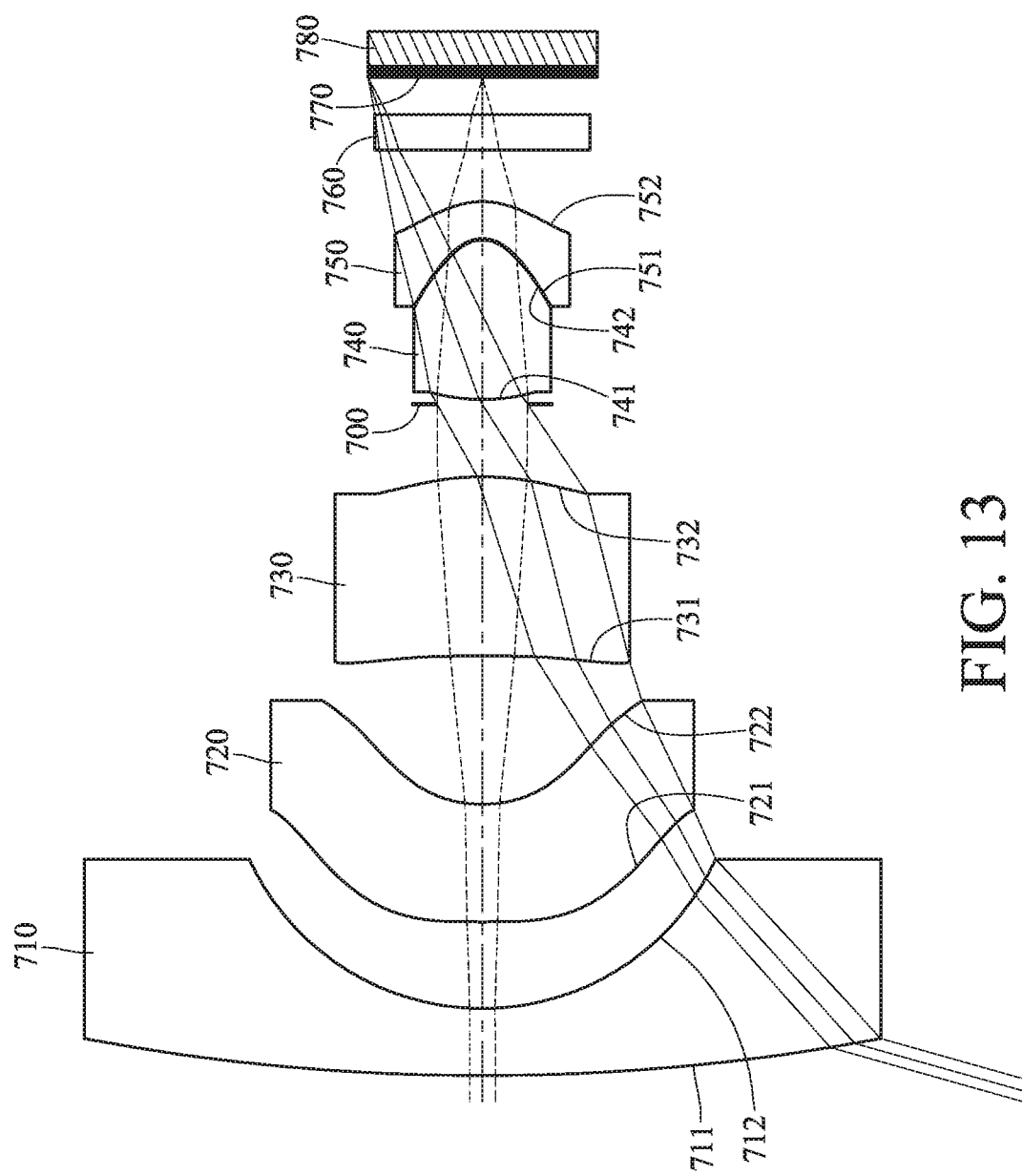
FIG. 13 is a schematic view of an image capturing unit according to the 7th embodiment of the present disclosure.
Figure 14:
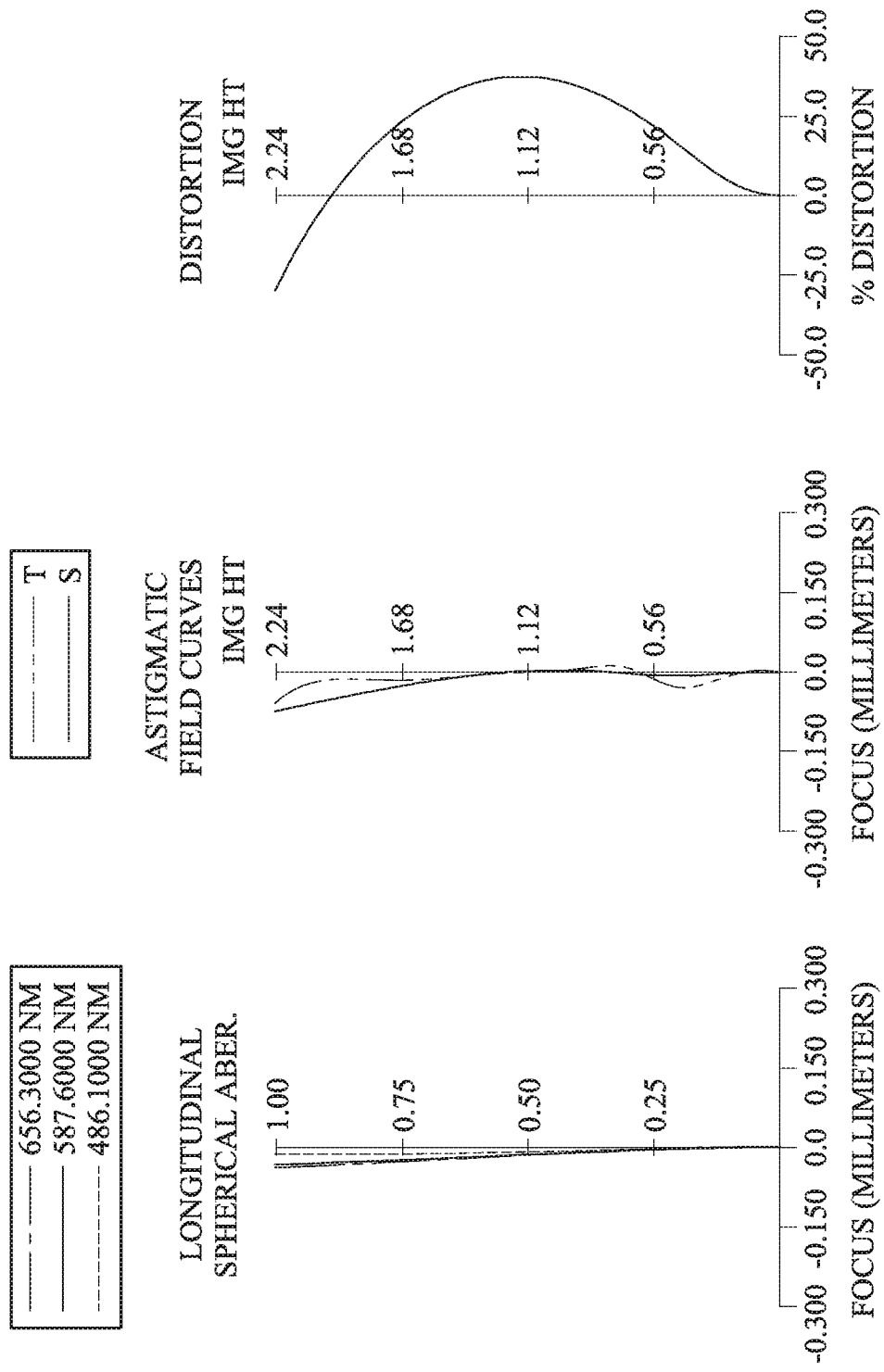
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the optical imaging lens assembly (its reference numeral is omitted) of the present disclosure and an image sensor 780. The optical imaging lens assembly includes, in order from an object side to an image side, a first lens element 710, a second lens element 720, a third lens element 730, an aperture stop 700, a fourth lens element 740, a fifth lens element 750, a filter 760 and an image surface 770. The optical imaging lens assembly includes five lens elements (710, 720, 730, 740 and 750) with no additional lens element disposed between each of the adjacent five lens elements.

The first lens element 710 with negative refractive power has an object-side surface 711 being convex in a paraxial region thereof and an image-side surface 712 being concave in a paraxial region thereof. The first lens element 710 is made of glass material and has the object-side surface 711 and the image-side surface 712 being both spherical.

The second lens element 720 with negative refractive power has an object-side surface 721 being convex in a paraxial region thereof and an image-side surface 722 being concave in a paraxial region thereof. The second lens element 720 is made of plastic material and has the object-side surface 721 and the image-side surface 722 being both aspheric. The object-side surface 721 of the second lens element 720 has at least one inflection point.

The third lens element 730 with positive refractive power has an object-side surface 731 being concave in a paraxial region thereof and an image-side surface 732 being convex in a paraxial region thereof. The third lens element 730 is made of plastic material and has the object-side surface 731 and the image-side surface 732 being both aspheric.

The fourth lens element 740 with positive refractive power has an object-side surface 741 being convex in a paraxial region thereof and an image-side surface 742 being convex in a paraxial region thereof. The fourth lens element 740 is made of plastic material and has the object-side surface 741 and the image-side surface 742 being both aspheric. The image-side surface 742 of the fourth lens element 740 has at least one inflection point.

The fifth lens element 750 with negative refractive power has an object-side surface 751 being concave in a paraxial region thereof and an image-side surface 752 being convex in a paraxial region thereof. The fifth lens element 750 is made of plastic material and has the object-side surface 751 and the image-side surface 752 being both aspheric. The object-side surface 751 of the fifth lens element 750 has at least one inflection point. The object-side surface 751 of the fifth lens element 750 and the image-side surface 742 of the fourth lens element 740 are cemented to each other.

The filter 760 is made of glass material and located between the fifth lens element 750 and the image surface 770, and will not affect the focal length of the optical imaging lens assembly. The image sensor 780 is disposed on or near the image surface 770 of the optical imaging lens assembly.

In this embodiment, an absolute value of a curvature radius of the image-side surface 742 of the fourth lens element 740 and an absolute value of a curvature radius of the object-side surface 751 of the fifth lens element 750 are both smaller than the absolute values of the curvature radii of the other lens surfaces (711-741 and 752) of the five lens elements. In detail, the absolute value of the curvature radius of the image-side surface 742 of the fourth lens element 740 is 0.638, and the absolute value of the curvature radius of the object-side surface 751 of the fifth lens element 750 is 0.632.

The detailed optical data of the 7th embodiment are shown in Table 13 and the aspheric surface data are shown in Table 14 below.

TABLE 13

7th Embodiment
f = 0.90 mm, Fno = 1.80, HFOV = 74.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 42.058 | 1.314 | Glass | 1.697 | 55.5 | −8.29 |
| 2 | | 5.014 | 1.697 | | | | |
| 3 | Lens 2 | 122.533 (ASP) | 2.300 | Plastic | 1.544 | 55.9 | −5.06 |
| 4 | | 2.675 (ASP) | 2.903 | | | | |
| 5 | Lens 3 | −30.093 (ASP) | 3.500 | Plastic | 1.639 | 23.5 | 8.77 |
| 6 | | −4.936 (ASP) | 1.417 | | | | |
| 7 | Ape. Stop | Plano | 0.096 | | | | |
| 8 | Lens 4 | 4.009 (ASP) | 3.116 | Plastic | 1.544 | 55.9 | 1.32 |
| 9 | | −0.638 (ASP) | 0.030 | Cemented | 1.485 | 53.2 | |
| 10 | Lens 5 | −0.632 (ASP) | 0.721 | Plastic | 1.639 | 23.5 | −2.43 |
| 11 | | −1.542 (ASP) | 1.006 | | | | |
| 12 | Filter | Plano | 0.700 | Glass | 1.517 | 64.2 | — |
| 13 | | Plano | 0.722 | | | | |
| 14 | Image | Plano | — | | | | |

Note:
Reference wavelength is 587.6 nm (d-line).

TABLE 14

Aspheric Coefficients

| Surface # | 3 | 4 | 5 | 6 |
|---|---|---|---|---|
| k = | 9.5000E+01 | −6.7187E−01 | 9.0572E+01 | −3.9119E+00 |
| A4 = | 3.0251E−02 | 2.7259E−02 | −2.8772E−03 | 1.9575E−03 |
| A6 = | −5.1484E−03 | −2.2850E−03 | 4.6693E−04 | −3.2521E−05 |
| A8 = | 7.5624E−04 | −3.7441E−04 | −3.4262E−05 | 1.0155E−04 |
| A10 = | −7.4074E−05 | 4.0406E−05 | 4.1041E−06 | −8.9056E−06 |
| A12 = | 4.5088E−06 | −8.2585E−07 | — | — |
| A14 = | −1.5814E−07 | — | — | — |
| A16 = | 2.3991E−09 | — | — | — |

| Surface # | 8 | 9 | 10 | 11 |
|---|---|---|---|---|
| k = | −1.4776E+00 | −8.1925E−01 | −8.6276E−01 | −2.9676E+00 |
| A4 = | 1.2825E−02 | −1.6137E−01 | 1.1662E−02 | −1.1507E−02 |
| A6 = | −4.3925E−03 | 5.0348E−01 | 1.3034E−01 | 5.9592E−03 |
| A8 = | 5.1428E−03 | −2.3380E−01 | −3.3085E−02 | −9.9863E−05 |
| A10 = | −1.9056E−03 | −1.1178E−02 | −1.7839E−02 | −2.6353E−05 |
| A12 = | — | 2.5476E−02 | 9.3746E−03 | — |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 0.90 | T12/T23 | 0.58 |
| Fno | 1.80 | f/T34 | 0.60 |
| HFOV [deg.] | 74.2 | |f4/f2| | 0.26 |
| 1/|tan(HFOV)| | 0.28 | f5/f2 | 0.48 |
| V3 | 23.5 | f/EPD | 1.80 |
| V3/V2 | 0.42 | BL/CT4 | 0.78 |
| N4 + N5 | 3.183 | TD/T23 | 5.89 |
| (R3 + R4)/(R3 − R4) | 1.04 | |SAG42 − SAG51| × 100 [mm] | 0.214 |

-continued

| 7th Embodiment | | | |
|---|---|---|---|
| (R5 + R6)/(R5 − R6) | 1.39 | |Dsr6/Dsr5| | 0.29 |
| (R7 + R10)/(R7 − R10) | 0.44 | SD52/SD11 | 0.22 |
| |R8/f| | 0.71 | |SD42/SAG42| | 1.01 |
| |R8/T34| | 0.42 | Yp21/f | 3.77 |
| T12/CT3 | 0.48 | D [mm] | 0.030 |
| T12/CT4 | 0.54 | — | — |

8th Embodiment

Figure 15:
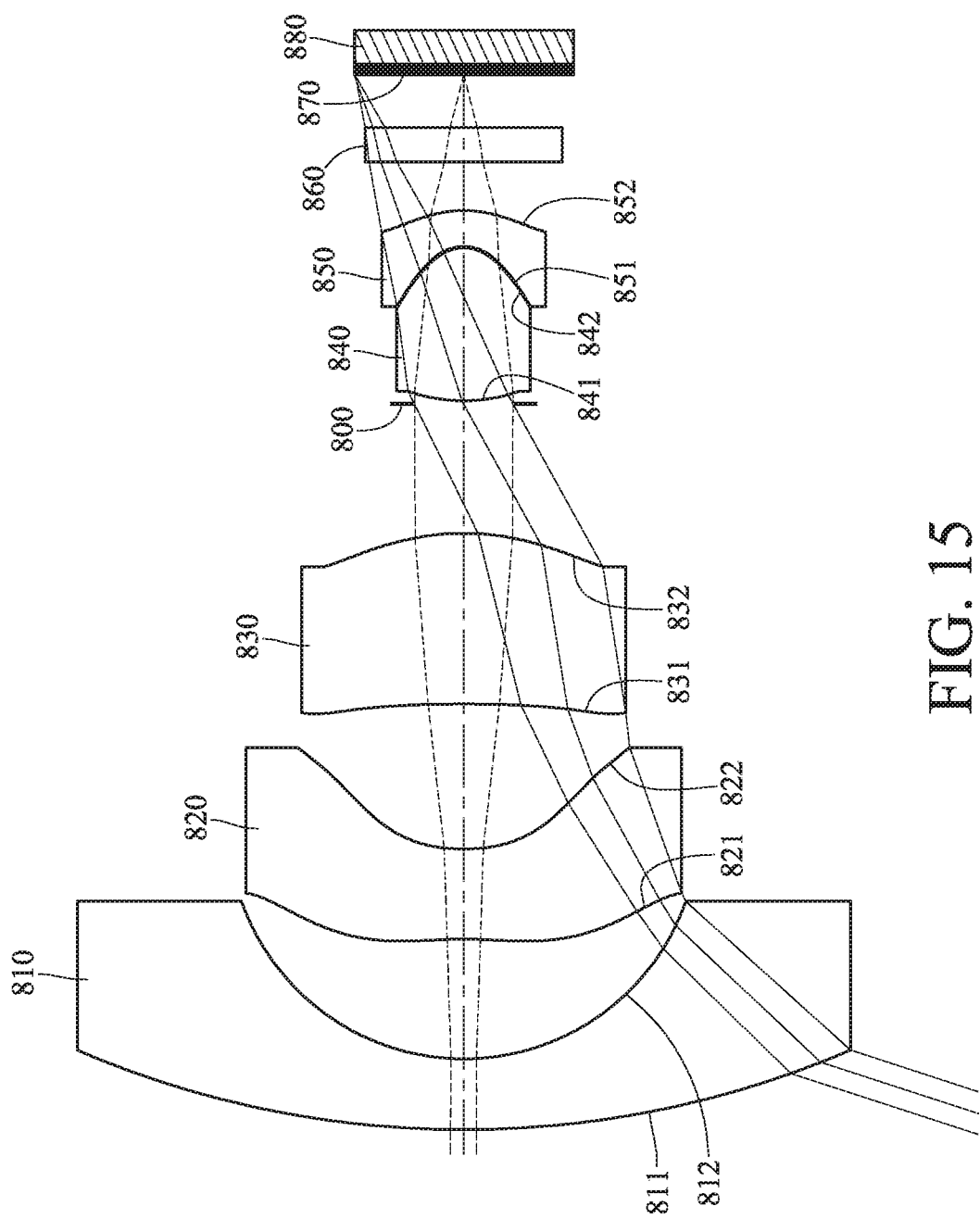
FIG. 15 is a schematic view of an image capturing unit according to the 8th embodiment of the present disclosure.
Figure 16:
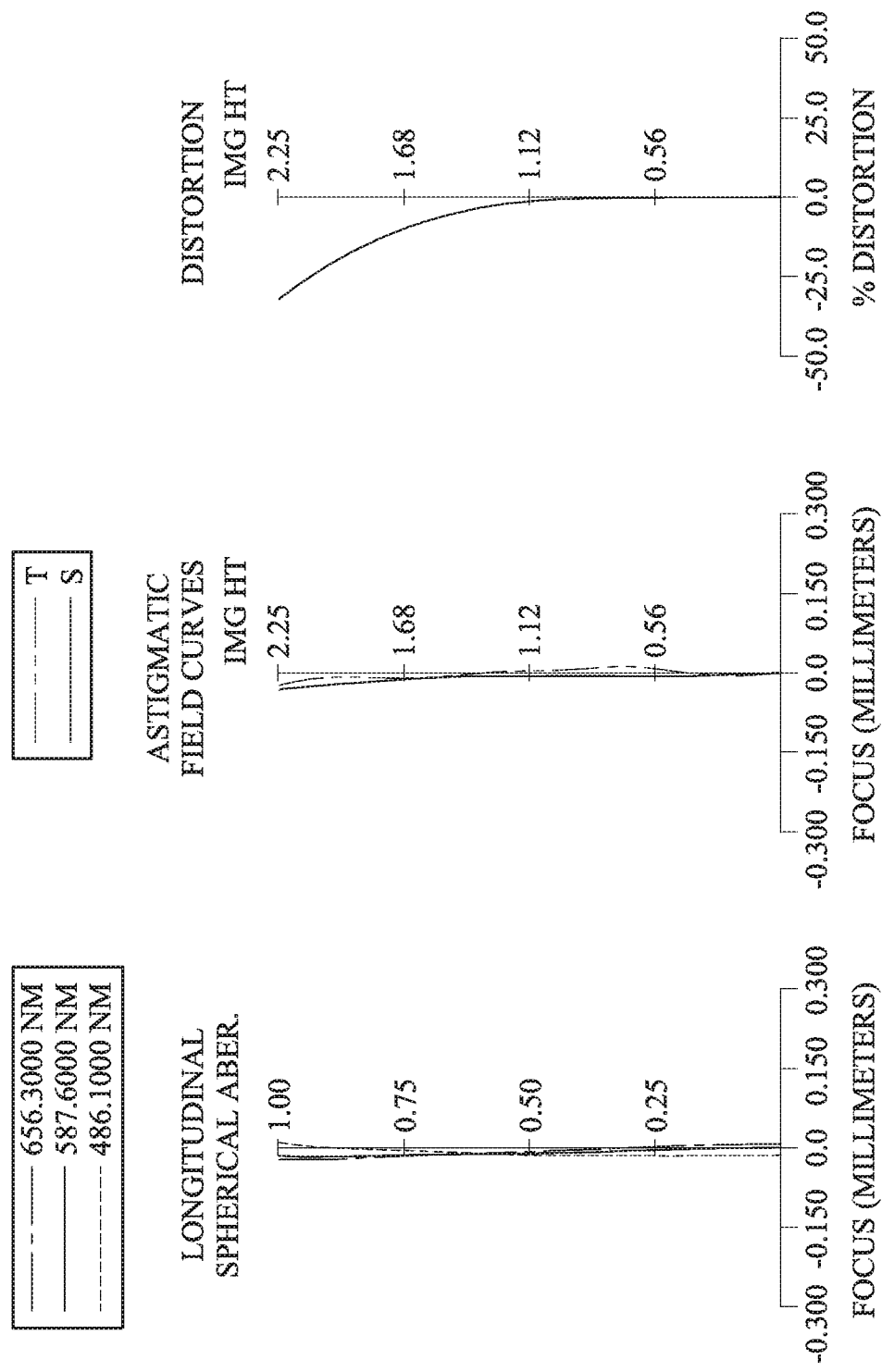
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the optical imaging lens assembly (its reference numeral is omitted) of the present disclosure and an image sensor 880. The optical imaging lens assembly includes, in order from an object side to an image side, a first lens element 810, a second lens element 820, a third lens element 830, an aperture stop 800, a fourth lens element 840, a fifth lens element 850, a filter 860 and an image surface 870. The optical imaging lens assembly includes five lens elements (810, 820, 830, 840 and 850) with no additional lens element disposed between each of the adjacent five lens elements.

The first lens element 810 with negative refractive power has an object-side surface 811 being convex in a paraxial region thereof and an image-side surface 812 being concave in a paraxial region thereof. The first lens element 810 is made of glass material and has the object-side surface 811 and the image-side surface 812 being both spherical.

The second lens element 820 with negative refractive power has an object-side surface 821 being concave in a paraxial region thereof and an image-side surface 822 being concave in a paraxial region thereof. The second lens element 820 is made of plastic material and has the object-side surface 821 and the image-side surface 822 being both aspheric. The object-side surface 821 of the second lens element 820 has at least one inflection point.

The third lens element 830 with positive refractive power has an object-side surface 831 being concave in a paraxial region thereof and an image-side surface 832 being convex in a paraxial region thereof. The third lens element 830 is made of plastic material and has the object-side surface 831 and the image-side surface 832 being both aspheric.

The fourth lens element 840 with positive refractive power has an object-side surface 841 being convex in a paraxial region thereof and an image-side surface 842 being convex in a paraxial region thereof. The fourth lens element 840 is made of plastic material and has the object-side surface 841 and the image-side surface 842 being both aspheric. The image-side surface 842 of the fourth lens element 840 has at least one inflection point.

The fifth lens element 850 with negative refractive power has an object-side surface 851 being concave in a paraxial region thereof and an image-side surface 852 being convex in a paraxial region thereof. The fifth lens element 850 is made of plastic material and has the object-side surface 851 and the image-side surface 852 being both aspheric. The object-side surface 851 of the fifth lens element 850 has at least one inflection point. The object-side surface 851 of the fifth lens element 850 and the image-side surface 842 of the fourth lens element 840 are cemented to each other.

The filter 860 is made of glass material and located between the fifth lens element 850 and the image surface 870, and will not affect the focal length of the optical imaging lens assembly. The image sensor 880 is disposed on or near the image surface 870 of the optical imaging lens assembly.

In this embodiment, an absolute value of a curvature radius of the image-side surface 842 of the fourth lens element 840 and an absolute value of a curvature radius of the object-side surface 851 of the fifth lens element 850 are both smaller than the absolute values of the curvature radii of the other lens surfaces (811-841 and 852) of the five lens elements. In detail, the absolute value of the curvature radius of the image-side surface 842 of the fourth lens element 840 is 0.883, and the absolute value of the curvature radius of the object-side surface 851 of the fifth lens element 850 is 0.874.

The detailed optical data of the 8th embodiment are shown in Table 15 and the aspheric surface data are shown in Table 16 below.

TABLE 15

8th Embodiment
f = 1.08 mm, Fno = 2.00, HFOV = 71.9 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 20.027 | 1.450 | Glass | 1.804 | 46.6 | −8.23 |
| 2 | | 4.815 | 2.448 | | | | |
| 3 | Lens 2 | −9.796 (ASP) | 1.849 | Plastic | 1.544 | 55.9 | −4.77 |
| 4 | | 3.760 (ASP) | 2.968 | | | | |
| 5 | Lens 3 | −33.303 (ASP) | 3.500 | Plastic | 1.639 | 23.5 | 8.91 |
| 6 | | −5.060 (ASP) | 2.649 | | | | |
| 7 | Ape. Stop | Plano | 0.066 | | | | |
| 8 | Lens 4 | 3.552 (ASP) | 3.129 | Plastic | 1.544 | 55.9 | 1.73 |
| 9 | | −0.883 (ASP) | 0.030 | Cemented | 1.485 | 53.2 | |
| 10 | Lens 5 | −0.874 (ASP) | 0.734 | Plastic | 1.639 | 23.5 | −2.66 |
| 11 | | −2.391 (ASP) | 1.000 | | | | |
| 12 | Filter | Plano | 0.700 | Glass | 1.517 | 64.2 | — |
| 13 | | Plano | 1.082 | | | | |
| 14 | Image | Plano | — | | | | |

Note:
Reference wavelength is 587.6 nm (d-line).

TABLE 16

Aspheric Coefficients

| Surface # | 3 | 4 | 5 | 6 |
|---|---|---|---|---|
| k = | −9.9000E+01 | −1.6390E+00 | 8.9134E+01 | −1.5829E+00 |
| A4 = | 1.1303E−02 | 2.3514E−02 | −1.4624E−03 | 1.8586E−04 |
| A6 = | −7.9505E−04 | −1.1352E−04 | 2.5245E−05 | 7.3599E−05 |
| A8 = | 3.9757E−05 | −4.3422E−04 | −3.0266E−06 | −1.6397E−06 |
| A10 = | −1.3604E−06 | 3.6166E−05 | 1.6269E−06 | 1.0551E−06 |
| A12 = | 1.7841E−08 | −8.2585E−07 | — | — |

| Surface # | 8 | 9 | 10 | 11 |
|---|---|---|---|---|
| k = | 3.1272E−02 | −6.4136E−01 | −8.1445E−01 | −1.5964E+00 |
| A4 = | 6.5440E−03 | −3.2261E−01 | −2.0461E−01 | −5.5284E−04 |
| A6 = | −4.0833E−03 | 4.9255E−01 | 2.2445E−01 | 8.5656E−03 |
| A8 = | 4.9814E−03 | −1.7940E−01 | −6.2575E−02 | −1.6211E−03 |
| A10 = | −1.8274E−03 | −2.9755E−02 | −1.7054E−02 | 1.7850E−04 |
| A12 = | — | 2.5476E−02 | 9.3746E−03 | — |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.08 | T12/T23 | 0.82 |
| Fno | 2.00 | f/T34 | 0.40 |
| HFOV [deg.] | 71.9 | |f4/f2| | 0.36 |
| 1/|tan(HFOV)| | 0.33 | f5/f2 | 0.56 |
| V3 | 23.5 | f/EPD | 2.00 |
| V3/V2 | 0.42 | BL/CT4 | 0.89 |
| N4 + N5 | 3.183 | TD/T23 | 6.34 |
| (R3 + R4)/(R3 − R4) | 0.45 | |SAG42 − SAG51| × 100 [mm] | 0.337 |
| (R5 + R6)/(R5 − R6) | 1.36 | |Dsr6/Dsr5| | 0.43 |
| (R7 + R10)/(R7 − R10) | 0.20 | SD52/SD11 | 0.21 |
| |R8/f| | 0.82 | |SD42/SAG42| | 1.11 |
| |R8/T34| | 0.33 | Yp21/f | 0.63 |
| T12/CT3 | 0.70 | D [mm] | 0.030 |
| T12/CT4 | 0.78 | — | — |

9th Embodiment

Figure 17:
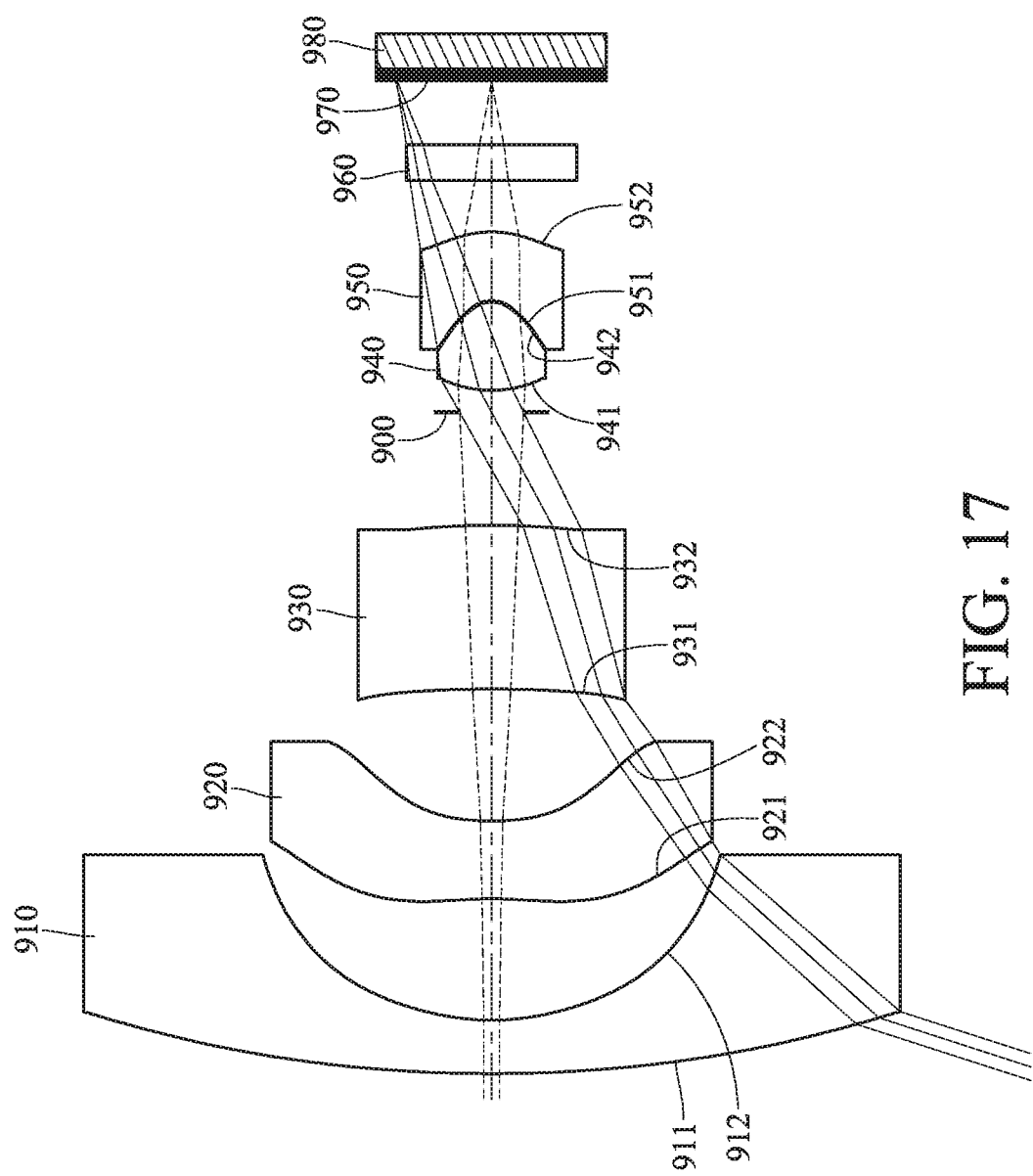
FIG. 17 is a schematic view of an image capturing unit according to the 9th embodiment of the present disclosure.
Figure 18:
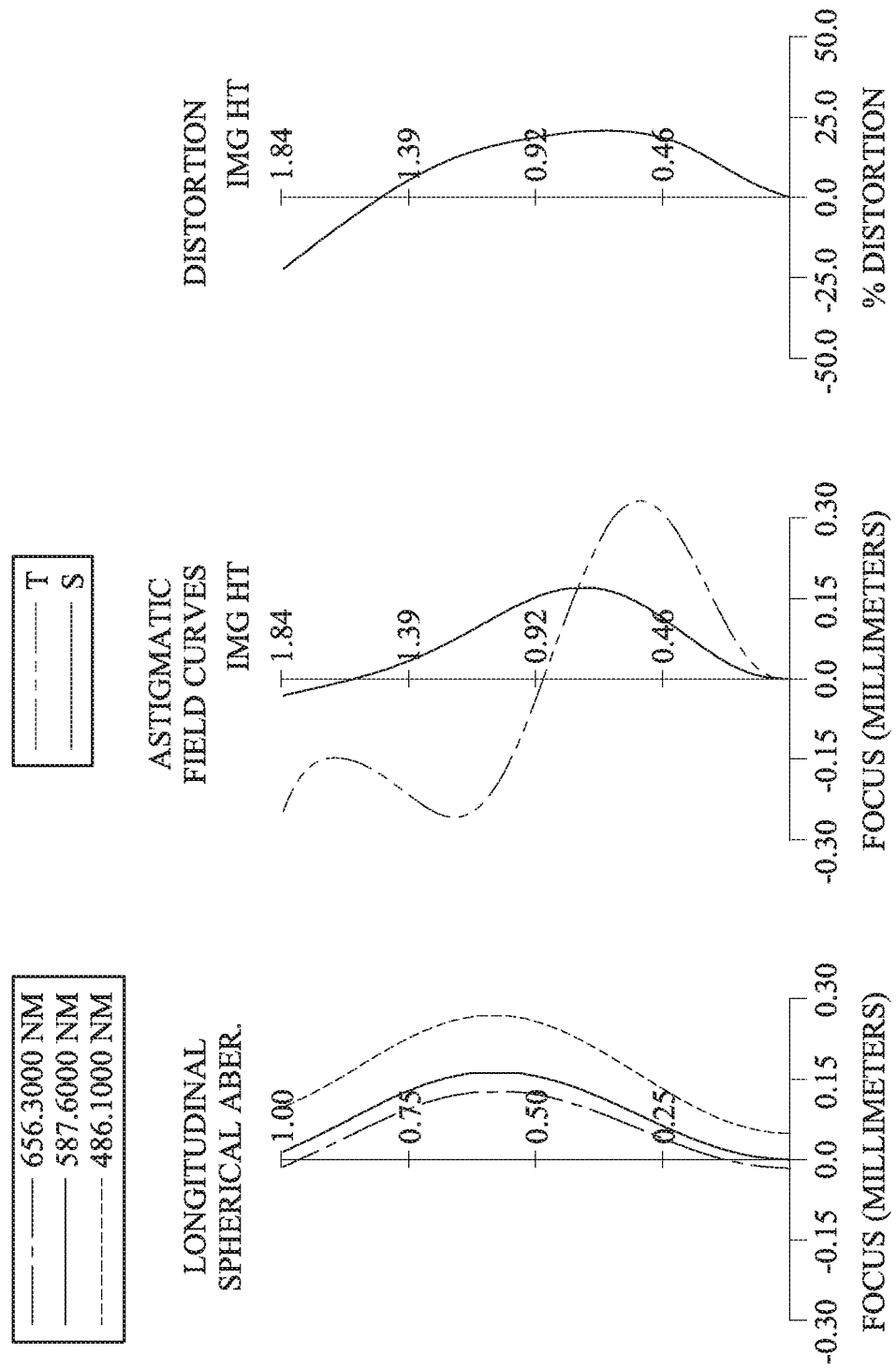
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the optical imaging lens assembly (its reference numeral is omitted) of the present disclosure and an image sensor 980. The optical imaging lens assembly includes, in order from an object side to an image side, a first lens element 910, a second lens element 920, a third lens element 930, an aperture stop 900, a fourth lens element 940, a fifth lens element 950, a filter 960 and an image surface 970. The optical imaging lens assembly includes five lens elements (910, 920, 930, 940 and 950) with no additional lens element disposed between each of the adjacent five lens elements.

The first lens element 910 with negative refractive power has an object-side surface 911 being convex in a paraxial region thereof and an image-side surface 912 being concave in a paraxial region thereof. The first lens element 910 is made of plastic material and has the object-side surface 911 and the image-side surface 912 being both aspheric.

The second lens element 920 with negative refractive power has an object-side surface 921 being concave in a paraxial region thereof and an image-side surface 922 being concave in a paraxial region thereof. The second lens element 920 is made of plastic material and has the object-side surface 921 and the image-side surface 922 being both aspheric. The object-side surface 921 of the second lens element 920 has at least one inflection point.

The third lens element 930 with positive refractive power has an object-side surface 931 being concave in a paraxial region thereof and an image-side surface 932 being convex in a paraxial region thereof. The third lens element 930 is made of plastic material and has the object-side surface 931 and the image-side surface 932 being both aspheric.

The fourth lens element 940 with positive refractive power has an object-side surface 941 being convex in a paraxial region thereof and an image-side surface 942 being convex in a paraxial region thereof. The fourth lens element 940 is made of plastic material and has the object-side surface 941 and the image-side surface 942 being both aspheric. The image-side surface 942 of the fourth lens element 940 has at least one inflection point.

The fifth lens element 950 with negative refractive power has an object-side surface 951 being concave in a paraxial region thereof and an image-side surface 952 being convex in a paraxial region thereof. The fifth lens element 950 is made of plastic material and has the object-side surface 951 and the image-side surface 952 being both aspheric. The object-side surface 951 of the fifth lens element 950 has at least one inflection point. The object-side surface 951 of the fifth lens element 950 and the image-side surface 942 of the fourth lens element 940 are cemented to each other.

The filter 960 is made of glass material and located between the fifth lens element 950 and the image surface 970, and will not affect the focal length of the optical imaging lens assembly. The image sensor 980 is disposed on or near the image surface 970 of the optical imaging lens assembly.

In this embodiment, an absolute value of a curvature radius of the image-side surface 942 of the fourth lens element 940 and an absolute value of a curvature radius of the object-side surface 951 of the fifth lens element 950 are both smaller than the absolute values of the curvature radii of the other lens surfaces (911-941 and 952) of the five lens elements. In detail, the absolute value of the curvature radius of the image-side surface 942 of the fourth lens element 940 is 0.724, and the absolute value of the curvature radius of the object-side surface 951 of the fifth lens element 950 is 0.676.

The detailed optical data of the 9th embodiment are shown in Table 17 and the aspheric surface data are shown in Table 18 below.

TABLE 17

9th embodiment
f = 0.78 mm, Fno = 2.54, HFOV = 72.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 28.117 (ASP) | 1.046 | Plastic | 1.566 | 37.4 | −10.23 |
| 2 | | 4.736 (ASP) | 2.372 | | | | |
| 3 | Lens 2 | −6.385 (ASP) | 1.520 | Plastic | 1.650 | 21.5 | −4.25 |
| 4 | | 5.322 (ASP) | 2.578 | | | | |
| 5 | Lens 3 | −26.771 (ASP) | 3.200 | Plastic | 1.544 | 55.9 | 92.97 |
| 6 | | −18.238 (ASP) | 2.210 | | | | |
| 7 | Ape. Stop | Plano | 0.433 | | | | |
| 8 | Lens 4 | 2.355 (ASP) | 1.721 | Plastic | 1.544 | 55.9 | 1.27 |
| 9 | | −0.724 (ASP) | 0.030 | Cemented | 1.485 | 53.2 | |
| 10 | Lens 5 | −0.676 (ASP) | 1.346 | Plastic | 1.639 | 23.5 | −2.88 |
| 11 | | −1.900 (ASP) | 1.001 | | | | |
| 12 | Filter | Plano | 0.700 | Glass | 1.517 | 64.2 | — |
| 13 | | Plano | 1.249 | | | | |
| 14 | Image | Plano | — | | | | |

Note:
Reference wavelength is 587.6 nm (d-line).

TABLE 18

Aspheric Coefficients

| Surface # | 1 | 2 | 3 | 4 | 5 |
|---|---|---|---|---|---|
| k = | 2.3863E+00 | −1.6767E−02 | −9.8814E+01 | −1.8641E+00 | 9.3900E+01 |
| A4 = | 1.7535E−05 | −5.3458E−03 | 4.0024E+00 | 2.5560E−02 | 2.1349E−03 |
| A6 = | −1.1444E−06 | 8.7985E−04 | −5.6198E+00 | −1.2347E−03 | −2.5951E−03 |
| A8 = | 5.4791E−08 | −1.1608E−04 | 8.3014E+00 | −3.5079E−04 | 1.0791E−03 |
| A10 = | −1.3897E−09 | 1.2836E−05 | −1.0335E+01 | 6.2942E−05 | −2.3935E−04 |
| A12 = | 1.9612E−11 | −8.5573E−07 | 7.4286E+00 | −5.0525E−06 | 3.1297E−05 |
| A14 = | −1.8156E−13 | 2.8973E−08 | −2.2833E+00 | 1.6073E−07 | −2.4827E−06 |
| A16 = | 8.7667E−16 | −3.7523E−10 | — | — | 9.6993E−08 |

| Surface # | 6 | 8 | 9 | 10 | 11 |
|---|---|---|---|---|---|
| k = | 1.1635E+01 | 3.9798E−01 | −8.2946E−01 | −8.7576E−01 | −2.6490E+00 |
| A4 = | −8.9254E−03 | 2.7667E−02 | −3.6211E+00 | −2.4688E+00 | 1.1191E−02 |
| A6 = | 1.2264E−02 | −5.8218E−02 | 1.8351E+00 | 1.2624E+01 | −2.0894E−02 |
| A8 = | −1.1721E−02 | 4.7096E−02 | −4.1087E+01 | −2.8850E+01 | 3.4700E−02 |
| A10 = | 7.7139E−03 | 8.7939E−03 | 4.6712E+01 | 3.3832E+01 | −1.8325E−02 |
| A12 = | −3.0983E−03 | −1.8971E−02 | −2.6351E+01 | −1.9826E+01 | 3.6118E−03 |
| A14 = | 6.7113E−04 | — | 5.8872E+00 | 4.6216E+00 | — |
| A16 = | −5.9480E−05 | — | — | — | — |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.78 | T12/T23 | 0.92 |
| Fno | 2.54 | f/T34 | 0.29 |
| HFOV [deg.] | 72.1 | \|f4/f2\| | 0.30 |
| 1/\|tan(HFOV)\| | 0.32 | f5/f2 | 0.68 |
| V3 | 55.9 | f/EPD | 2.54 |

-continued

| 9th Embodiment | | | |
|---|---|---|---|
| V3/V2 | 2.60 | BL/CT4 | 1.71 |
| N4 + N5 | 3.183 | TD/T23 | 6.38 |
| (R3 + R4)/(R3 − R4) | 0.09 | \|SAG42 − SAG51\| × 100 [mm] | 0.601 |
| (R5 + R6)/(R5 − R6) | 5.27 | \|Dsr6/Dsr5\| | 0.41 |
| (R7 + R10)/(R7 − R10) | 0.11 | SD52/SD11 | 0.17 |
| \|R8/f\| | 0.93 | \|SD42/SAG42\| | 1.12 |
| \|R8/T34\| | 0.27 | Yp21/f | 0.08 |

-continued

| 9th Embodiment | | | | |
|---|---|---|---|---|
| T12/CT3 | 0.74 | D [mm] | | 0.030 |
| T12/CT4 | 1.38 | — | | — |

10th Embodiment

Figure 19:
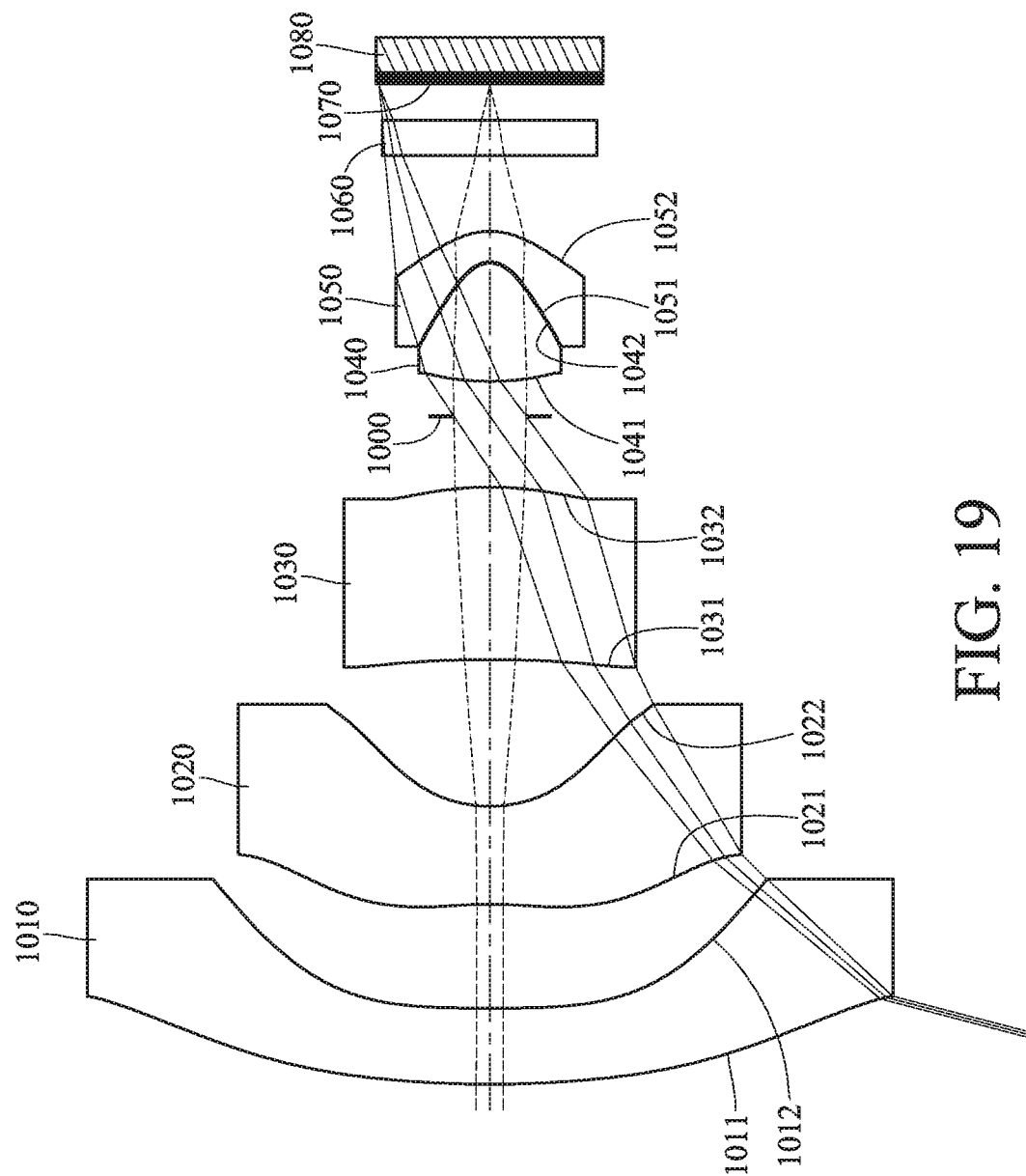
FIG. 19 is a schematic view of an image capturing unit according to the 10th embodiment of the present disclosure.
Figure 20:
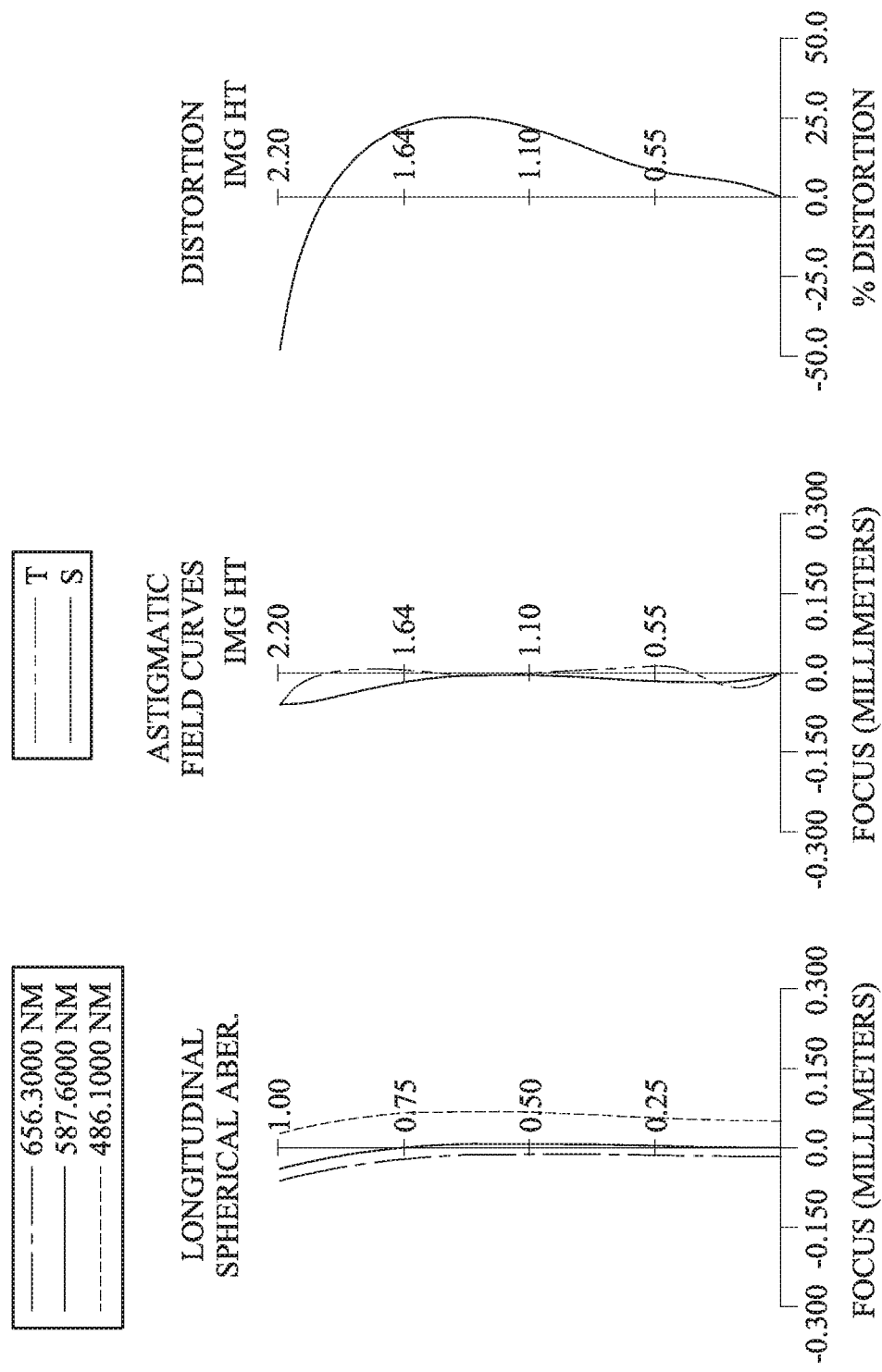
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the optical imaging lens assembly (its reference numeral is omitted) of the present disclosure and an image sensor 1080. The optical imaging lens assembly includes, in order from an object side to an image side, a first lens element 1010, a second lens element 1020, a third lens element 1030, an aperture stop 1000, a fourth lens element 1040, a fifth lens element 1050, a filter 1060 and an image surface 1070. The optical imaging lens assembly includes five lens elements (1010, 1020, 1030, 1040 and 1050) with no additional lens element disposed between each of the adjacent five lens elements.

The first lens element 1010 with positive refractive power has an object-side surface 1011 being convex in a paraxial region thereof and an image-side surface 1012 being concave in a paraxial region thereof. The first lens element 1010 is made of glass material and has the object-side surface 1011 and the image-side surface 1012 being both aspheric.

The second lens element 1020 with negative refractive power has an object-side surface 1021 being concave in a paraxial region thereof and an image-side surface 1022 being concave in a paraxial region thereof. The second lens element 1020 is made of plastic material and has the object-side surface 1021 and the image-side surface 1022 being both aspheric. The object-side surface 1021 of the second lens element 1020 has at least one inflection point.

The third lens element 1030 with positive refractive power has an object-side surface 1031 being concave in a paraxial region thereof and an image-side surface 1032 being convex in a paraxial region thereof. The third lens element 1030 is made of plastic material and has the object-side surface 1031 and the image-side surface 1032 being both aspheric.

The fourth lens element 1040 with positive refractive power has an object-side surface 1041 being convex in a paraxial region thereof and an image-side surface 1042 being convex in a paraxial region thereof. The fourth lens element 1040 is made of plastic material and has the object-side surface 1041 and the image-side surface 1042 being both aspheric. The image-side surface 1042 of the fourth lens element 1040 has at least one inflection point.

The fifth lens element 1050 with negative refractive power has an object-side surface 1051 being concave in a paraxial region thereof and an image-side surface 1052 being convex in a paraxial region thereof. The fifth lens element 1050 is made of plastic material and has the object-side surface 1051 and the image-side surface 1052 being both aspheric. The object-side surface 1051 of the fifth lens element 1050 has at least one inflection point. The object-side surface 1051 of the fifth lens element 1050 and the image-side surface 1042 of the fourth lens element 1040 are cemented to each other.

The filter 1060 is made of glass material and located between the fifth lens element 1050 and the image surface 1070, and will not affect the focal length of the optical imaging lens assembly. The image sensor 1080 is disposed on or near the image surface 1070 of the optical imaging lens assembly.

In this embodiment, an absolute value of a curvature radius of the image-side surface 1042 of the fourth lens element 1040 and an absolute value of a curvature radius of the object-side surface 1051 of the fifth lens element 1050 are both smaller than the absolute values of the curvature radii of the other lens surfaces (1011-1041 and 1052) of the five lens elements. In detail, the absolute value of the curvature radius of the image-side surface 1042 of the fourth lens element 1040 is 0.483, and the absolute value of the curvature radius of the object-side surface 1051 of the fifth lens element 1050 is 0.479.

The detailed optical data of the 10th embodiment are shown in Table 19 and the aspheric surface data are shown in Table 20 below.

TABLE 19

10th embodiment
f = 1.10 mm, Fno = 2.05, HFOV = 75.3 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 21.434 (ASP) | 1.497 | Glass | 1.495 | 69.5 | 66.84 |
| 2 | | 59.388 (ASP) | 2.049 | | | | |
| 3 | Lens 2 | −5.839 (ASP) | 1.928 | Plastic | 1.559 | 40.4 | −3.05 |
| 4 | | 2.689 (ASP) | 2.883 | | | | |
| 5 | Lens 3 | −29.452 (ASP) | 3.402 | Plastic | 1.639 | 23.5 | 11.35 |
| 6 | | −6.078 (ASP) | 1.396 | | | | |
| 7 | Ape. Stop | Plano | 0.681 | | | | |
| 8 | Lens 4 | 4.913 (ASP) | 2.328 | Plastic | 1.544 | 55.9 | 0.95 |
| 9 | | −0.483 (ASP) | 0.030 | Cemented | 1.485 | 53.2 | |
| 10 | Lens 5 | −0.479 (ASP) | 0.600 | Plastic | 1.639 | 23.5 | −1.57 |
| 11 | | −1.363 (ASP) | 1.483 | | | | |
| 12 | Filter | Plano | 0.700 | Glass | 1.517 | 64.2 | — |
| 13 | | Plano | 0.715 | | | | |
| 14 | Image | Plano | — | | | | |

Note:
Reference wavelength is 587.6 nm (d-line).

TABLE 20

| Aspheric Coefficients | | | | | |
|---|---|---|---|---|---|
| Surface # | 1 | 2 | 3 | 4 | 5 |
| k = | −1.2912E+00 | −2.1340E+01 | −9.8901E+01 | −2.3910E+00 | 8.3446E+01 |
| A4 = | −1.3658E−04 | 5.0105E−03 | 1.1079E−02 | 2.3397E−02 | −1.8199E−03 |
| A6 = | 3.3820E−05 | −1.5262E−04 | −8.1979E−04 | −3.4522E−04 | 2.4308E−04 |
| A8 = | −1.1474E−06 | 5.6495E−06 | 4.0331E−05 | −4.3741E−04 | −5.7914E−06 |
| A10 = | 1.5561E−08 | −1.6160E−07 | −1.3024E−06 | 3.7921E−05 | 1.6831E−06 |
| A12 = | −7.9992E−11 | 1.7786E−09 | 1.7553E−08 | −8.2575E−07 | — |
| Surface # | 6 | 8 | 9 | 10 | 11 |
| k = | −3.9124E+00 | 4.8159E+00 | −9.0776E−01 | −1.0988E+00 | −1.4620E+00 |
| A4 = | 2.6467E−03 | −8.0008E−03 | −1.3691E−01 | −2.4930E−01 | 1.3965E−02 |
| A6 = | −2.4561E−05 | −8.2079E−04 | 5.0771E−01 | 3.8682E−01 | 4.8991E−03 |
| A8 = | 1.0701E−04 | 1.3422E−03 | −1.5109E−01 | −1.5355E−01 | −2.4618E−03 |
| A10 = | −1.5625E−05 | −4.2011E−04 | −4.9527E−02 | −5.1006E−03 | 2.9958E−04 |
| A12 = | — | — | 2.5476E−02 | 9.3746E−03 | — |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.10 | T12/T23 | 0.71 |
| Fno | 2.05 | f/T34 | 0.53 |
| HFOV [deg.] | 75.3 | |f4/f2| | 0.31 |
| 1/|tan(HFOV)| | 0.26 | f5/f2 | 0.52 |
| V3 | 23.5 | f/EPD | 2.05 |
| V3/V2 | 0.58 | BL/CT4 | 1.24 |
| N4 + N5 | 3.183 | TD/T23 | 5.83 |
| (R3 + R4)/(R3 − R4) | 0.37 | |SAG42 − SAG51| × 100 [mm] | 0.006 |
| (R5 + R6)/(R5 − R6) | 1.52 | |Dsr6/Dsr5| | 0.29 |
| (R7 + R10)/(R7 − R10) | 0.57 | SD52/SD11 | 0.23 |
| |R8/f| | 0.44 | |SD42/SAG42| | 0.84 |
| |R8/T34| | 0.23 | Yp21/f | 0.60 |
| T12/CT3 | 0.60 | D [mm] | 0.030 |
| T12/CT4 | 0.88 | — | |

11th Embodiment

Figure 21:
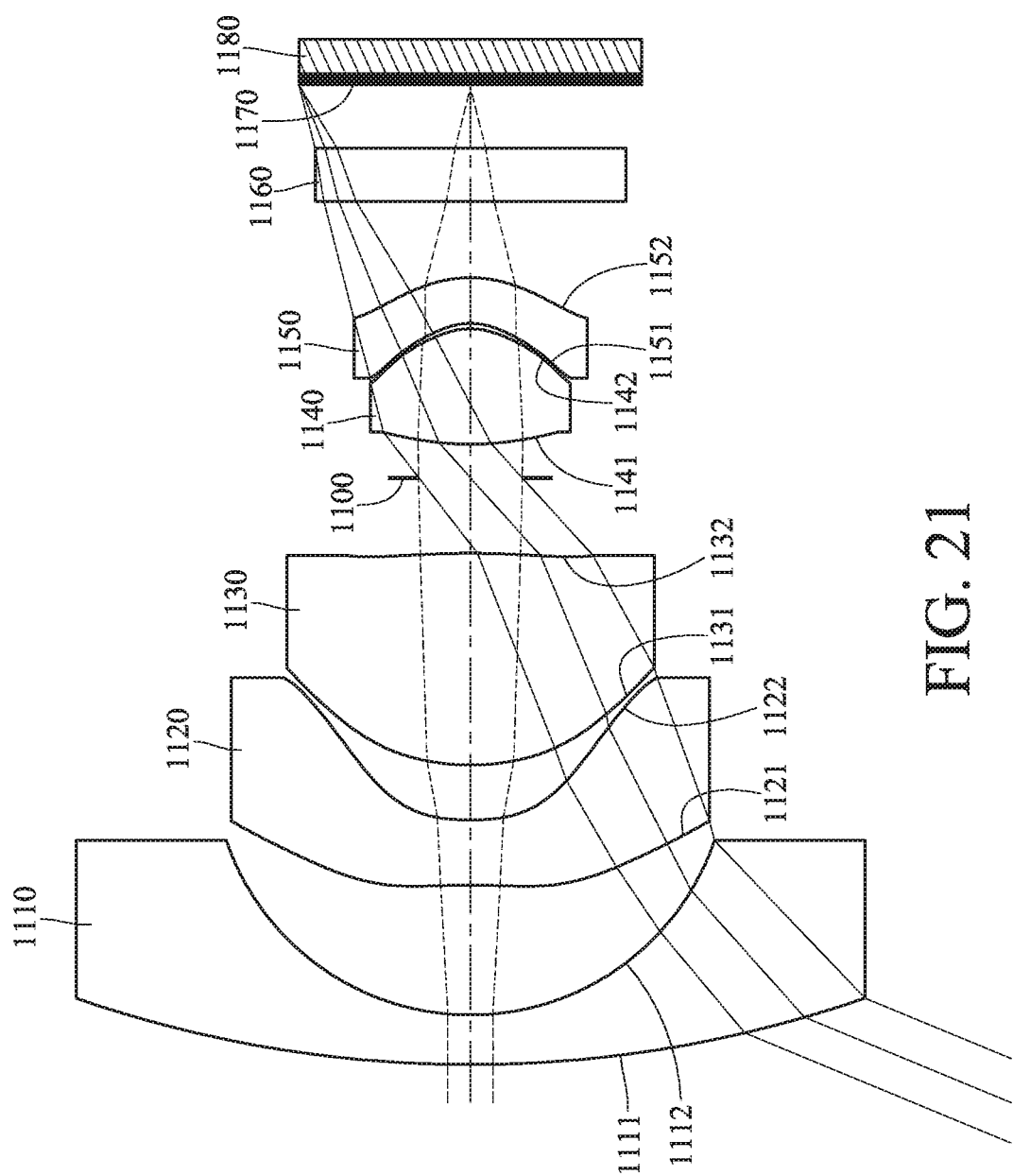
FIG. 21 is a schematic view of an image capturing unit according to the 11th embodiment of the present disclosure.
Figure 22:
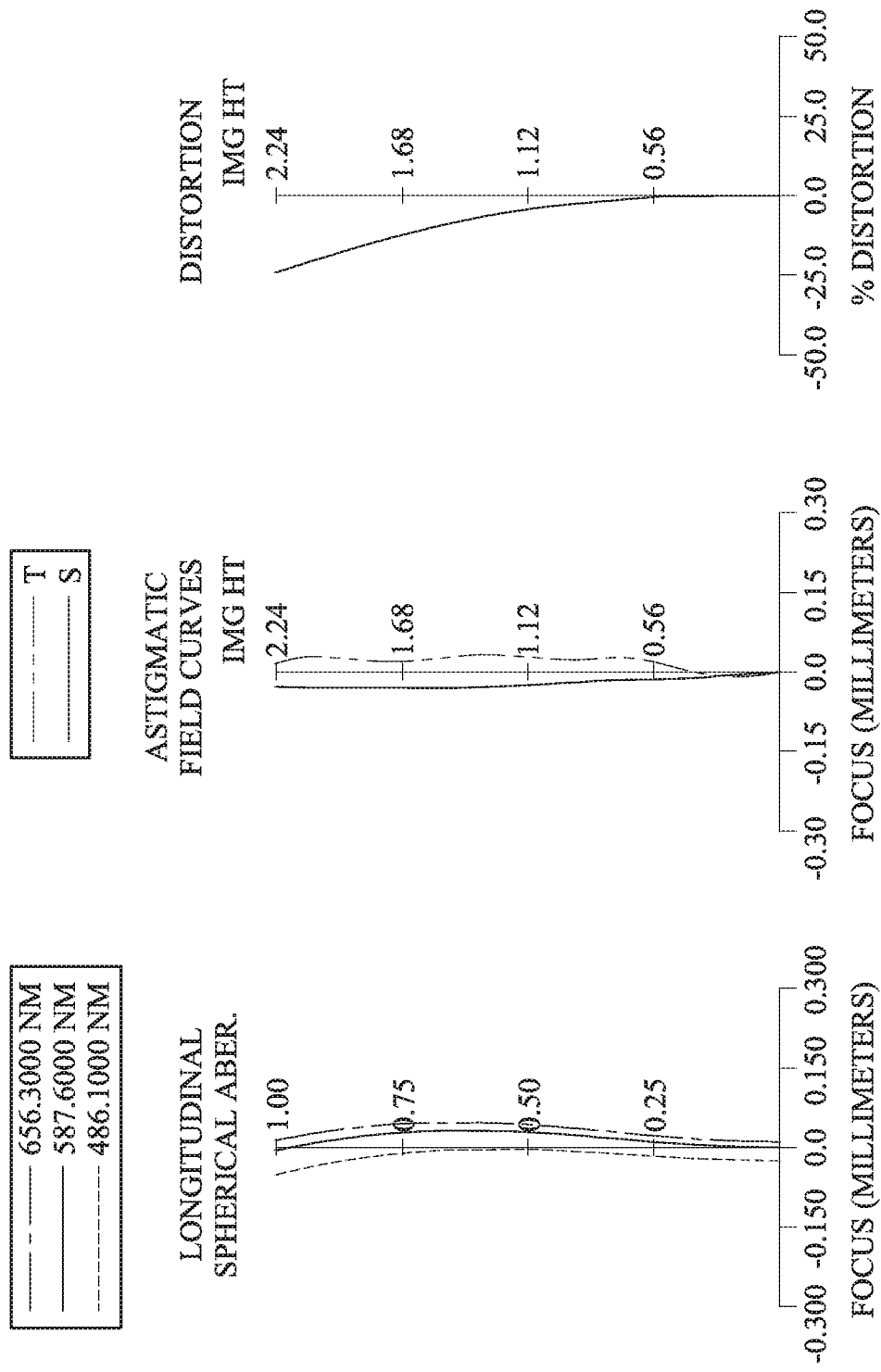
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the optical imaging lens assembly (its reference numeral is omitted) of the present disclosure and an image sensor 1180. The optical imaging lens assembly includes, in order from an object side to an image side, a first lens element 1110, a second lens element 1120, a third lens element 1130, an aperture stop 1100, a fourth lens element 1140, a fifth lens element 1150, a filter 1160 and an image surface 1170. The optical imaging lens assembly includes five lens elements (1110, 1120, 1130, 1140 and 1150) with no additional lens element disposed between each of the adjacent five lens elements.

The first lens element 1110 with negative refractive power has an object-side surface 1111 being convex in a paraxial region thereof and an image-side surface 1112 being concave in a paraxial region thereof. The first lens element 1110 is made of glass material and has the object-side surface 1111 and the image-side surface 1112 being both spherical.

The second lens element 1120 with negative refractive power has an object-side surface 1121 being concave in a paraxial region thereof and an image-side surface 1122 being concave in a paraxial region thereof. The second lens element 1120 is made of plastic material and has the object-side surface 1121 and the image-side surface 1122 being both aspheric. The object-side surface 1121 of the second lens element 1120 has at least one inflection point.

The third lens element 1130 with positive refractive power has an object-side surface 1131 being convex in a paraxial region thereof and an image-side surface 1132 being convex in a paraxial region thereof. The third lens element 1130 is made of plastic material and has the object-side surface 1131 and the image-side surface 1132 being both aspheric.

The fourth lens element 1140 with positive refractive power has an object-side surface 1141 being convex in a paraxial region thereof and an image-side surface 1142 being convex in a paraxial region thereof. The fourth lens element 1140 is made of plastic material and has the object-side surface 1141 and the image-side surface 1142 being both aspheric. The image-side surface 1142 of the fourth lens element 1140 has at least one inflection point.

The fifth lens element 1150 with negative refractive power has an object-side surface 1151 being concave in a paraxial region thereof and an image-side surface 1152 being convex in a paraxial region thereof. The fifth lens element 1150 is made of plastic material and has the object-side surface 1151 and the image-side surface 1152 being both aspheric. The object-side surface 1151 of the fifth lens element 1150 has at least one inflection point.

The filter 1160 is made of glass material and located between the fifth lens element 1150 and the image surface 1170, and will not affect the focal length of the optical imaging lens assembly. The image sensor 1180 is disposed on or near the image surface 1170 of the optical imaging lens assembly.

In this embodiment, an absolute value of a curvature radius of the image-side surface 1142 of the fourth lens element 1140 and an absolute value of a curvature radius of the object-side surface 1151 of the fifth lens element 1150 are both smaller than the absolute values of the curvature radii of the other lens surfaces (1111-1141 and 1152) of the five lens elements. In detail, the absolute value of the curvature radius of the image-side surface 1142 of the fourth lens element 1140 is 0.830, and the absolute value of the curvature radius of the object-side surface 1151 of the fifth lens element 1150 is 0.789.

The detailed optical data of the 11th embodiment are shown in Table 21 and the aspheric surface data are shown in Table 22 below.

TABLE 21

11th Embodiment
f = 1.22 mm, Fno = 2.02, HFOV = 67.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 15.775 | 0.650 | Glass | 1.804 | 46.6 | −5.49 |
| 2 | | 3.384 | 1.708 | | | | |
| 3 | Lens 2 | −6.046 (ASP) | 0.851 | Plastic | 1.544 | 55.9 | −3.67 |
| 4 | | 3.124 (ASP) | 0.724 | | | | |
| 5 | Lens 3 | 3.309 (ASP) | 2.779 | Plastic | 1.639 | 23.5 | 4.21 |
| 6 | | −9.639 (ASP) | 0.992 | | | | |
| 7 | Ape. Stop | Plano | 0.438 | | | | |
| 8 | Lens 4 | 3.822 (ASP) | 1.517 | Plastic | 1.544 | 55.9 | 1.42 |
| 9 | | −0.830 (ASP) | 0.070 | | | | |
| 10 | Lens 5 | −0.789 (ASP) | 0.600 | Plastic | 1.639 | 23.5 | −3.66 |
| 11 | | −1.544 (ASP) | 1.000 | | | | |
| 12 | Filter | Plano | 0.700 | Glass | 1.517 | 64.2 | — |
| 13 | | Plano | 0.831 | | | | |
| 14 | Image | Plano | — | | | | |

Note:
Reference wavelength is 587.6 nm (d-line).

TABLE 22

Aspheric Coefficients

| Surface # | 3 | 4 | 5 | 6 |
|---|---|---|---|---|
| k = | −9.9000E+01 | −1.2024E+00 | −3.0198E−01 | 4.4956E+00 |
| A4 = | 5.9894E−02 | 1.3387E−01 | 2.6851E−02 | 1.8419E−02 |
| A6 = | −1.3862E−02 | −3.7293E−03 | −6.4336E−03 | −6.3050E−03 |
| A8 = | 1.9148E−03 | −1.4352E−02 | 2.7178E−03 | 3.5962E−03 |
| A10 = | −1.7631E−04 | 4.0911E−03 | −9.8789E−04 | −8.8414E−04 |
| A12 = | 1.0107E−05 | −4.6763E−04 | 1.6408E−04 | 1.1115E−04 |
| A14 = | −2.6345E−07 | 1.9741E−05 | −9.8987E−06 | 4.3253E−06 |

| Surface # | 8 | 9 | 10 | 11 |
|---|---|---|---|---|
| k = | 2.6940E+00 | −1.1332E+00 | −1.2473E+00 | −1.1417E+00 |
| A4 = | −2.5343E−01 | 5.3594E−01 | 5.2294E−01 | 5.5796E−02 |
| A6 = | 3.4988E−02 | −9.5097E−01 | −1.0356E+00 | −6.5727E−02 |
| A8 = | −4.9984E−02 | 1.0373E+00 | 1.1995E+00 | 5.9389E−02 |
| A10 = | 2.1581E−02 | −7.0343E−01 | −8.4015E−01 | −2.6600E−02 |
| A12 = | 2.5214E−03 | 2.5463E−01 | 3.2129E−01 | 6.9580E−03 |
| A14 = | −1.7657E−03 | −3.5647E−02 | −4.9834E−02 | −8.3854E−04 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 1.22 | T12/T23 | 2.36 |
| Fno | 2.02 | f/T34 | 0.85 |
| HFOV [deg.] | 67.5 | |f4/f2| | 0.39 |
| 1/|tan(HFOV)| | 0.41 | f5/f2 | 1.00 |
| V3 | 23.5 | f/EPD | 2.02 |
| V3/V2 | 0.42 | BL/CT4 | 1.67 |
| N4 + N5 | 3.183 | TD/T23 | 14.27 |
| (R3 + R4)/(R3 − R4) | 0.32 | |SAG42 − SAG51| × 100 [mm] | 0.372 |

-continued

| 11th Embodiment | | | |
|---|---|---|---|
| (R5 + R6)/(R5 − R6) | −0.49 | |Dsr6/Dsr5| | 0.26 |
| (R7 + R10)/(R7 − R10) | 0.42 | SD52/SD11 | 0.30 |
| |R8/f| | 0.68 | |SD42/SAG42| | 1.82 |
| |R8/T34| | 0.58 | Yp21/f | 0.32 |
| T12/CT3 | 0.61 | D [mm] | — |
| T12/CT4 | 1.13 | — | — |

The foregoing description, for the purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical imaging lens assembly comprising five lens elements, the five lens elements being, in order from an object side to an image side:
   a first lens element having an image-side surface being concave in a paraxial region thereof;
   a second lens element with negative refractive power having an image-side surface being concave in a paraxial region thereof;
   a third lens element with positive refractive power having an image-side surface being convex in a paraxial region thereof;
   a fourth lens element having positive refractive power; and
   a fifth lens element with negative refractive power having an object-side surface being concave in a paraxial region thereof and an image-side surface being convex in a paraxial region thereof;
   wherein a curvature radius of an object-side surface of the third lens element is R5, a curvature radius of the image-side surface of the third lens element is R6, a focal length of the optical imaging lens assembly is f, a focal length of the second lens element is f2, a focal length of the fourth lens element is f4, an axial distance between the first lens element and the second lens element is T12, an axial distance between the third lens element and the fourth lens element is T34, a central thickness of the third lens element is CT3, and the following conditions are satisfied:

$0<(R5+R6)/(R5-R6)$;

$f/T34<1.0$;

$T12/CT3<0.92$; and $|f4/f2|<0.70$.

2. The optical imaging lens assembly of claim 1, wherein the object-side surface of the third lens element is concave in a paraxial region thereof.

3. The optical imaging lens assembly of claim 1, wherein the axial distance between the first lens element and the second lens element is T12, the central thickness of the third lens element is CT3, and the following condition is satisfied:

$0.10<T12/CT3<0.85$.

4. The optical imaging lens assembly of claim 1, wherein the curvature radius of the object-side surface of the third lens element is R5, the curvature radius of the image-side surface of the third lens element is R6, the focal length of the optical imaging lens assembly is f, the axial distance between the third lens element and the fourth lens element is T34, and the following conditions are satisfied:

$0.20<(R5+R6)/(R5-R6)<6.0$; and $0.10<f/T34<0.90$.

5. The optical imaging lens assembly of claim 1, wherein a curvature radius of an object-side surface of the fourth lens element is R7, a curvature radius of the image-side surface of the fifth lens element is R10, and the following condition is satisfied:

$0<(R7+R10)/(R7-R10)<1.0$.

6. The optical imaging lens assembly of claim 1, wherein a curvature radius of an object-side surface of the second lens element is R3, a curvature radius of the image-side surface of the second lens element is R4, and the following condition is satisfied:

$-1.0<(R3+R4)/(R3-R4)<1.15$.

7. The optical imaging lens assembly of claim 1, wherein a curvature radius of an image-side surface of the fourth lens element is R8, the axial distance between the third lens element and the fourth lens element is T34, and the following condition is satisfied:

$|R8/T34|<0.80$.

8. The optical imaging lens assembly of claim 1, wherein half of a maximum field of view of the optical imaging lens assembly is HFOV, the focal length of the optical imaging lens assembly is f, an entrance pupil diameter of the optical imaging lens assembly is EPD, and the following conditions are satisfied:

$1/|\tan(HFOV)|<0.50$; and $0.75<f/EPD<2.30$.

9. The optical imaging lens assembly of claim 1, wherein a maximum effective radius of an object-side surface of the first lens element is SD11, a maximum effective radius of the image-side surface of the fifth lens element is SD52, the axial distance between the first lens element and the second lens element is T12, a central thickness of the fourth lens element is CT4, and the following conditions are satisfied:

$0.08<SD52/SD11<0.32$; and $0.20<T12/CT4<1.20$.

10. The optical imaging lens assembly of claim 1, wherein an Abbe number of the second lens element is V2, an Abbe number of the third lens element is V3, and the following condition is satisfied:

$0.10<V3/V2<0.60$.

11. The optical imaging lens assembly of claim 1, wherein an image-side surface of the fourth lens element and the object-side surface of the fifth lens element are both aspheric, the fourth lens element and the fifth lens element are cemented to each other; a central thickness of an adhesive layer between the image-side surface of the fourth lens element and the object-side surface of the fifth lens element is D, a refractive index of the fourth lens element is N4, a refractive index of the fifth lens element is N5, and the following conditions are satisfied:

$0.015 \text{ [mm]} \leq D<0.060 \text{ [mm]}$; and $3.0<N4+N5<3.30$.

12. The optical imaging lens assembly of claim 1, wherein a maximum effective radius of an image-side surface of the fourth lens element is SD42, a displacement in parallel with an optical axis from an axial vertex of the image-side surface of the fourth lens element to a maximum effective radius position of the image-side surface of the fourth lens element is SAG42, and the following condition is satisfied:

$$0.20<|SD42/SAG42|<1.50.$$

13. The optical imaging lens assembly of claim 1, wherein a displacement in parallel with an optical axis from an axial vertex of an image-side surface of the fourth lens element to a maximum effective radius position of the image-side surface of the fourth lens element is SAG42, a displacement in parallel with the optical axis from an axial vertex of the object-side surface of the fifth lens element to a maximum effective radius position of the object-side surface of the fifth lens element is SAG51, and the following condition is satisfied:

$$0.01\ [\text{mm}]<|SAG42-SAG51|\times 100<3.0\ [\text{mm}].$$

14. The optical imaging lens assembly of claim 1, further comprising an aperture stop, wherein at least one of an image-side surface of the fourth lens element and the object-side surface of the fifth lens element has at least one inflection point; an axial distance between the aperture stop and the object-side surface of the third lens element is Dsr5, an axial distance between the aperture stop and the image-side surface of the third lens element is Dsr6, a focal length of the first lens element is f1, the focal length of the second lens element is f2, a focal length of the third lens element is f3, and the following conditions are satisfied:

$$|Dsr6/Dsr5|<1.0;$$

$$|f2|<|f1|;\text{ and}$$

$$|f2|<|f3|.$$

15. An image capturing unit, comprising:
the optical imaging lens assembly of claim 1; and
an image sensor disposed on an image surface of the optical imaging lens assembly.

16. An electronic device, comprising:
the image capturing unit of claim 15.

17. An optical imaging lens assembly comprising five lens elements, the five lens elements being, in order from an object side to an image side:
a first lens element having an image-side surface being concave in a paraxial region thereof;
a second lens element with negative refractive power having an image-side surface being concave in a paraxial region thereof;
a third lens element with positive refractive power having an image-side surface being convex in a paraxial region thereof;
a fourth lens element having positive refractive power; and
a fifth lens element with negative refractive power having an object-side surface being concave in a paraxial region thereof and an image-side surface being convex in a paraxial region thereof;
wherein a curvature radius of an object-side surface of the third lens element is R5, a curvature radius of the image-side surface of the third lens element is R6, a curvature radius of an image-side surface of the fourth lens element is R8, a focal length of the optical imaging lens assembly is f, an axial distance between the first lens element and the second lens element is T12, an axial distance between the third lens element and the fourth lens element is T34, a central thickness of the third lens element is CT3, and the following conditions are satisfied:

$$0.20<(R5+R6)/(R5-R6);$$

$$0.10<f/T34<0.90;$$

$$|R8/f|<1.40;\text{ and}$$

$$0.10<T12/CT3<0.85.$$

18. The optical imaging lens assembly of claim 17, wherein the second lens element has an object-side surface being concave in a paraxial region thereof, and the object-side surface of the second lens element has at least one inflection point.

19. The optical imaging lens assembly of claim 17, wherein the image-side surface of the fourth lens element and the object-side surface of the fifth lens element are both aspheric, the fourth lens element and the fifth lens element are cemented to each other; a displacement in parallel with an optical axis from an axial vertex of the image-side surface of the fourth lens element to a maximum effective radius position of the image-side surface of the fourth lens element is SAG42, a displacement in parallel with the optical axis from an axial vertex of the object-side surface of the fifth lens element to a maximum effective radius position of the object-side surface of the fifth lens element is SAG51, and the following condition is satisfied:

$$0.01\ [\text{mm}]<|SAG42-SAG51|\times 100<5.0\ [\text{mm}].$$

20. The optical imaging lens assembly of claim 17, wherein a focal length of the second lens element is f2, a focal length of the fifth lens element is f5, and the following condition is satisfied:

$$0<f5/f2<0.85.$$

21. The optical imaging lens assembly of claim 17, wherein the axial distance between the first lens element and the second lens element is T12, an axial distance between the second lens element and the third lens element is T23, and the following condition is satisfied:

$$0<T12/T23<1.80.$$

22. The optical imaging lens assembly of claim 17, wherein the axial distance between the first lens element and the second lens element is T12, a central thickness of the fourth lens element is CT4, a focal length of the second lens element is f2, a focal length of the fourth lens element is f4, and the following conditions are satisfied:

$$0.20<T12/CT4<1.70;\text{ and}$$

$$|f4/f2|<0.60.$$

23. The optical imaging lens assembly of claim 17, wherein an Abbe number of the third lens element is V3, and the following condition is satisfied:

$$10.0<V3<24.0.$$

24. An optical imaging lens assembly comprising five lens elements, the five lens elements being, in order from an object side to an image side:
a first lens element having an image-side surface being concave in a paraxial region thereof;
a second lens element with negative refractive power having an object-side surface being concave in a paraxial region thereof and an image-side surface being concave in a paraxial region thereof, wherein the object-side surface of the second lens element has at least one inflection point;

a third lens element with positive refractive power having an image-side surface being convex in a paraxial region thereof;

a fourth lens element having positive refractive power; and a fifth lens element having negative refractive power;

wherein a curvature radius of an object-side surface of the third lens element is R5, a curvature radius of the image-side surface of the third lens element is R6, a focal length of the optical imaging lens assembly is f, an axial distance between the first lens element and the second lens element is T12, an axial distance between the third lens element and the fourth lens element is T34, a central thickness of the third lens element is CT3, a central thickness of the fourth lens element is CT4, and the following conditions are satisfied:

$-0.55 < (R5+R6)/(R5-R6)$;

$f/T34 < 1.50$;

$T12/CT3 < 1.50$; and $0.20 < T12/CT4 < 1.20$.

25. The optical imaging lens assembly of claim 24, wherein the first lens element has negative refractive power, an axial distance between an object-side surface of the first lens element and an image-side surface of the fifth lens element is TD, an axial distance between the second lens element and the third lens element is T23, and the following condition is satisfied:

$2.0 < TD/T23 < 8.0$.

26. The optical imaging lens assembly of claim 24, wherein the axial distance between the first lens element and the second lens element is T12, the central thickness of the third lens element is CT3, the central thickness of the fourth lens element is CT4, an axial distance between an image-side surface of the fifth lens element and an image surface is BL, and the following conditions are satisfied:

$T12/CT3 < 1.20$; and $BL/CT4 < 1.80$.

27. The optical imaging lens assembly of claim 24, wherein an Abbe number of the third lens element is V3, and the following condition is satisfied:

$10.0 < V3 < 24.0$.

28. The optical imaging lens assembly of claim 24, wherein a vertical distance between a non-axial inflection point closest to an optical axis on the object-side surface of the second lens element and the optical axis is Yp21, the focal length of the optical imaging lens assembly is f, and the following condition is satisfied:

$0 < Yp21/f < 1.50$.

29. The optical imaging lens assembly of claim 24, wherein a focal length of the second lens element is f2, a focal length of the fifth lens element is f5, and the following condition is satisfied:

$0 < f5/f2 < 0.85$.

30. The optical imaging lens assembly of claim 24, wherein an image-side surface of the fourth lens element and an object-side surface of the fifth lens element are both aspheric, the fourth lens element and the fifth lens element are cemented to each other; an absolute value of a curvature radius of the image-side surface of the fourth lens element and an absolute value of a curvature radius of the object-side surface of the fifth lens element are both smaller than absolute values of curvature radii of the other lens surfaces of the five lens elements.

31. An image capturing unit, comprising:
the optical imaging lens assembly of claim 24; and
an image sensor disposed on an image surface of the optical imaging lens assembly.

32. An electronic device, comprising:
the image capturing unit of claim 31.

* * * * *